United States Patent [19]

Keele et al.

[11] Patent Number: 5,611,066
[45] Date of Patent: Mar. 11, 1997

[54] SYSTEM FOR CREATING RELATED SETS VIA ONCE CACHING COMMON FILE WITH EACH UNIQUE CONTROL FILE ASSOCIATED WITHIN THE SET TO CREATE A UNIQUE RECORD IMAGE

[75] Inventors: Richard V. Keele, San Diego; Cathleen M. Morin, Temecula; Michael C. Goodsell, Chula Vista; Robert Neverisky, San Diego, all of Calif.

[73] Assignee: Data/Ware Development, Inc., San Diego, Calif.

[21] Appl. No.: 203,997

[22] Filed: Feb. 28, 1994

[51] Int. Cl.⁶ ..................................................... G06F 1/02
[52] U.S. Cl. ................... 395/427; 395/488; 395/500; 364/222.2; 364/225; 364/238.3; 364/249.4; 364/260; 369/13; 369/34
[58] Field of Search ............................... 395/275, 600, 395/488, 444, 427, 500; 360/15, 85, 48; 369/33, 39, 13, 34; 364/238.3, 243, 248.1, 260, 222.2, 225, 249.4

[56] References Cited

U.S. PATENT DOCUMENTS

| | | | |
|---|---|---|---|
| 4,027,142 | 5/1977 | Paup et al. | 235/61.9 |
| 4,408,273 | 10/1983 | Plow | 395/600 |
| 4,542,378 | 9/1985 | Suganuma et al. | 345/113 |
| 4,633,393 | 12/1986 | Rundell | 395/800 |
| 4,652,733 | 3/1987 | Eng et al. | 235/462 |
| 4,667,604 | 6/1987 | Selby, III et al. | 369/33 |
| 4,811,325 | 3/1989 | Sharples, Jr. et al. | 369/85 |
| 4,826,333 | 5/1989 | Tanaka | 400/76 |
| 4,912,637 | 3/1990 | Sheedy et al. | 364/300 |
| 4,937,439 | 6/1990 | Wanninger et al. | 235/456 |
| 4,937,807 | 6/1990 | Weitz et al. | 369/85 |
| 4,980,782 | 12/1990 | Ginkel | 360/60 |
| 5,148,403 | 9/1992 | Gardner | 360/15 |
| 5,212,789 | 5/1993 | Rago | 395/600 |
| 5,321,558 | 6/1994 | Tackett | 360/39 |
| 5,357,607 | 10/1994 | Sathi et al. | 395/166 |
| 5,400,319 | 3/1995 | Fite et al. | 369/275.5 |
| 5,408,630 | 4/1995 | Moss | 395/425 |
| 5,430,281 | 7/1995 | Lentz et al. | 235/454 |
| 5,489,768 | 2/1996 | Brownstein et al. | 235/454 |

OTHER PUBLICATIONS

Wordperfect Workbook, Wordperfect Corporation 1989, ISBN 1–55692–476–3 pp. 244–245.

*Primary Examiner*—Thomas C. Lee
*Assistant Examiner*—Anderson I. Chen
*Attorney, Agent, or Firm*—William C. Fuess

[57] ABSTRACT

A mainframe computer programmed to convert input data sets and build HSG or ISO-9660 Compact Disc (CD) images communicates with a channel attached controller that is in turn attached to one or more writers of respective Writable Compact Discs (CD-Ws). The images generated through batch processing in the mainframe computer are cached on the writers both so as to increase the speed of CD-W generation. Both subsequent labeling, and distribution of the CD-Ws to remotely-situated end users who view the CD-W images on PCs, are automated under positive closed loop feedback, control. In particular, the mainframe computer batch executes an image build program on batch input data but one time to create each unique CD-W image, batch writing so much of the data of this image as is common onto each CD-W but leaving blank data spaces in which are stored individual data unique to each physical CD-W and to the end user thereof the individual data preferably includes a redundant copy of the visually-detectable serial number of the CD-W, a volume number and a number of total volumes in the set, a table of pointers to all the indexed contents of the entire set, authenticating information of origin including origin time and place, and the name and address of the intended end user of the CD-W. A large number of related, but individually unique, CD-Ws are thus efficiently written. Individually respective, unique, CD-W labels, packing slips, etc. are printed, normally off-line, for each CD-W from the unique data stored within the CD-W itself, including the redundant copy of its serial number now written upon the CD-W. The compendium of common and unique data permits (i) expedient batch mode generation of unique CD-Ws, and (ii) total positive control of the identification, history and origin of each CD-W as it is distributed over time and space.

19 Claims, 18 Drawing Sheets

EAS CD PACKING LIST

CHN 3260 1011 0663
NAME OF YOUR COMPANY
FEBRUARY 25, 1994
ENTERPRISE AUTHORING SYSTEM
DEMONSTRATION CD-WRITABLE
COPYRIGHT DATA/WARE DEVELOPMENT, INC.

326010110663

Mr. John S. Doe
Our Customer
1234 Main Street
Mail Stop 789
Big city, NY 12345

(tel 800-555-1212)

Copy 1 of 1
CHN 3260 1011 0663
NAME OF YOUR COMPANY
FEBRUARY 25, 1994
ENTERPRISE AUTHORING SYSTEM
DEMONSTRATION CD-WRITABLE
COPYRIGHT DATA/WARE DEVELOPMENT, INC.

VOL 01 OF 01
CHN 3260 1011 0663
NAME OF YOUR COMPANY
FEBRUARY 25, 1994
ENTERPRISE AUTHORING SYSTEM
DEMONSTRATION CD-WRITABLE
COPYRIGHT DATA/WARE DEVELOPMENT, INC.

Fig. 16

# SYSTEM FOR CREATING RELATED SETS VIA ONCE CACHING COMMON FILE WITH EACH UNIQUE CONTROL FILE ASSOCIATED WITHIN THE SET TO CREATE A UNIQUE RECORD IMAGE

REFERENCE TO RELATED PATENT APPLICATIONS

The present patent application is related to U.S. patent application Ser. No. 07/633,2651 now abandoned filed on Dec. 12, 1990, for VIRTUAL ADDRESSING OF AN OPTICAL STORAGE MEDIA AS MAGNETIC TAPE EQUIVALENTS to inventors including the selfsame Richard Keele who is a co-inventor in the present application. The contents of the related patent application is incorporated herein by reference.

TABLE OF CONTENTS

Background of the Invention

1. Field of the Invention
2. Description of the Prior Art
  2.1 General Background
    2.1.1 Summary of the Capabilities of CD-Writable Technology
    2.1.2 Summary of System Requirements, and the Capabilities of CD and CD-W
    2.1.3 Overview of CD Technology
    2.1.4 CD Standards
    2.1.5 Breaking the ROM Barrier
    2.1.6 Authoring
    2.1.7 Indexing
    2.1.8 Writing CD-W
    2.1.9 Benefits of Data Distribution on CDs
  2.2 Reasonable Elements of CD Production and Distribution System
    2.2.1 The Creation Element
    2.2.2 The Transport Element
    2.2.3 The Retrieval Element
  2.3 Particular Challenges of a Large-Scale CD Production and Distribution System
    2.3.1 A Computer, Typically a Mainframe Computer, Will Be Occupied Overly Long in Communicating to Writer of Recordable Mediums all Such Information as is to Uniquely Be Written on Each Individual One of the Mediums, Even Though the Mediums Are Related As Sets
    2.3.2 During and After the Automated Writing of Large Numbers of Recordable and Recorded Mediums, the Mediums are Substantially Visually Undifferentiable and Undifferentiated
    2.3.3 Multi-Volume Sets of Iconically-Recorded Paper and Microfiche/Microfilm Need Not Carry Any Index, and If They Do So Carry an Index Then It is Visually Perceptible; Whereas Indexed Reference to an Entire Set of Machine-Readable Discs is Problematic
    2.3.4 Desirability of Positive Control of the Distribution of Multi-Volume Sets of Recordable and Recorded Mediums Without Reference to any Visually Perceptible Identities Thereof

Summary of the Invention

1. Conserving Data Transfer Bandwidth Between a Computer and a Writer of Recordable Mediums During the Writing of the Mediums as Related Sets
2. Identifying and Labeling Recordable Mediums During and After the Automated Writing of Large Numbers Thereof, Typically as Related Sets
3. Multi-Volume Sets of Recordable and Recorded Discs Where Pointers Written Upon Every Disc Permit Indexed Reference to the Entire Set from Any Individual Member Thereof
4. Automated Closed-Loop Positive-Control Distribution of Multi-Volume Sets of Recordable and Recorded Mediums

BRIEF DESCRIPTION OF THE DRAWINGS

DESCRIPTION OF THE PREFERRED EMBODIMENT

Figure 1:
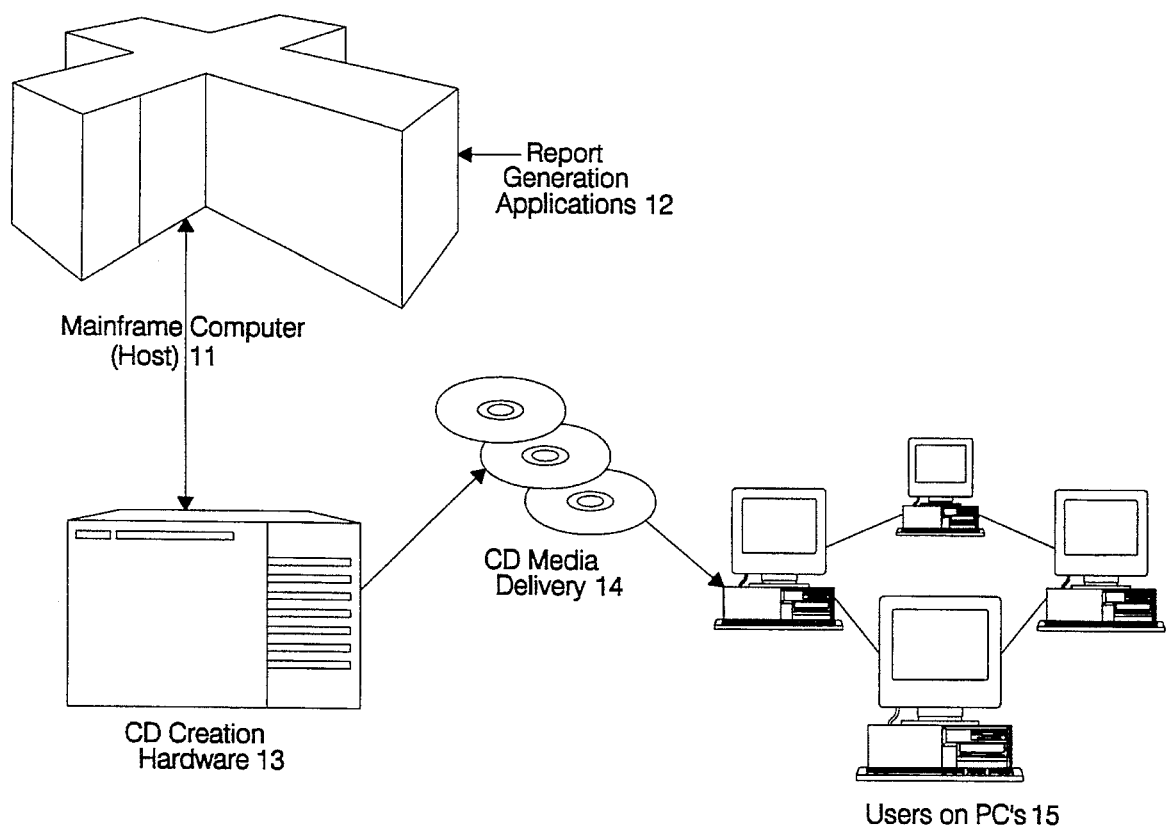

1. Features of the Enterprise Authoring System of the Present Invention
  1.1 CD Creation with EAS
  1.2 EAS Overview
    1.2.1 EAS Creation Software Component Overview
      1.2.1.1 EAS Convert
      1.2.1.2 EAS ImageBuild
    1.2.2 EAS Creation Hardware Component Overview/Subsystem Overview
      1.2.2.1 Control Unit Description
      1.2.2.2 CD Module Description
  1.3 EAS Software Retrieval Component Overview
  1.4 Getting the Work Done
  1.5 Hub Numbers and Eyeball Characters
  1.6 Labeling CDs
  1.7 Masters and Duplicates
  1.8 Compression
  1.9 Encryption
2. Enterprise Authoring System - Architectural Overview and Description
  2.1 Introduction
    2.1.1 Overview of the Block Diagram
    2.1.2 Identification and Description of Boxes on the Block Diagram
  2.2 General Description - A Single Volume Example
  2.3 Detailed Description - A Multi-Volume Example
  2.4 Detailed Description - A Multi-Report Example
  2.5 Human Interface Requirements
3. ImageBuild Software
  3.1 Introduction to Image Build
  3.2 File Requirements
  3.2.1 Input Data File Types
  3.2.2 Content Files
  3.2.3 Control File
4. EAS CD Viewer
  4.1 Starting Up
    4.1.1 Starting the Viewer
    4.1.1 Starting from the Windows Program Manager
    4.1.2 Starting from the File Manager
    4.1.3 Building an Icon to Launch the Viewer
    4.1.4 A List of Screens
    4.1.5 Using the File Screen
    4.1.6 Using the Report Screen
    4.1.7 Identifying Areas on the Screens
  4.2 Using the Viewer
    4.2.1 Viewing on the Report Screen
    4.2.2 Scrolling and Paging the Report Screen
    4.2.3 Finding Information on the Report Screen 4.2.4 Finding a Report Page Through Key Search
4.3 Using the Notepad
4.4 Exporting Report Data to Other Applications
4.5 Changing the Data Area
4.6 Printing
4.7 Image View and Print
4.8 Closing the Viewer
4.9 Additional Features
5. The Enterprise Authoring System Label Printer and Label Printer Software Program
   5.1 Starting the Label Printer
   5.1.1 Starting the Label Printer
   5.1.2 Starting from the Windows Program Manager
   5.1.3 Starting from the File Manager
   5.1.4 Building an Icon to Launch the Label Printer
   5.2 Label Printer Screen
   5.2.1 Identifying Areas on the Screen
   5.3 Using the Label Printer Function
   5.3.1 Using the Contents Boxes
   5.4 Using the Verify Function
   5.5 Adjusting the Print Position
   5.6 Contents of the Preferred Label File
   5.7 Using the Label Printer
   5.8 Closing the Label Printer Program
6. Extensions of the Invention
CLAIMS
ABSTRACT

BACKGROUND OF THE INVENTION

1. Field of the Invention

The present invention generally relates to the computer generation and writing of data storage medium, particularly large sets of Compact Discs (CDs) and most commonly Writable Compact Discs (Compact Discs-Writable, or CD-Ws).

The present invention more specifically relates to a system for the closed-loop automated, controlled, fail-safe and efficient batch-mode computer-mainframe-processing of data so as to create CD images, with the CD images then being automatically recorded on physical CD-Ws with such positive identity control that the CD-Ws may later be securely remotely distributed and archived.

2. Description of the Prior Art

2.1 General Background

The present invention will be seen to concern a new system for replacing the distribution of data on paper or microfiche/microfilm with the distribution of data on Compact Discs (CDs). In a typical operation regularly distributing data on microfiche/microfilm, the new system is directed to saving tens of thousands of dollars annually, to increase worker productivity and to improve the performance of the distribution system.

Paper and microfiche have served us well for years because these media are inexpensive, convenient and readily available. The Compact Disc (CD) is the first and perhaps only medium which is truly competitive against paper and film.

To be competitive a new medium must be cost-effective. Each CD-Writable disc medium (CD-W, as hereinafter explained) costs under $20, and can hold the equivalent of over 400 fiche (or the equivalent of over 100,000 pages of print), circa 1994.

To be competitive a new medium must be convenient. Paper is the most convenient media ever invented since it requires no "reader" mechanism and "writers" are readily available. Film is relatively convenient since readers are generally available and reader printers can produce hard copy output. CD is as convenient as film, since CD readers for PCs are available in any computer store—yet CD has the dramatic benefit of being able to deliver data in machine readable format for use on PCs. This means the data can be reprinted, and reprocessed.

To be competitive a new medium must be compatible. Paper comes in standard sizes and so does microfiche. The standards for these media are well developed and it is simply assumed that one can interchange data on paper and on microfiche without compatibility concerns. Just so, the CD is also fully standardized. Through the International Standards Organization the ISO 9660 CD format is universally recognized and used. This means that an ISO 9660 CD can be played in a CD drive in virtually any PC. CD will likely be the next data distribution medium because it combines these three key requirements for success: cost-effectiveness, convenience and compatibility. CD will be seen to be the data distribution medium of the present invention.

2.1.1 Summary of the Capabilities of CD-Writable Technology

Compact Disc (CD) and Compact Disc-Writable (CD-W) technology is poised to fulfill the years of promises of a new storage medium: it is inexpensive, convenient, compatible storage which can be relied on for years to come. After many false starts and disappointments with other media, CDs appear to possess all the elements required for success.

These elements include cost effectiveness. Because of the huge consumer volumes generated by CD audio the underlying cost of the technology has been driven down dramatically in the early 1990's.

These elements include convenience. With the capacity to store over 400 fiche per CD, combined with machine readability, CD promises to be as convenient as paper. Even hand held CD readers are now available, circa 1994.

These elements include compatibility. With full international standards in place and thousands of new titles issued every year, the CD standard is one of the strongest in the industry.

The applications for CD are wide ranging, from entertainment to publishing to archiving documents. Until recently all CDs were made by pressing, a process ideally suited to the inexpensive mass production of discs. This replication process is widely employed today in the audio industry, for software distribution, and publication. With the advent of CD-Writable (CD-W) (next explained) it is now possible to make unique CDs in low volume for use in internal data distribution, replacing or augmenting paper or microfiche.

2.1.2 Summary of System Requirements, and the Capabilities of CD and CD-W

An "industrial strength", type of CD production and distribution system is required for enterprise, or business, data. Such a system would logically use the existing host computer of the business for data preparation. If this is an IBM® computer operating under the MVS® operating system (IBM and MVS are registered trademarks of International Business Machines Corporation), then the standard Bus & Tag channel of such existing computer would logically be attached to a CD writer system. A system, and system software, to subsequently retrieve the data written on the CDs might logically be a PC-based system running, for example, under a Windows®, or DOS, PC operating system. (Windows is a registered trademarks of Microsoft Corporation.) Such a system would need to create many CDs during a single night for distribution to users the next business day.

Unlike PC or workstation-based CD writing systems, which due to processing and writing constraints can produce only a few unique CDs in a single shift, the required enterprise production system should be configured with multiple CD writers. Only thus could the power of a mainframe computer be used to process all the data needed to drive them.

Users would desirably receive their data daily on CD media, completely self-contained and ready for use. Retrievals would be done on users' PCs, where the users could also cut and paste data to other Windows applications to generate correspondence, or create spreadsheets.

Such an enterprise system would desirably be at one tenth or less the cost of microfiche, while offering all the benefits of a standardized CD medium.

2.1.3 Overview of CD Technology

CD has been called the greatest advance in publishing since Gutenberg. Familiar to everyone as a medium for the distribution of music, CD is now delivering audio, text and video to the mass market. It is estimated that over 11 million CD drives will be in use by the end of 1994, and the number of titles published on CD doubles every year.

The appeal of CD as a mechanism for delivering data, whether audio, text or video, lies in the unique combination of benefits provided by the technology.

A primary benefit is capacity. A single CD holds about 600 megabytes of data. This is the equivalent of over 400 3½ inch floppy diskettes. Many software distributors—including IBM Corporation, Microsoft Corporation, Lotus Development Corporation, Corel Corporation, Sun Microsystems, Inc., Borland Corporation and Novell Corporation—routinely distribute their product on CD instead of floppy diskettes. CD distribution allows the manufacturer to deliver a single piece of media, and makes it easier for the user to install the software. It also reduces the cost of distribution both in terms of media and associated expenses such as packaging and postage or freight.

Another benefit is longevity. CD media is inherently more stable than magnetic media, both in storage and in use. Minor scratches, dirt, dust, magnetic fields or fingerprints don't damage the underlying data. Nothing in the drive touches the CD surface itself, so the media does not wear out with use. Neither can a user inadvertently erase or alter data recorded on the CD.

Another benefit is standardization. CD drives can be found on the IBM and compatible PC's, the Macintosh® computer of Apple Corporation (Macintosh® is a registered trademark of Apple Corporation), and on the microcomputers and engineering work stations of Sun Microsystems, Inc., Digital Equipment Corporation (DEC), Unisys Corporation and many other manufacturers. If the CD is recorded using the industry standard ISO 9660 format then it can be read and used by all of these platforms. A "manufacturer" of data can produce a single CD which can be distributed to all platforms, reducing the costs for reproduction and distribution.

The CD market has been growing at an explosive 50% annual rate in the early 1990's. The mass market appeal of CD has generated a number of side effects which are of great benefit to the data processing industry.

These side effects include high volume cost erosion. Because CD drives are produced by the millions, the price of these drives has fallen below $200. Using technology developed for and perfected in the CD audio arena, CD drives for PCs benefit from the high volume production of laser heads and standard electronics. Furthermore these drives are faster than their predecessors yet are less costly due to the large quantities being manufactured.

These side effects include high volume product standardization. Because CD has become a high volume consumer product, manufacturers have been compelled to establish and maintain a set of standards to ensure that drives and media are fully interchangeable. The industry has produced these standards to ensure further growth and market penetration. Magneto optical (MO) and Write Once Read Many (WORM) optical discs have not yet achieved this level of standardization, and may never do so. Even in the area of 5¼ inch MO, where standards exist concerning the physical characteristics of the media, no standards exist for the way data is organized on the media. For this reason MO media written on one manufacturer's drive generally cannot be read on another manufacturer's equipment. Each manufacturer has decided on its own method of organizing data, and none wants to change to the method of another since no single manufacturer dominates the marketplace.

With all the standards in CD some of the industry terminology has not yet been standardized, in particular the appropriate designation for writable CDs. This technology is variously referred to as Compact Disc Write Once (CD-WO), Compact Disc Recordable (CD-R) and Compact Disc Writable (CD-W). These all designate the same product, merely reflecting a particular manufacturer's preference for terminology. This specification uses the acronyms CD and CD-W since they are so used by Kodak Corporation, one of the largest manufacturers of optical disk media. It is also interesting to note that the industry uses the term "disk" when referring to hard disk drives and floppy disk drives and media, but prefers "disc" when referring to compact disc equipment and media.

These side effects include high volume product acceptance. Because the number of drives and titles on CD is proliferating so rapidly, CD is considered as a required vehicle for distribution if a title or offering is to gain wide appeal. In the music business, a new offering is de facto distributed on CD, with tape or other distribution an alternate offering. In the print industry very large volumes, like telephone directories, reference books, and technical proceedings are commonly distributed on CD.

These effects have operated to make CD a viable mechanism for distributing business data throughout an enterprise. The latest advancements in CD technology now make it possible to make small quantities of CDs for data distribution: the CD-Writable (CD-W) technology. Just as the printing press made the printed word widely available and changed the distribution of ideas forever, so the CD has the potential for changing the manner of the distribution and use of data.

2.1.4 CD Standards

CD standards are "cast in colored concrete". CD technology is not new. The CD, first in the form of the CD-ROM, has been available for over a decade. What then explains the recent explosion in use and interest in CD for data distribution? The answer is standards.

Consider the FAX machine. Circa 1994 almost every business, and many homes, have a FAX machine. Although it had been possible to transmit data over telephone lines for many years, the FAX machine exploded on the marketplace when the industry settled on standard ways to communicate data between machines. This was accomplished by the CCITT standards. Once standards were established manufacturers could produce, and users could purchase, machines with assurance that one FAX machine could reliably communicate with any other FAX machine.

The International Organization for Standardization has issued International Standard 9660—referred to as ISO 9660—and titled "Information processing—Volume and file structure of CD-ROM for information interchange". The very title of this standard is instructive. Note that the standard defines how data are recorded on the CD, the structure of volumes and files, and that its purpose is to enable data interchange. Thus ISO 9660 is to CD-ROM what CCITT was to the FAX machine—the one standard which permits data to be reliably interchanged across platforms of multiple manufacturers.

The availability of equipment and standards allowed CD to reach a critical mass such that the normal forces of the marketplace began to drive it to success.

Because CD can be used for a variety of purposes—audio, data, combined audio and data, or video—a set of supporting standards have been devised to allow these formats. These standards are often referred to by color based on the color of the binder in which each was originally published. The Red Book defined the standards for audio discs. Music recorded under the Red Book standard will play in any CD audio player. The Yellow Book defined the physical characteristics of CD-ROMs to be used for data instead of audio. ISO 9660 completes the Yellow Book by specifying the volume and file structure on a Yellow Book disc. The Green Book defines CD-ROM for use in Compact Disc Interactive (CD-I) applications. The Green Book goes far beyond the CD media or player, defining the operating environment to be used for the complex interaction between the CD, the processing system, and the user.

2.1.5 Breaking the ROM Barrier

CD-ROM stands for Compact Disc Read Only Memory, indicating a medium which is read only where the user has no ability to alter or delete data on the disc. This media is created by the manufacturer through a process known as pressing, wherein the media surface is imprinted with the spiral groove in which the laser runs, and where tiny pits represent the data. The pressing process requires special equipment. Pressing is ideal where large numbers of the same CD are required, such as for software distribution or distribution of reference works such as encyclopedias.

The Compact Disc Writable (CD-W) is produced using a special disc formulation which can be written by the laser in a specially designed CD writer drive. Normal CD players cannot write on these CD-W discs, so once delivered to the user they can be considered as a CD-ROM. A CD-W disc can be distinguished from a pressed disc by the characteristic gold and green color of the CD-W versus the silver color of a CD-ROM. The green color of the CD-W is the result of the dye which is the recording layer. This dye is sensitive to the laser light emitted by the CD writer. The dye reacts to this laser light and allows the shiny gold surface to be exposed.

The exact nature of the CD-W medium is specified in the Orange Book. The Orange Book ensures that any manufacturer's CD writer will be able to write any manufacturer's CD-W mediums, and that the resulting mediums will be the equivalent of Yellow Book CD-ROM medium and thus will work in any manufacturer's drive. If the CD-W media is written in accordance with the ISO 9660 volume and file formats, then complete interchangeability is assured.

Once it became possible to write a CD rather than press it, it also became possible to append data to a partially written CD. The ISO 9660 standard does not permit such extension and most CD readers on the market could not read a disc to which data had been appended. To allow this feature in the future a standards committee is developing a set of standards which permit appending data. This work will incorporate ISO 9660 as well as other work intended to further broaden the applicability of CD.

With the availability of CD-W media, CD writers and standards, it is possible today to make "one of" CDs with the full benefit of CD technology but at greatly reduced costs.

2.1.6 ISO Formatting

The process of conforming data to the volume and file structures defined by the ISO 9660 standard is referred to herein as ISO formatting. ISO formatting software is employed to format the data in accordance with the standard, building each of the files and structures required to insure compatibility. When employed for pressing this process is sometimes referred to as pre-mastering, in that it produces a version of the CD which will then be pressed (mastered) onto all of the copies. ISO formatting software is available for use on a variety of platforms, from PCs to workstations to mainframes. The purpose of all of these applications is to insure that the data is properly structured for subsequent use.

2.1.7 Indexing

Indexing and ISO formatting should not be confused. Every CD must be formatted if it is to conform to the standards and be usable across platforms. Indexing provides a file or files which can be later used to locate specific data on the disc. This is generally useful since the disc can contain the equivalent of over 100,000 pages of text. These index files are laid down on the disc in conformance with the standard by the authoring application.

Indexing is accomplished by software applications which, like formatting, run on PCs, workstations and mainframes. The degree and depth of indexing varies according to the requirements of the data users. Some report items, such as bank statements, may require only a few key identifiers to complete a retrieval, for example the account number. Other items, such as this very specification, contain no specific identifiers (other than paragraph or chapter headings) and lend themselves to full text indexing. Full text indexing extracts every word and number from the report item and creates a pointer to it for later retrieval. Obviously full text indexing uses much more CD disc space to store the index data, and requires more processing power to extract the index information.

Because indexing is a report specific task, the degree and depth of indexing will vary depending on the nature of the report item and the needs of the users. Full text indexing provides maximum flexibility to the users at the expense of disc space and processing.

2.1.8 Writing CD-W

The drives that write CD-W mediums can operate at higher speed than normal CD players. Whereas a full CD can take up to 60 minutes to read completely, it can be written in half that time by a so called "2X" writer. Whether the CD is written at 1X, 2X, 6X or higher has no effect on the way it operates when placed in the user's CD player.

The system of the present invention will be seen to use 2X writers that can fill a CD in 30 minutes. Already the industry has advance models of faster writers, some at 4X and some at 6X. The architecture of the system of the present invention will be seen to be able to immediately accommodate these higher speed writers, increasing the throughput.

2.1.9 Benefits of Data Distribution on CDs

The PC revolution has changed forever the way that businesses use and relate to business data. But, with the processing power of a PC at many business desktops, the question remains, how should the business deliver its data to the users of such data (primarily its own employees)?

This question has been answered through a number of technological advances, each having a role to play. Each architecture attempts in its own way to deliver the user's data as efficiently as possible with reliability and useability. Advances have been achieved in client-server and distributed architectures with improved LAN performance and reliability.

CD-W makes it possible to deliver some or all business data through a cost-effective, convenient and compatible machine readable medium, as opposed to microfiche or paper. This data can exist on a single user's PC, or be accessed by several users through a program like Windows for Workgroups® (Windows, and Windows for Workgroups, are registered trademarks of Microsoft Corporation), or be accessed department-wide through a CD server. The benefits of this system of data delivery are several.

A first benefit is reliability. Data delivered on CD-W medium can be used by any PC equipped with a CD drive. If one PC is down, the data can be retrieved on any other PC. If a LAN is down, then each PC can operate independently. Because the CD-W medium is removable the system uptime can be assured.

A second benefit is compatibility. CD-W medium is written in accordance with international standards ensuring that any manufacturer's CD drive will reliably retrieve the data written thereon.

A third benefit is cost-effectiveness. CD-W medium costs less than $20, but can hold the equivalent data to over $400 worth of microfiche.

A fourth benefit is convenience. Data on CD can be read by a PC then processed or printed.

A fifth benefit is control. Data written on a CD can be restricted to only intended users. The present invention will show one effective manner of so controlling the distribution, and use, of data on CDs.

A sixth benefit is self-containment. CDs can be created which include not only the data, but everything required to view it or recreate it. If a specialized retrieval software is to be used with the data then it can be written with the data on every CD. Users need not worry years from now how they will view the old reports, the viewer is contained directly with them.

2.2 Reasonable Elements of CD Production and Distribution System

A system for distributing data on CD should logically and reasonably contain the following essential elements.

A CD creation element should perform the data gathering, indexing, formatting and writing functions.

A CD transport element would relocate the CD to the user's platform.

Finally, a CD retrieval element would permit the user to see and utilize the data on the CD.

The general criteria for these elements in a system to distribute voluminous business data on CDs are discussed in the following sub-sections.

2.2.1 The Creation Element

In order to create a CD all of the data to be written on the CD must be gathered together, appropriately processed (e.g. character set conversion from EBIDIC to ASCII and/or indexing), ISO formatted and written. Low-end, PC-based, solutions to this task are available in the marketplace. The present invention is concerned with the solution of certain challenges that are most important in a high-end, "industrial-strength", CD authoring and distribution system.

Writing the actual CD-W media is a function of the CD writer drive itself. Most writers today are 2X writers with roughly equivalent performance. The true differentiators among CD creation systems are 1) the number of writers which can be usefully employed, and 2) the time required to "get ready to write" (gather, process and author).

CD writers in general have a small internal cache memory through which data flows as it is being written. This cache is provided because the writer cannot be allowed to "run out of data" while a CD is being written. For this reason the entire CD is usually built in advance on a Winchester disk drive then copied to the writer without interruption. To support multiple writers one generally should provide both sufficient disk capacity to store a complete CD image for each writer and ensure adequate bandwidth to service all writers concurrently. Because of the expense of these large disk drives and the bandwidth to service them, most low end systems are equipped with only a single writer, or require that only one writer be active at any given time.

Notably, the data processing required to "get ready to write" can take far longer than the 30 minutes it takes a 2X writer to cut a full CD. Processing 650 megabytes of data is a significant task even for a powerful PC or workstation.

If only a few unique CDs need to made during each shift of a business then a low end CD creation system can fill the bill. If, however, the business needs to make tens or hundreds of unique CDs then a more robust solution is required.

2.2.2 The Transport Element

CDs can be transported for local and wide area distribution(s) through a variety of mechanisms, all of which are likely in place now for the transport of paper or film media. CDs may conveniently be transported by courier, by overnight express, by first class mail, by parcel post or parcel service, by interoffice van or by any other means conventionally used for the physical transport of business records.

2.2.3 The Retrieval Element

The user is generally most concerned about the retrieval element, since this is where "the rubber meets the road". In reality this is where most systems look different but behave the same. The look and feel of the retrieval screens varies from system to system, with some systems being more customized than others. In practice each of these retrieval systems must accomplish the same goal—to show the user the requested data promptly and easily.

Most business users are expected to access CDs in drives associated with IBM compatible PCs running Microsoft Windows (IBM is registered trademark of International Business Machines Corporation and Windows is a registered trademark of Microsoft Corporation). One crucial software element in this configuration is Microsoft CD-ROM Extensions (MSCDEX). MSCDEX was developed to provide a standard interface to CD-ROMs in the ISO 9660 format. It permits a CD to be accessed as a DOS drive by intercepting DOS file I/O commands made by an application, performing the equivalent command on the CD, and returning the resulting data. Most CD drives sold today include a copy of MSCDEX, or it can be obtained directly from Microsoft Corporation.

2.3 Particular Challenges of a Large-Scale CD Production and Distribution System The present invention is concerned with solving problems that arise when a voluminous amount of computer information is repetitively periodically written and distributed in machine-readable digital symbolic, as opposed to human-readable iconic, form. The information may be, for example, the complete current depositor accounts of a large bank that has heretofore been distributed to branches of the bank each night on microfiche or microfilm.

The voluminous information is commonly written as multiple related sets of recordable and recorded medium where each set consists of multiple members that are related to each other as well as to corresponding members of other sets. The recordable and recorded medium is typically an optical disc, and is more typically a Compact Disc (CD) which, circa 1994, is more typically a Compact Disc-Writable, or CD-W. Each of a typically great number of CDs is initially, before writing, undifferentiated and unidentifiable one to the next save only for a permanent serial number marking, or "hub marking", that is visually detectable.

Even should a label subsequently be affixed to an individual CD, the amount of human-perceptible iconic, or alphanumeric information, that may reasonably be contained in such a label is small. Moreover, it is not particularly desirable, nor efficient, nor effective to have a human attempt to read the serial number marking and/or any label of a CD in order to maintain the organization and integrity of large sets of such CDs. It is better that machines, as opposed to humans, should, insofar as proves possible, maintain the organization and integrity of libraries of digital mediums.

At the same time that machine-based stewardship of libraries of computer-based, digital, information would seemingly be useful, much computer-based digital information is routinely printed to paper, microfiche of microfilm. Although, at first impression, it seems that this is primarily so that humans can, by subsequent visual reference to the printed media, gain access to the informational contents thereof, if becomes obvious that—when the price of computer readers of digital information keeps plummeting while the acres of expensive microfiche/microfilm continually repetitively printed with expensive Computer Output on Microfilm (COM) remains unread and ecologically burdensome—that there must be some dynamic behind the production of paper, microfiche, and microfilm other than people's desire to have direct visual access libraries of information such as financial records.

One dynamic that is likely causing a lot of digital, computer-based, efficiently symbolically-encoded (e.g., as ASCII characters) information to be inefficiently, expensively and seemingly quite unnecessarily reduced to iconic form (i.e., the alphanumeric characters) is the necessity of human control as "librarians" in the distribution and archiving of this information. In order to understand that many aspects of the process of data distribution on microfiche or microfilm are dependent upon human, as opposed to machine, perception, consider an exemplary production and distribution sequence. One, master, copy of each microfiche or microfilm frame of a set of such is computer-generated in, and by, a Computer Output on Microfilm (COM) equipment. The master microfiches or microfilms are subsequently photographically replicated to any desired numbers. Both the original, and all copies, typically contain appropriate identifying legends right in the film, and more typically at a scale that does not even require magnification to read (as does all other information on the microfiche/microfilm). A human typically (i) collates and organizes the microriches, or microfilms, in sets by reference to the visually perceptible appearance thereof, (ii) appends a human-perceptible paper address and packing list, and (iii) dispatches each assembled set to its corresponding listed address. When each set of microfiches, or microfilms, is received by the intended recipient thereof, then the completeness and contents of the set is normally verified (if desired) by visual reference to the contents thereof, and telephone or other communications may be made to secure the replacement(s) or return(s) of any missing or mis-directed set member(s). The human assembling the set makes visual reference thereto in the manner of a librarian at a central disbursing library. (The human receiving the set makes visual reference thereto in the manner of a librarian at a branch receiving library).

The records of the set are typically sequentially organized by some index, such as the depositor account number. The individual microfiches or microfilms of the received sets are subsequently referenced for data concerning an individual account by a human. The human visually discerns—possibly by reference to such sequence labels on the individual microfiches or microfilms as may by this time have become affixed or else simply by (magnified) visual observation of the accounts that are upon each successive microfiche or microfilm, and possibly with help of a printed paper index (which may or may not have been printed from any one of the microfiches or microfilms themselves)—which microfiche or microfilm contains the desired data. The human then visually acquires such data. In this manner the human again functions like a librarian, first in locating a proper volume by visual reference and then by reading the contents of the located volume.

The entire process of accessing a depositor account record at a branch of a bank from those records that are present at the bank branch seems to be, and is, something that could be efficiently and effectively performed by a modest computer resource, on the order of a personal computer or computerized teller station, if the accessed records were to be symbolically, digitally, encoded as opposed to being presented in iconic image form (whether full size on paper or of reduced size on film).

There are, however, some challenges to each of the (i) generation and (ii) distribution of records that are substantially purely machine-readable symbols, and that are substantially devoid of human-readable iconic information. These challenges are next discussed.

2.3.1 A Computer, Typically a Mainframe Computer, Will Be Occupied Overly Long in Communicating to Writer of Recordable Mediums all Such Information as is to Uniquely Be Written on Each Individual One of the Mediums, Even Though the Mediums Are Related As Sets The recordable mediums, typically optical discs and more typically CDs and still more typically CD-Ws, onto which voluminous data for later distribution is written from a computer, and typically from mainframe computer, are each unique. Each disc must, for example, contain its unique identification and/or sequence number(s), if not also other information also such as the date and location of its writing. If many discs are to be written then the computer will be occupied overly long in communicating to a disc writer all such information as is to uniquely be written on each individual disc, even though the many discs may be related to each other as members of a set, and as sets.

2.3.2 During and After the Automated Writing of Large Numbers of Recordable and Recorded Mediums, the Mediums are Substantially Visually Undifferentiable and Undifferentiated Some recordable medium, including optical discs and CDs and CD-Ws, are, as delivered into use by their manufacturer, undifferentiable and undifferentiated one to the next save only for a permanent serial number marking, herein called a "hub number", that is visually detectable. If a written disc is never to have any additional visually perceptible identity information affixed thereto than all subsequent references and directives to humans re: the particular disc, must identify the particular disc by its hub number. These hub numbers are long and unwieldy, as they must be to identify a particular one disc out of all of its type ever made or to be made. They are accordingly ill-suited both for (i) inclusion on human-perceptible printed labels, and (ii) communication to, or remembrance by, humans.

Humans can, however, generally understand and remember simple numbers like 1, 2,, 3, . . . N. If these numbers are to be affixed to the members of a set of discs then, other than printing or etching or somehow marking the discs themselves, it is commonly so accomplished by printing the number on a set of labels that are subsequently affixed to the members of the set of discs. However, the writing of discs and the printing of labels are two entirely different (but previously known) operations. Short of combining a disc writer and a label printer, which would be an awkward and arbitrary piece of equipment, the written discs must be transported in good order from the disc writer upon which they are written to a station where appropriate labels, printed off-line, may be suitably affixed to the discs.

Alas, there is potential complexity, and error, in even this straightforward process. Sometimes a physical disc will be defective, and, although appearing in the output stack, will be unwritten or defectively written. Often a substitute rewritten disc appears next in line. Sometimes the writing process will be interrupted, or halted. Likewise, the production of the labels can incur irregularities. All these idiosyncracies can be correctly accounted for, and precision manual procedures and processes can suffice for the correct labeling of many hundreds of discs as are distributed across any scores of related sets.

However, it would be strongly desirable if an improved, positive, control could be effected for the correct labeling of large numbers of CD-Ws onto which voluminous data (for later distribution) is written from a computer.

Some thought will reveal that these challenges do not exist with paper and microfilm, which bear their own visually detectable identities. Neither does the problem beset computer software on magnetic disc and tape, videotapes, audio tapes and other items which, while replicated in great numbers, are commonly replicated but one unit at a time to produce large numbers of identical copies all of which take identical labels. Accordingly, the challenge of labeling control is related to the complex, multi-volume, sets in which large numbers of unique discs are produced. (This mode of production is, in turn, related to the efficiencies of writing data from a computer to a CD-W via a writer of CD-W.)

2.3.3 Multi-Volume Sets of Iconically-Recorded Paper and Microfiche/Microfilm Need Not Carry Any Index, and If They Do So Carry an Index Then It is Visually Perceptible; Whereas Indexed Reference to an Entire Set of Machine-Readable Discs is Problematic Multi-volume sets of paper, microfiche and microfilm are recorded with iconic, alphanumeric, information. The information is typically recorded in order based on some sort of a parameter, such as the depositor account number for banking records. These multi-volume paper and film records need not, and typically do not, carry any index, meaning a table associating any, or each, physical volume of the multi-volume set with the range of the ordered records contained thereon. If these multi-volume paper or film records somehow do carry an index, then it is typically (i) so carried only in one place, typically at the beginning or end of the entire set like the index of a set of books, and (ii) visually perceptible.

Forebearing that a member of a multi-volume set of CDs or other machine-readable medium carries an adequate index upon the face of a visually perceptible label affixed to the member—and such CDs do not normally carry any such index on the label because any label is far too small—progress in locating some particular, indexed, content within a multi-volume set of machine-readable mediums can be challenging. Any particular contents can obviously ultimately be located by machine-reading different volumes—alternately of numbers both higher and lower than the targeted index range—until the appropriate individual one volume containing the sought-after information within an entire multi-volume set is located. If the number of volumes is less than ten, and if the searcher is clever, then this procedure of location by repetitive trial and error may be cumbersome, but is likely ultimately availing. If, however, the number of digitally-recorded, visually-imperceptible, discs within a set is many hundreds, or thousands, than it is clearly required that a human searcher should have some improved means of indexing the ordered information stored on the machine-readable discs in order to locate a particular one disk containing the sought-after information.

Notably, volumes within existing multi-volume sets of information—such as computer programs commonly recorded on magnetic disks—may have a pre-existing ordered identity. If, for example, if a disk "#5" is loaded at a time calling, for example, for a disk "#4", than the computer can recognize that the wrong disk has been inserted, and will call for the proper disk (i.e., disc "#4") to be loaded. The computer is not doing this by any search though any index located on disk #5 or elsewhere, but is, instead, simply calling out a predetermined sequence. Such sequencing is non-analogous to the indexing of the present invention.

2.3.4 Desirability of Positive Control of the Distribution of Multi-Volume Sets of Recordable and Recorded Mediums Without Visual Reference to any Minimally-Detectable Identities Thereof Each disc or volume, of a multi-volume sets of recordable and recorded disc may have, in the form of a hub serial number and possibly also a label, only but such identity as is minimally visually perceptible, if, indeed, it is perceptible at all. Namely, all embedded, embossed, printed or otherwise perceptible iconic, alphanumeric, characters—if they even exist—may be extremely small, worn, or otherwise very difficult to read.

Minimal as the marked identity of a disc might be, such markings as are borne upon the physical disk could theoretically suffice to permit a human to visually ensure the completeness and contents of a set of discs in a like manner to the way that the same human may verify the completeness and contents of a multi-volume set of microfiches or microfilms, or a set of books. However, if the discs are numerous, the identity markings small, and the task tedious, then it is better to let a machine such as a computer perform this job. Moreover, it is the obvious trend that as objects holding information, such as CDs, get smaller and smaller the sophistication of the unique identities of these objects in all the wide world gets greater and greater, and the identifying information longer and longer. Accordingly, there comes a point where it is unavailing to let humans attempt to organize and maintain multi-volume sets of digital media.

Since a computer reading the CD of a set of CDs cannot know, a priori, which, if any, volume or volumes of a set is (are) missing—including potentially the first and/or the last volume—nor how many total volumes there are in the set, it is clear that the computer must be able to obtain some information from reading any volume, and/or so many volumes as there are, in order to make a valid determination of the correctness (or error), and the completeness (or incompleteness), of the set. Moreover, the computer would desirably usefully furnish a report (in digital form or otherwise) which, if supplied back to a (central) authority from which the set arose, could be correlated with other process information, such as that regarding the generation and distribution of the members of the set, so to detect anomalies and possible fraud or omission.

Such a report is especially useful if the (remotely-situated) party or organization that receives a disc, but in insufficient numbers of copies thereof, has the authority and capability to duplicate the disc that is in short supply, completing the required local inventory. If the duplicated disc has information, such as financial information, which could be manipulated for purposes of fraud, then it is clearly necessary that some sort of positive audit trail of the replication record, if not also a positive control of the replication process, should be maintained.

For example, if a valid disc of financial data was sidetracked so as to allegedly become "missing", and a if fraudulent copy of the missing disc was supplied to a bank teller at a branch bank, then the branch bank teller might be induced, by the records contained within the fraudulent disc, to disperse funds on an account for which the financial data was erroneous. Obviously this type of fraud can happen even at the present moment by unauthorized substitution of microfiche/microfilm or paper records. However, it would be desirable if a computer-based system could offer superior immunity to fraud.

SUMMARY OF THE INVENTION

The present invention contemplates (i) automated and efficient writing of multiple related sets of recordable and recorded medium where each set has multiple members that are related to each other as well as to corresponding members of other sets, (ii) generation of integrated labeling and packing lists by machine means for large numbers of written mediums that are, prior to labeling, substantially physically indistinguishable one from the next, and, (iii) after collation and distribution of the written and labeled mediums in accordance with a packing list, generating a positive feedback, validation of the distribution by automated machine means. In all these functions the present invention serves to produce, distribute, and validate the distribution of potentially vast numbers of mediums recorded with digital data, typically optical disc mediums and more typically CDs and particularly CD-Ws, by machine means, and substantially without such human visual perception as has previously typically attended the widespread distributions of voluminous information on paper or film medium.

1. Conserving Data Transfer Bandwidth Between a Computer and a Writer of Recordable Mediums During the Writing of the Mediums as Related Sets In one of its aspects, the present invention concerns the efficient writing of typically vast information files—such as files of the type that might previously have been computer output on microfilms and microfiches and thereafter photographically reproduced—onto multiplicities, and typically onto great multiplicities, of recordable mediums, typically optical discs and more typically CDs and CD-Ws. The efficient writing of related information, transpiring in a medium-writing device at and upon a multiplicity of successive times, serves to produce a plurality of related sets of recordable and recorded mediums where each set has a plurality of members that are related to each other as well as to corresponding members of other sets.

In this aspect of the present invention a relatively larger data file, called a common data file, is transmitted at times from a computer to a writer of recordable medium. The common data file contains multiple data files that are to be written, in common, onto each of a plurality of corresponding members that are within a plurality of sets of the recordable medium, each of which sets contains a plurality of related members. Notably, in accordance with the invention each different common data file (as is associated with the corresponding members of all sets of the recordable medium) is communicated from the computer to the writer only once. A relatively smaller file, called a control file, is also transmitted at times from the computer to the writer. Each control file is uniquely associated with an individual one of the multiplicity of the recordable medium.

The writer of the recordable mediums receives and caches each common data file received from the computer until all corresponding members of each of the plurality of sets of the recordable medium have been written, at which time another, subsequent, common data file is received and cached. The writer also receives each unique control file transmitted from the computer, and combines each successive such control file with a cached common data file to create a single unique record image. Finally, the writer writes each individual one of the multiplicity of the recordable mediums with a corresponding individually unique record image; first corresponding members of each of the plurality of sets of the multiplicity of recordable medium being written before second corresponding members of each of the plurality of sets are written and so on until all of the members of all of the plurality of sets of the multiplicity of recordable medium have been written. When the recordable medium is optical disc, or CD-W, which is typical, then this writing must be, and is, done from beginning to end without pause or interruption.

Notably, in this aspect of the present invention the data communication bandwidth from the computer to the writer of the recordable medium is conserved because the relatively larger common data file that is written to corresponding members of each of the plurality of sets of the multiplicity of the recordable medium is communicated from the computer to the writer only but once.

2. Identifying and Labeling Recordable Mediums During and After the Automated Writing of Large Numbers Thereof, Typically as Related Sets In another of its aspects, the present invention concerns the labeling of a multiplicity of recordable mediums—each of which is initially undifferentiated and unidentifiable one to the next save only for a permanent serial number marking that is visually detectable—that are written upon a multiplicity of successive times.

The method, and apparatus, of this aspect of the present invention successively reads, in an optical reader of the visually detectable permanent serial number marking that is upon each of the multiplicity of recordable medium, the serial number of each successive one of the multiplicity of recordable mediums. Each successively read permanent serial number is combined in a writer of the recordable medium with data that is to be written onto that particular recordable medium from which the permanent serial number was read, therein successively creating recordable images each of which is unique at least for reason of including a unique serial number. Each individual one of the multiplicity of recordable medium is successively recorded with its corresponding individually unique record image by the writer of the recordable medium.

By this method, and apparatus, the permanent serial number marking that was, and that remains, visually detectable on the recordable medium is also now redundantly recorded on the same recordable and recorded medium. This recorded number is called, quite logically, a "redundant serial number".

This redundant, recorded, serial number is subsequently read in a machine reader of the information recorded on the recordable and recorded medium. This machine reader need not, cannot and does not serve to detect (necessarily by optical means) the visually-detectable permanent serial number of the recordable and recorded medium.

Finally, a label-making machine receiving the read, redundant, serial number is used to produce a human-readable label. The label is suitable in size and form to be attached to the recordable and recorded medium. The label is attached, either by an automated labeling machine, or by a human who may optionally correlate the serial number that appears upon the label with the visually-detectable permanent serial number of the recordable and recorded medium, to the appropriate individual one of the multiplicity of recordable and recorded medium;

Notably, the information read from the recorded medium by the machine reader thereof may be more extensive that just the redundant serial number. The read information may include, for example (if originally written on the medium during the writing thereof) (i) a sequence number and/or a set number or any other index serving to identify an individual recorded medium, (ii) a name of the information written upon the recorded medium, (iii) a designated recipient of the recorded medium if such is to be distributed, (iv) a packing list of all related recorded medium likewise to be so distributed (if any such are), and/or an authenticating production number (separated from the serial number).

According to the fact that everything that is upon the human visually perceptible, typically printed, label that is upon each one of the multiplicity of recordable and recorded mediums is also written upon the medium itself, some certainty may be gained that the selected control information that is now detectable on the label is truly, properly, associated with an individual physical one of the multiplicity of recordable and recorded medium to which the label is now attached. Accordingly, a degree of security in labeling of a machine-readable medium is attained.

Notably, each of the reading and the printing of the label may permissively be done at a time after the writing of the multiplicity of recordable mediums, which are commonly optical discs and are more commonly CD-Ws. By the process of the invention large numbers of recordable medium, or discs, that are visually substantially undifferentiated and unidentifiable one to the next may become properly labeled.

3. Multi-Volume Sets of Recordable and Recorded Discs Where Pointers Written Upon Every Disc Permit Indexed Reference to the Entire Set from Any Individual Member Thereof In accordance with still another of its aspects, the present invention contemplates writing data to a multiplicity of recordable discs at and upon a multiplicity of successive times so as to create a multi-volume data set wherein one or more indexes to the complete data set are written upon each, and every, one of the discs themselves. The one or more "universal" indexes permits indexed machine usage of the set as single entity. By "indexed machine usage of the set as a single entity" it is meant that, although a human is typically called upon to identify a disc number n of N by a label affixed thereto, and to load such disc in a machine where it may be read, the human does not have to figure out which disc n (of N such, where N may be a huge number) is ultimately required. Instead, the human may initially place any disc 1, 2, 3, . . . N into the machine reader. A computer will read the one or more complete indexes (and possible sub-indexes to any or all of these indexes) to the entire, multi-disc, set from off any single disk of the set. The computer will compare an appropriate one or ones of the indexes (and also, if necessary, sub-indexes) read to the search query. The human will subsequently be told by the computer exactly where within the set of N discs resides that particular disc which contains the indexed information presently sought. (And when this disc is loaded, even should it be initially so loaded, the computer will read the sought-after information to the human.)

The method, an apparatus, of the invention for so writing data and one or more universal indexes to each disc of a set of such discs commences by segmenting in a computer a data file that is larger than the data storage capacity of a disc into disc-sized segmented data files, while generating (i) one or more tables of pointers, or indexes (and possibly also sub-indexes) to the successive portions of the segmented data files, plus (ii) a number N of the total discs required to record the aggregate segmented data files.

The (i) segmented data files, (ii) the table(s) of pointers, or index(es), and also (iii) the number N of discs required to record all segmented data files, are successively communicated from the computer to a disc writer. The disc writer develops a sequence, or volume, number 1 through N for each disc that it writes as it so writes the disc. The disc writer successively records the discs each with (i) an associated, successively communicated one, of the segmented data files, plus (ii) the table(s) of pointers, or index(es), plus (iii) the total number N of disc discs, plus (iv) the volume number 1 through N that is ascribed to the particular disk being written.

By this sequence all the successively recorded discs which form a set become usable as a single entity. This is because any one member of the set can be read subsequent to its recordation so as to tell—by reference to the table(s) of pointers, or universal index(es), recorded thereon—which particular volume (disc) of the set contains the data to which an indexed read reference is being made. This is true even when the particular disc presently being read is not itself that volume! If, by happenstance or by selection, the particular disk, one of N such, that is presently being read is indeed the volume, one of N such, that actually contains the data to which an indexed read reference is presently being made, then the actual data that is sought will immediately be read.

Accordingly, in accordance with this aspect of the present invention each member of the set of discs carries one or more table(s) containing pointers, or universal index(es), by which—in conjunction with the volume number of the individual disc—an indexed reference may be had to all the members of the set. Notably, no reference needs be made to any table(s) of pointers, nor any index, nor any indexes, that are outside of, and not present on, the set of discs themselves in order to make a proper and successful indexed (and sub-indexed) reference to any data that is within the entire data file as is contained upon all the discs of the set.

4. Automated Closed-Loop Positive-Control Distribution of Multi-Volume Sets of Recordable and Recorded Mediums In accordance with still another of its aspects, the present invention contemplates an automated method, and apparatus, for writing, and distributing to each of a number of recipients, a typically great number of digital-data-bearing mediums, typically CD-Ws, that form a set. The members of each set and the corresponding members of each of the several sets contain related information. Each recipient confirms to a central authority its receipt of an associated set. However, and notably, no recipient is required to make visual reference to the numbers or correctness of the members of its set as received in order that the central authority receiving the confirmations may know which, and all, data discs are received by which, and all, of the recipients thereof.

The automated method of so controlling data distribution commences with computer transmittals to a writer of recordable digital-data-bearing mediums. The computer transmits, and the writer receives, each of a relatively larger data file called a common data file and a relatively smaller data file called a control file. Each common data file is ultimate written in common onto a plurality of corresponding members that are within each of a plurality of recordable digital-data-bearing mediums that form a set. Each different common data file (as is associated with the corresponding members of all sets of the mediums) is communicated only but once. Conversely, each control file is uniquely associated with and to be uniquely written to an individual one of the multiplicity of the mediums. Each control file contains (i) a set identification of the unique set within which that particular medium to which the control file will be written is contained, (ii) a set member identification of the position within its set of that particular medium to which the control file will be written, (iii) an intended recipient of the disc, and (iv) a packing list of all the plurality of mediums that are within that set that will contain that particular medium to which the control file will be written.

The writer of the mediums receives each common data file and each unique control file transmitted from the computer, caching each common data file received for a time period until all corresponding members of each of the plurality of sets of the mediums have been written, at which time another, subsequent, common data file is received and cached. Each control file is combined with a cached common data file to create a single unique record image. This unique record image is written to a corresponding individual one of the multiplicity of the mediums, with first corresponding members of each of the plurality of sets of the multiplicity of mediums being recorded before second corresponding members of each of the plurality of sets and so on. The writer continues the receiving, caching, combining and the writing until all of the members of all of the plurality of sets of the multiplicity of mediums have been recorded.

Next, a machine reader of the written medium reads the control file of each of the multiplicity of mediums to ascertain the (iii) intended recipient, and (iv) packing list. From this read data, possibly (but not necessarily) as may be printed into shipping labels, packing lists and the like but which may, conversely be maintained in digital form, all ones of the multiplicity of mediums as are directed to each recipient are distributed as best as possible (meaning that errors may occur, as next discussed) from the location of the machine reader to each and every intended recipient. It is both countenanced and possible that some of the individual mediums will be improperly dispatched, mis-delivered as between designated recipients, or lost in transit.

A plurality of second machine readers of the mediums as are located at the plurality of recipients reads all the received members of the received set, whether such set is complete or incomplete and such members are correct or incorrect. By these second readings each recipient may ascertain (i) the set identification, (ii) the set member, (iii) the intended recipient of the disc, and (iv) the packing list, and generating a report of this information plus (v) the identity of the intended recipient.

Responsive to the reading, each recipient generates and transmits a report to a central authority, normally but not necessarily the authority where, and by whose auspices, the recordable mediums were written. The central authority is informed of a master distribution record of the totality of the multiplicity of mediums written, and to what particular recipient each particular medium was directed. The central authority compares the reports as are received from the plurality of recipients to the master distribution record in order to ascertain which, if any, of the mediums have been (i) misdirected and received by a recipient other than the intended recipient, or have been (ii) lost and not received by any recipient of all such recipients.

The central authority may then optionally take any desired action, normally including rectification of any systemic problems and restoration of lost or misdirected mediums to their intended recipients. If such restoration is accomplished, as is common, by the duplication of a new, replacement, medium then this medium bears certain information that bespeaks of its lineage. Accordingly, if fraudulently-recorded mediums bearing fraudulent information are substituted into service by stealth or otherwise, then the system can, while not being able to prevent such human subterfuge, at least create an audit trail at a central authority that becomes discordant with the user records of actual duplication(s) (or lack thereof), and use(s), of the mediums.

These and other aspects and attributes of the present invention will become increasingly clear upon reference to the following drawings and accompanying specification.

BRIEF DESCRIPTION OF THE DRAWINGS

FIG. 1 is a diagrammatic representation of the operational concept of the closed-loop, positive control, and automated system of the present invention for the volume production and distribution of individually unique compact discs, particularly in lieu of paper or microfiche/microfilm, which system is commonly called an Enterprise Authoring System, or EAS.

Figure 2:
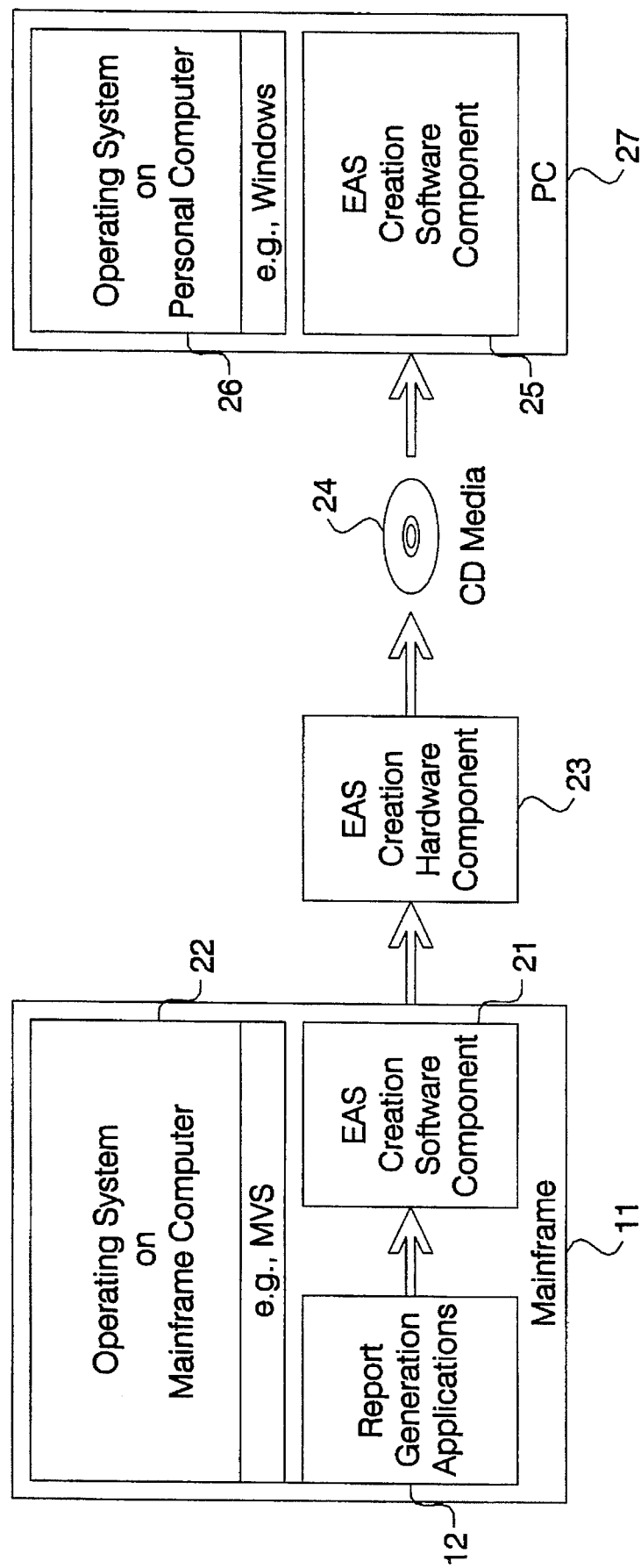

FIG. 2 is a diagrammatic overview, or first-level block diagram, of the EAS of the present invention previously seen in FIG. 1.

Figure 3:
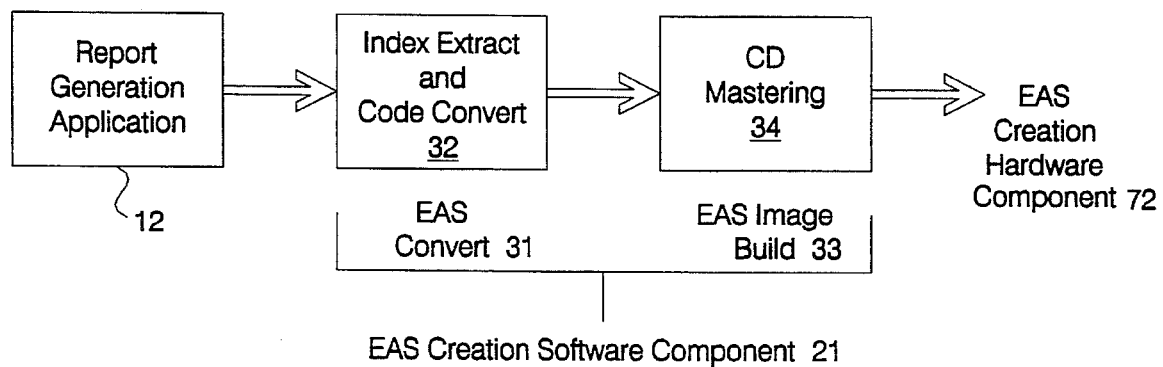

FIG. 3 is a diagrammatic overview, or first-level block diagram, particularly of the software components of the EAS of the present invention previously seen in FIGS. 1 and 2.

Figure 4:
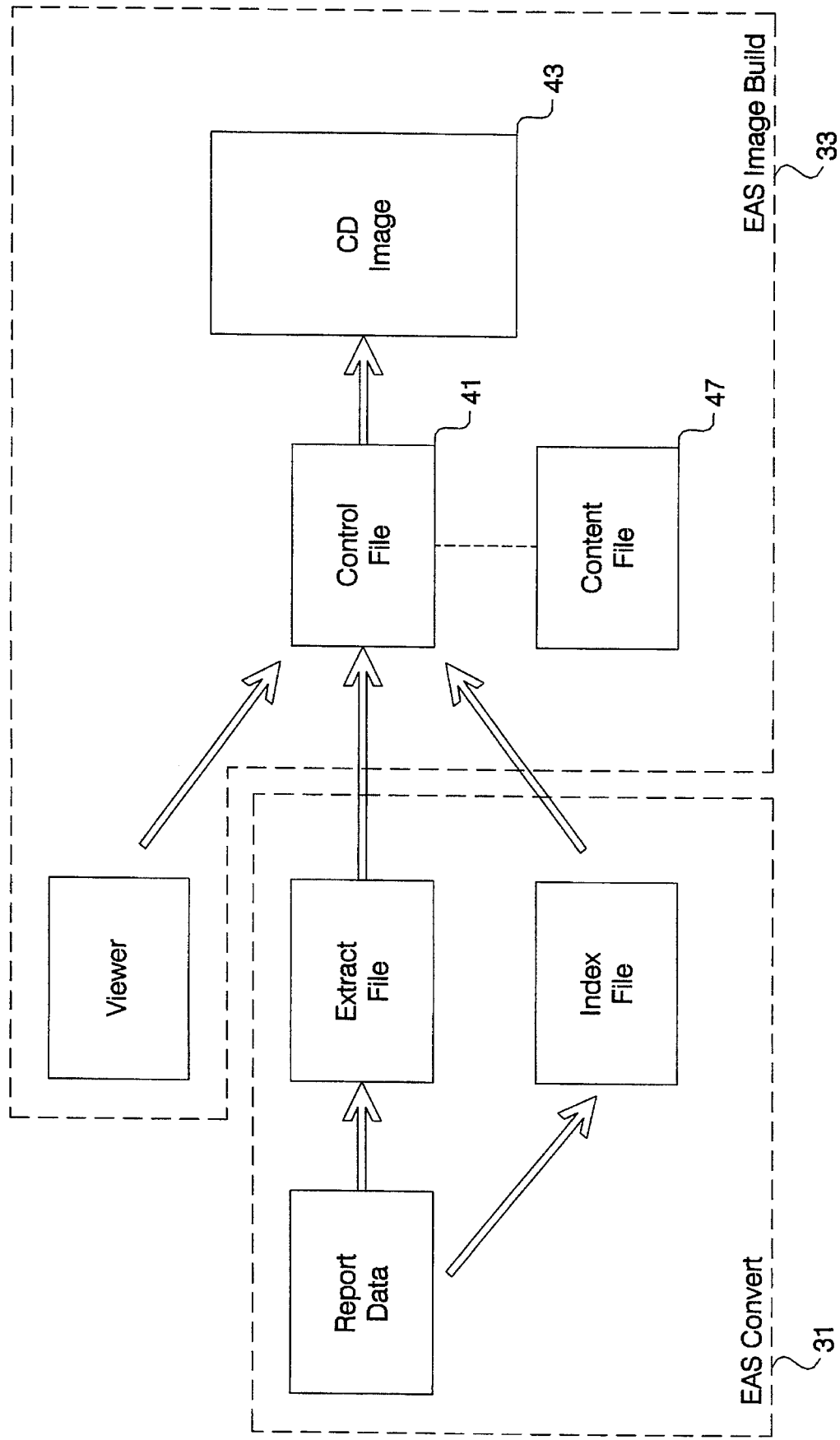

FIG. 4 is a second-level block diagram of the operational concept of two particular software components—a "CONVERT" program for converting data to ASCII format and an "ImageBuild" for producing CD-W images from the data so converted—of the EAS of the present invention.

Figure 5:
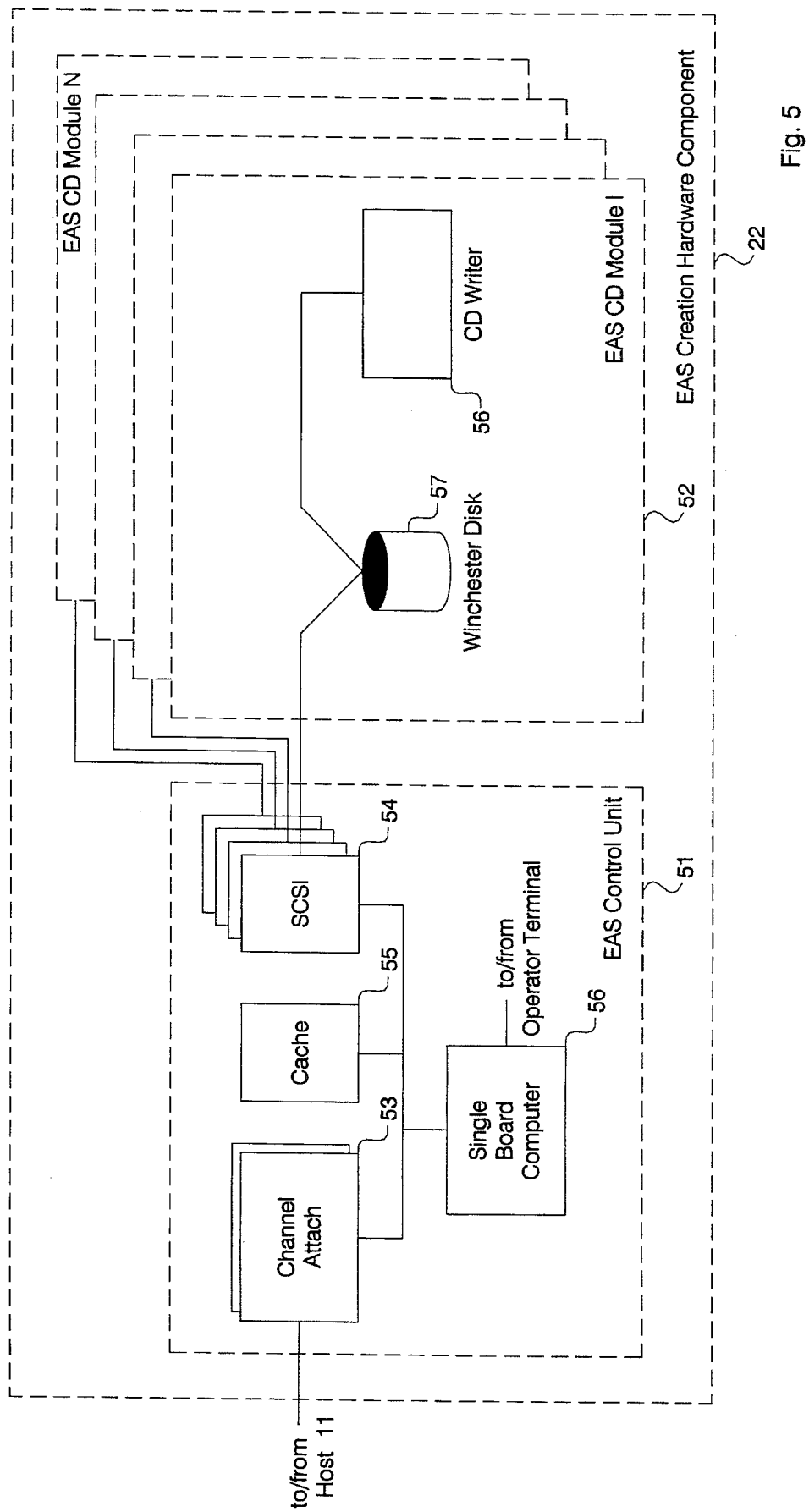

FIG. 5 is a second-level block diagram of two particular hardware components—an "EAS CONTROL UNIT" component for communicating and managing data in the form of CD-W images and a number of "EAS CD MODULEs" for writing the images onto CD-W—of the system of the present invention.

Figure 6:
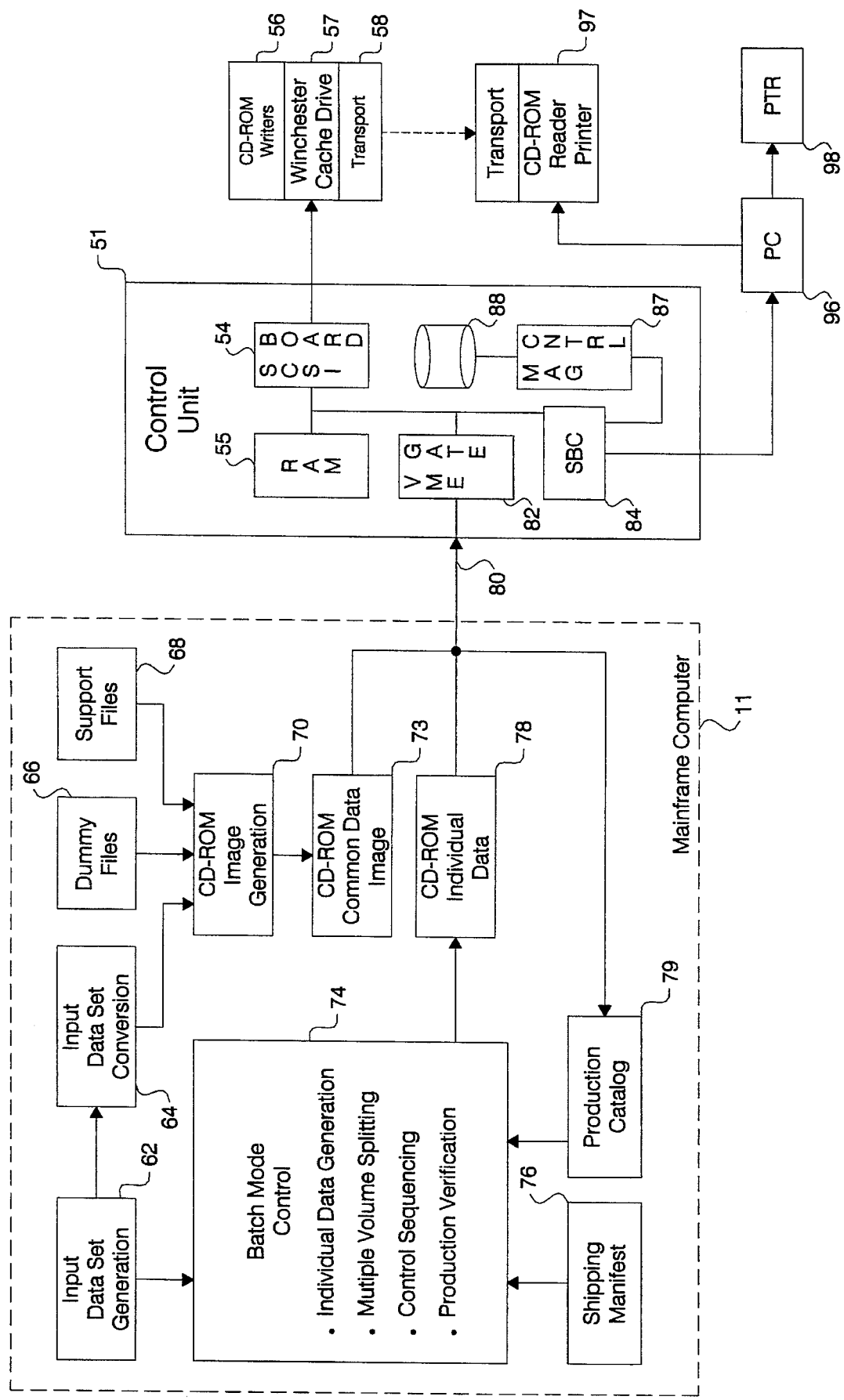

FIG. 6 is a third-level functional block diagram of the system of the present invention, which system is commonly called an Enterprise Authoring System, or EAS.

Figure 7A:
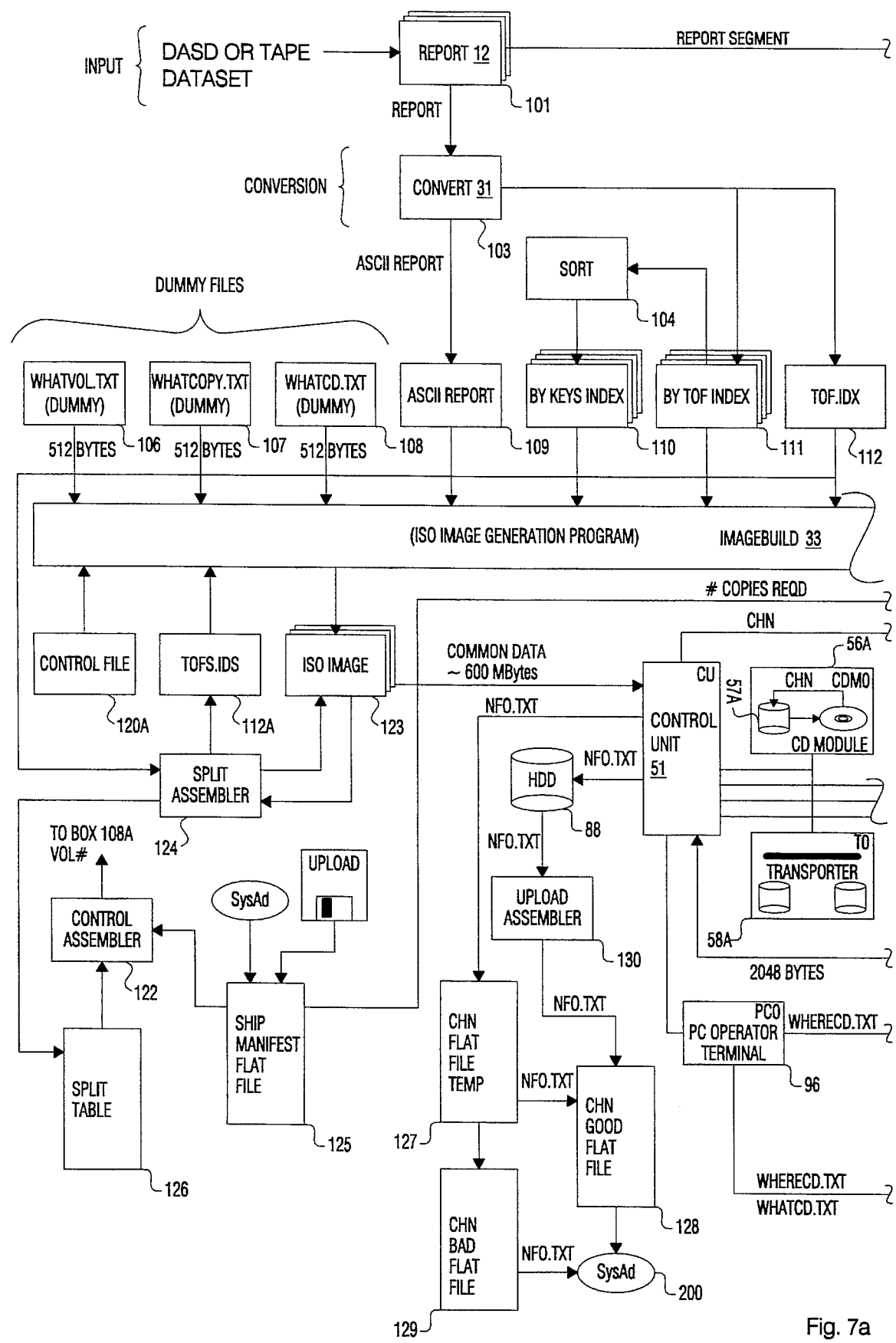
Figure 7B:
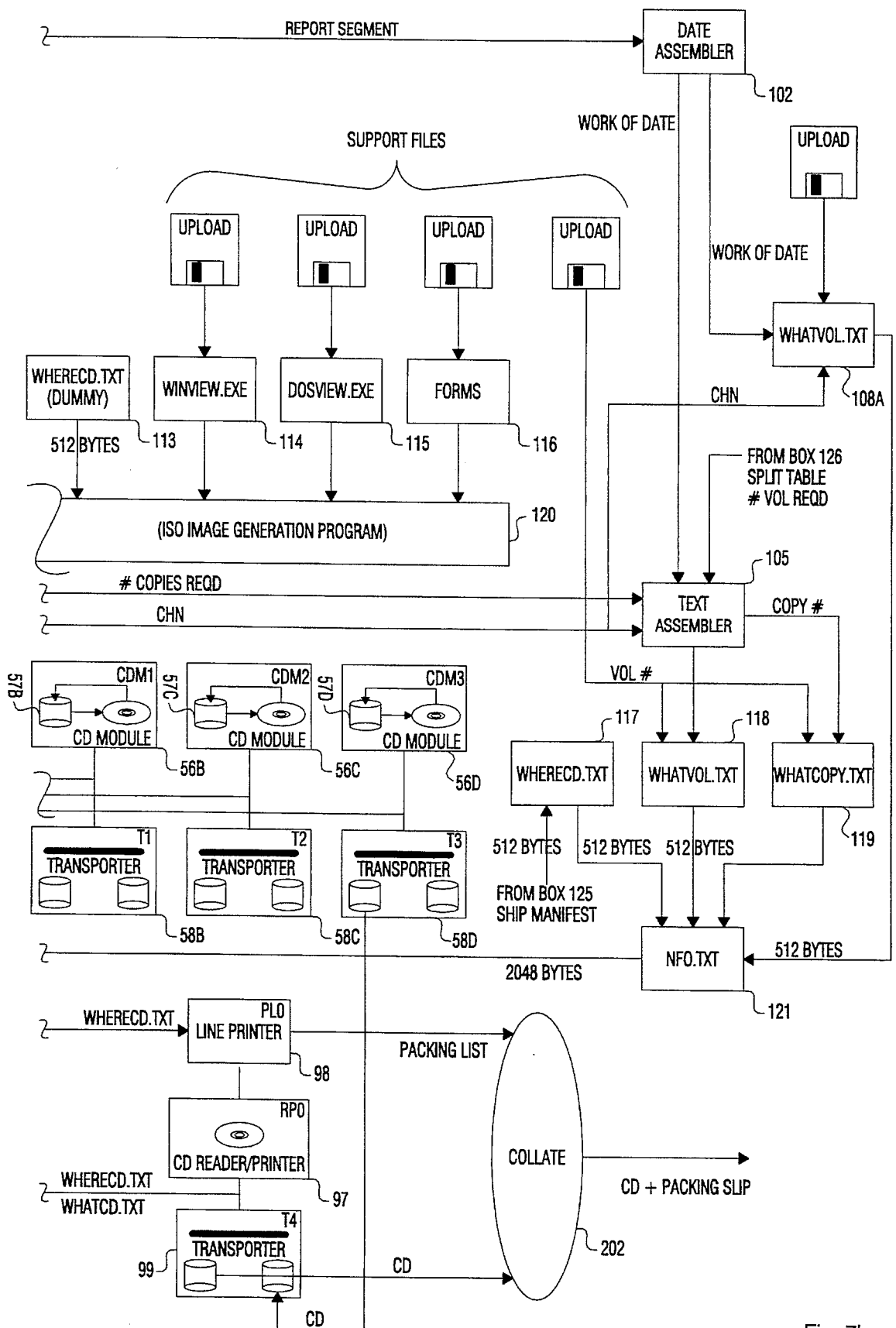

FIG. 7, consisting of FIG. 7a and FIG. 7b, is a detail hardware and software diagram of the preferred embodiment of the system of the present invention, which system is commonly called an Enterprise Authoring System, or EAS.

Figure 8A:
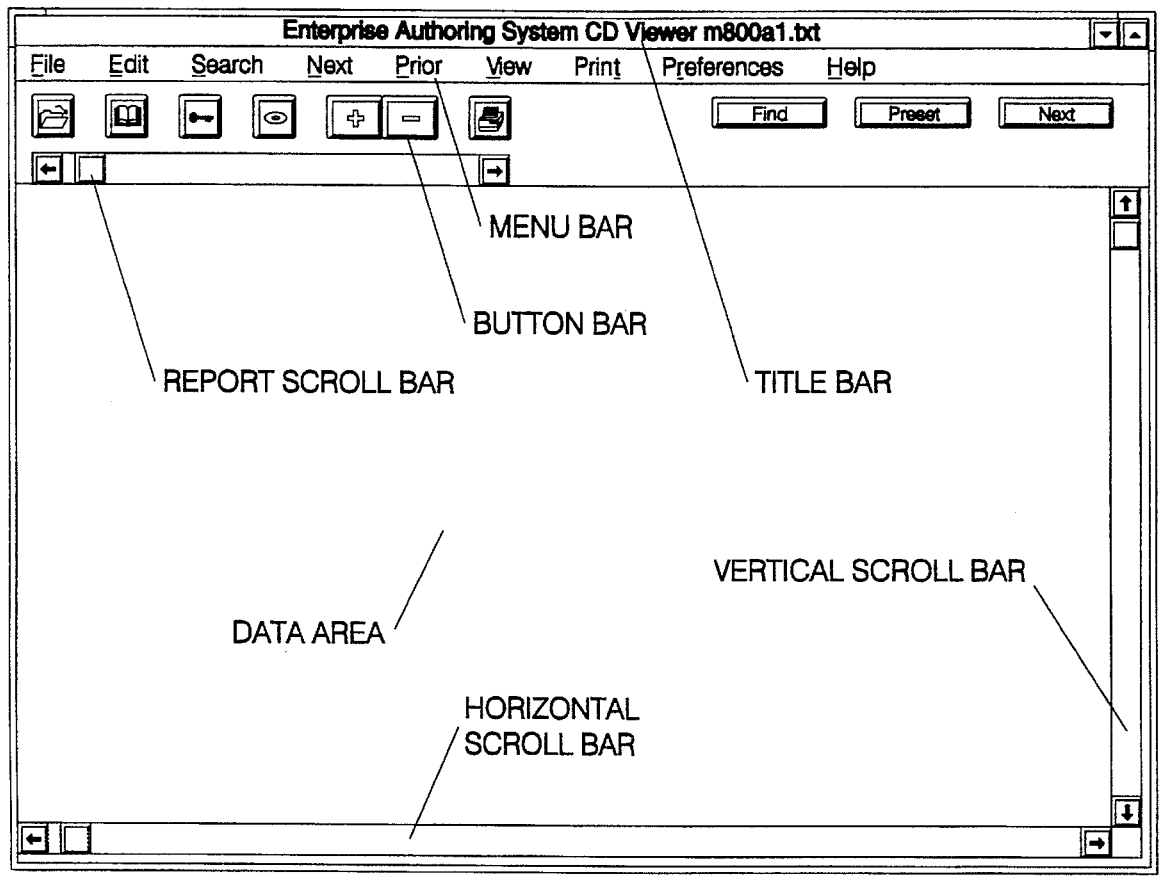
Figure 8B:
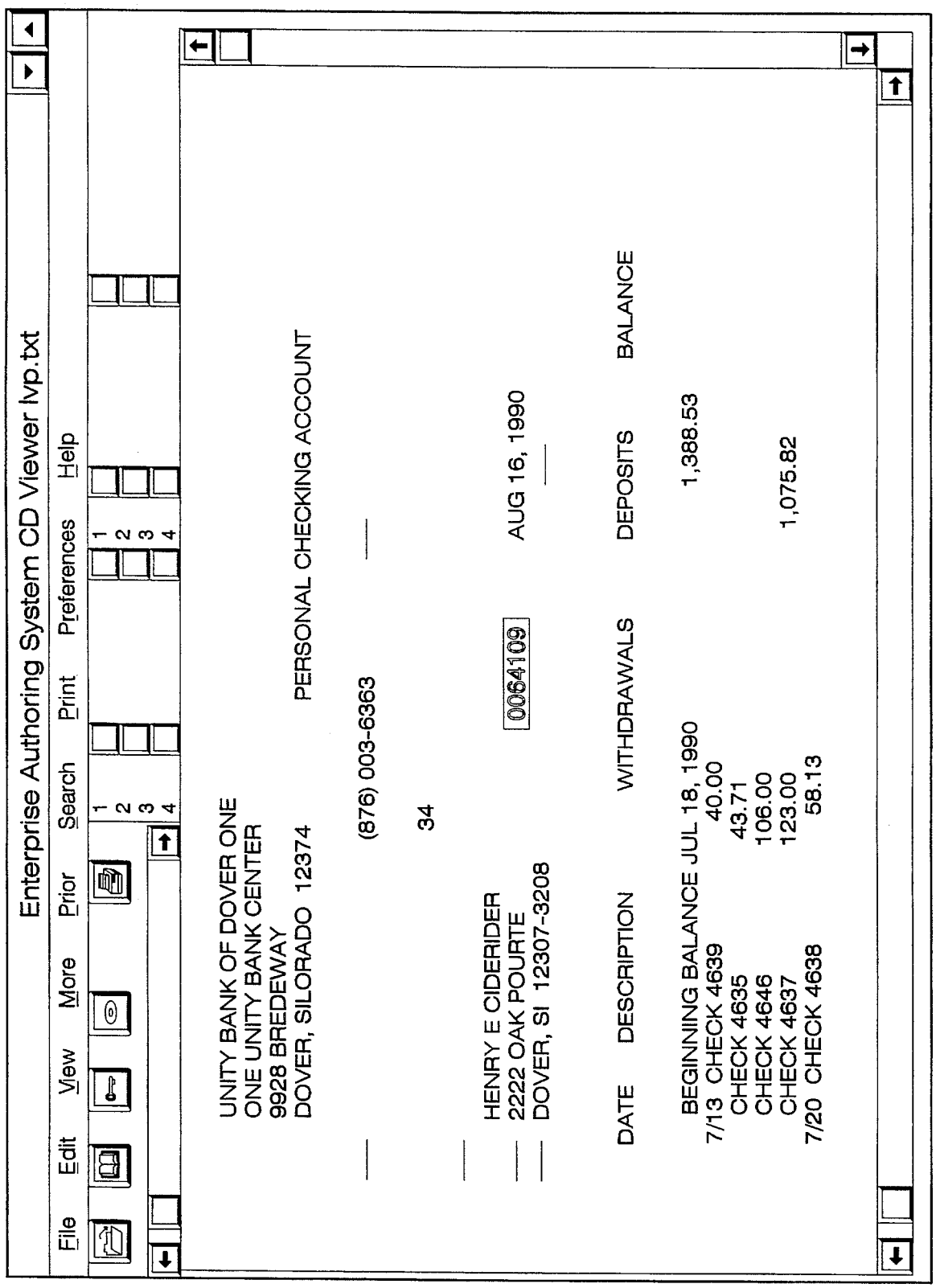

FIG. 8, consisting of FIG. 8a and FIG. 8b, is a diagrammatic representation of the preferred display screen at a PC, which screen is created by the preferred Viewer Program part of the EAS of the present invention, within which screen data read from CDs may be displayed.

Figure 9:
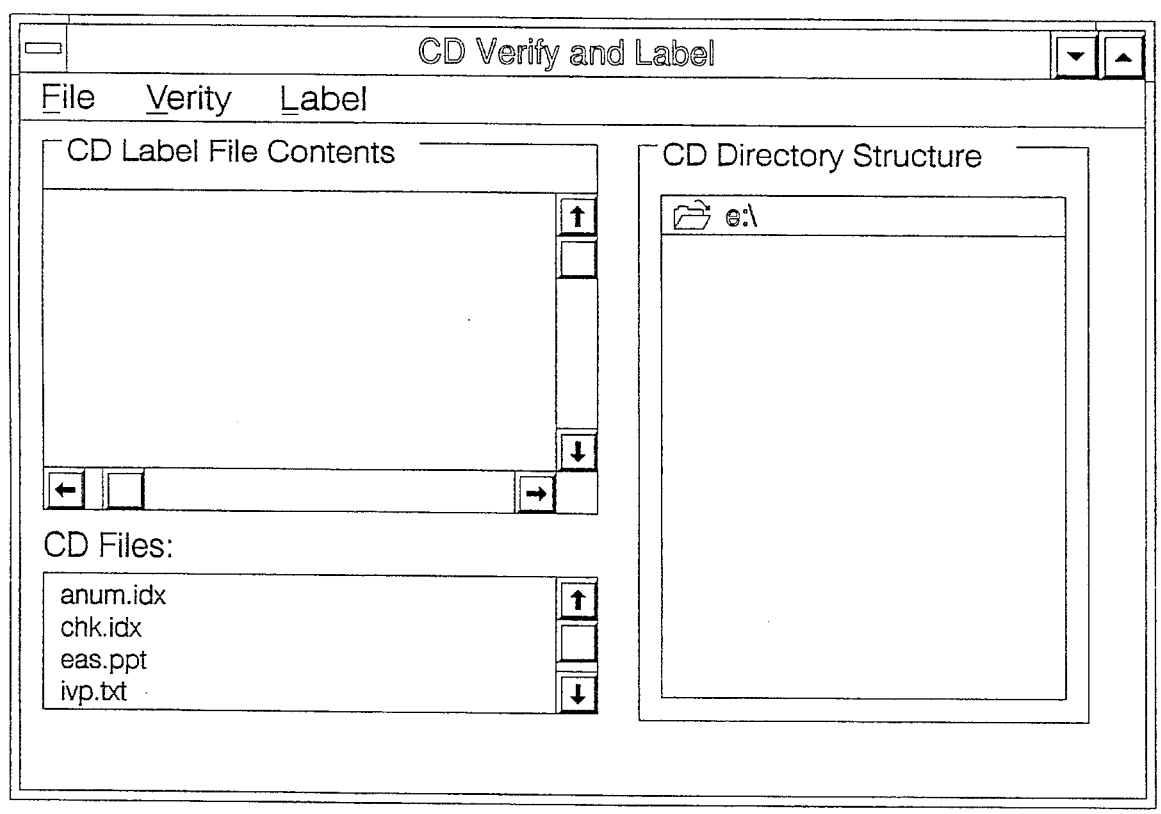

FIG. 9 is a diagrammatic representation of the preferred display screen commonly at an operator terminal, or EAS Control, PC, which screen is created by the preferred Label Printer Program part of the EAS of the present invention, within which screen labels written to and read from CDs may be displayed.

Figure 10:
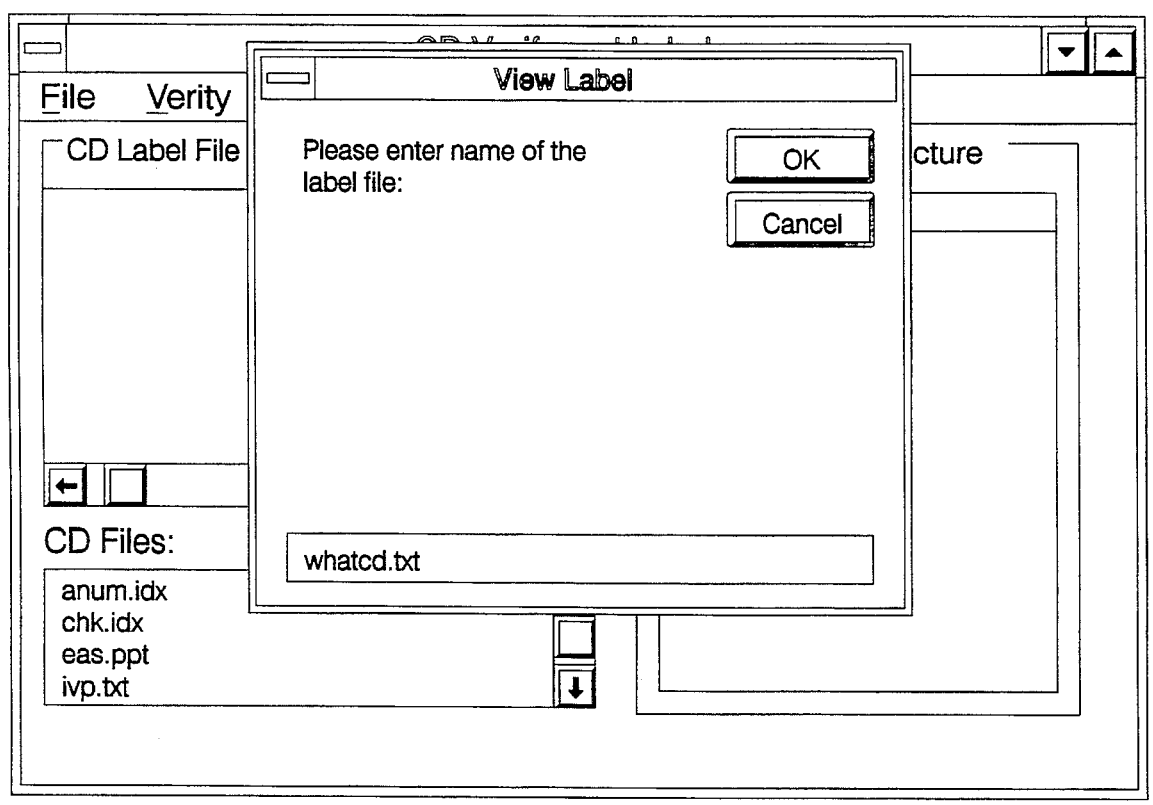

FIG. 10 is a representation of a dialog box superimposed on the display screen shown in FIG. 9, which dialog box is involved in use of the Label Printer Program to make labels on CDs.

Figure 11:
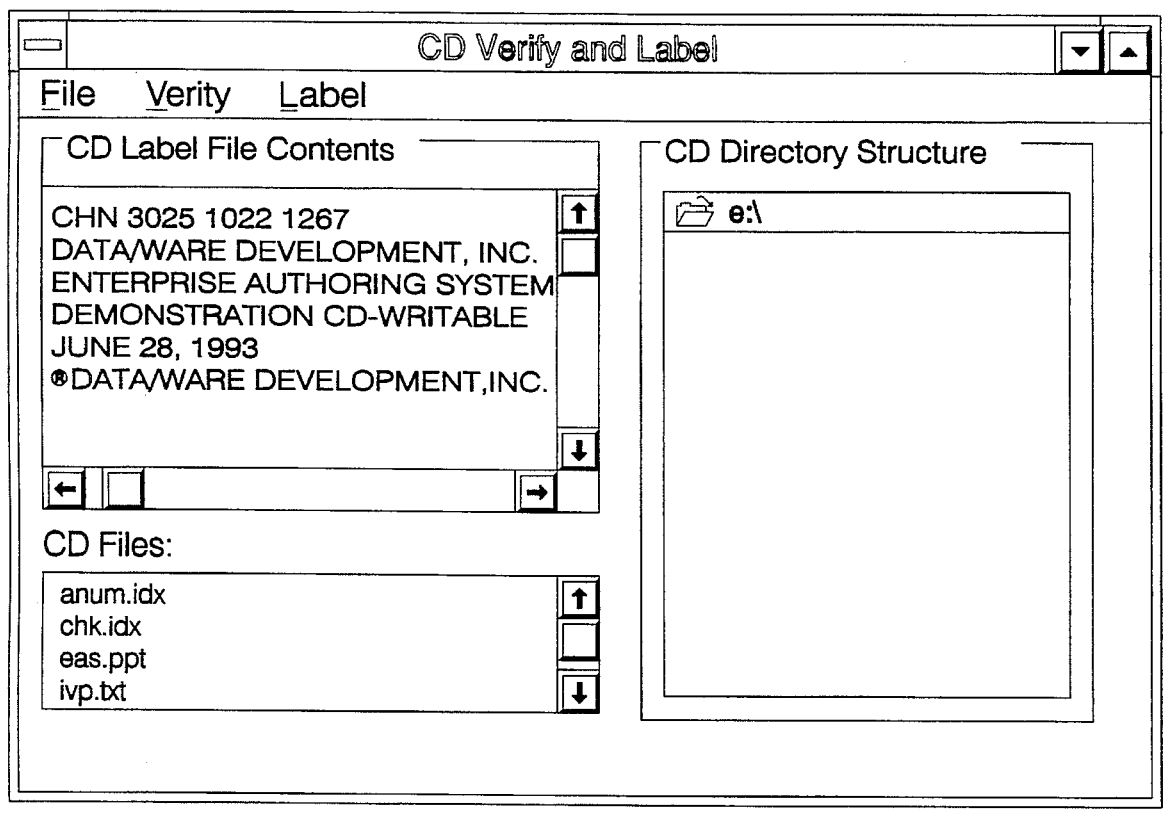

FIG. 11 is a representation of the appearance of the display screen shown in FIG. 9 at a time of an inspection of the label file prior to the printing thereof by the Label Printer Program onto a CD.

Figure 12:
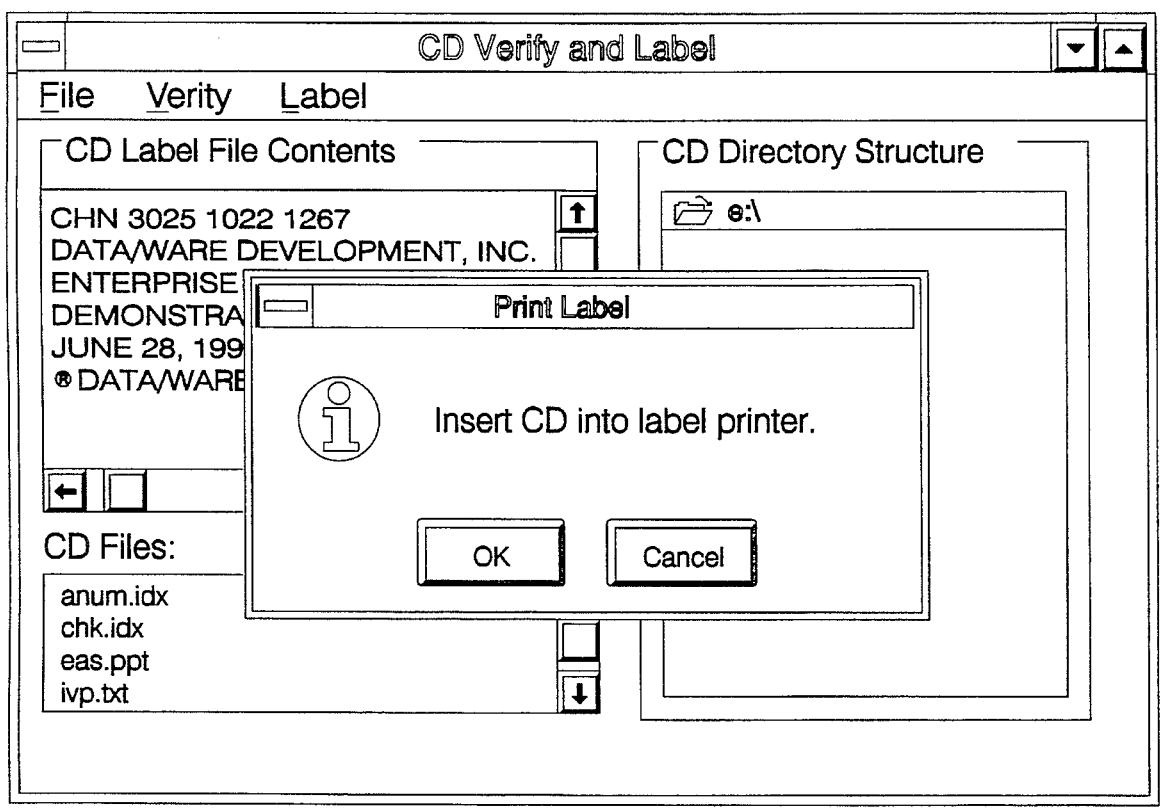

FIG. 12 is a representation of the appearance of the display screen shown in FIG. 9 at a time when a disc bearing a blank label must be inserted into the label printer, and the Label Printer Program enabled to print, via the Label Printer, a label onto a CD.

Figure 13:
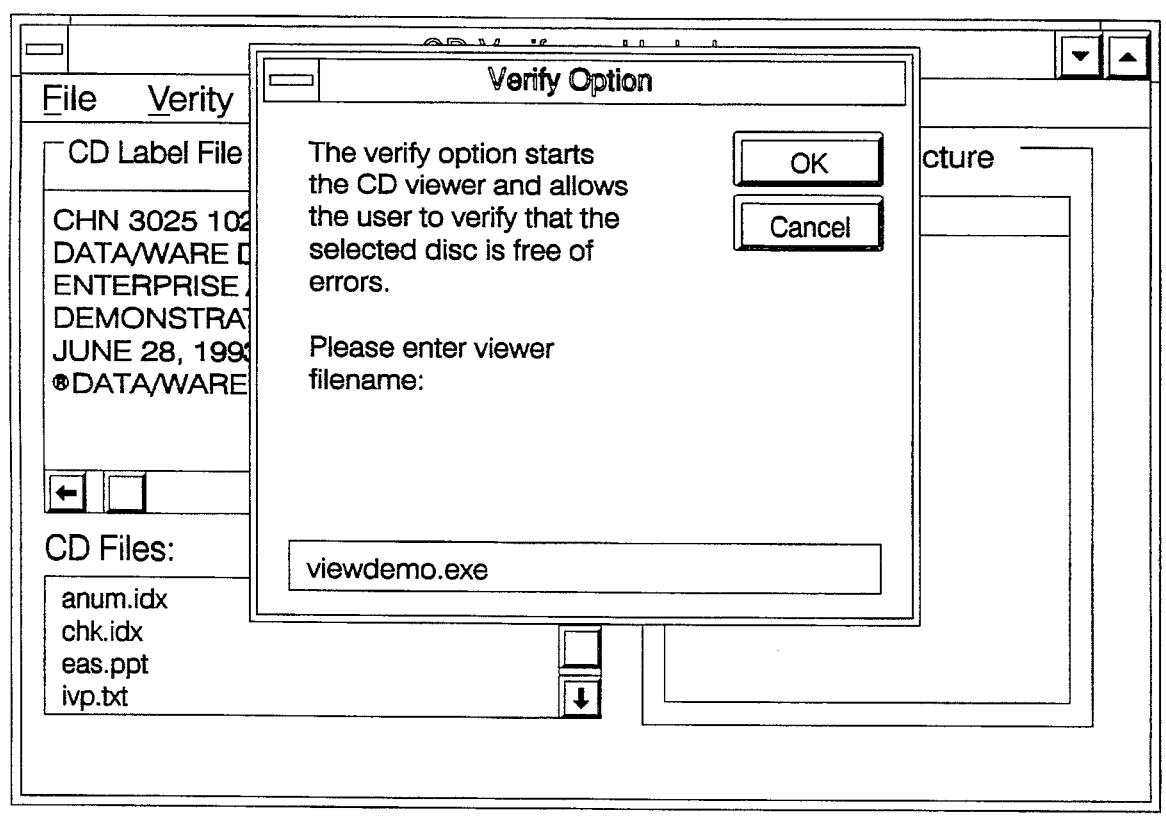

FIG. 13 is a representation of the appearance of the display screen shown in FIG. 9 at a time when a disc is to be checked for the presence of errors/verified that no errors are present.

Figure 14:
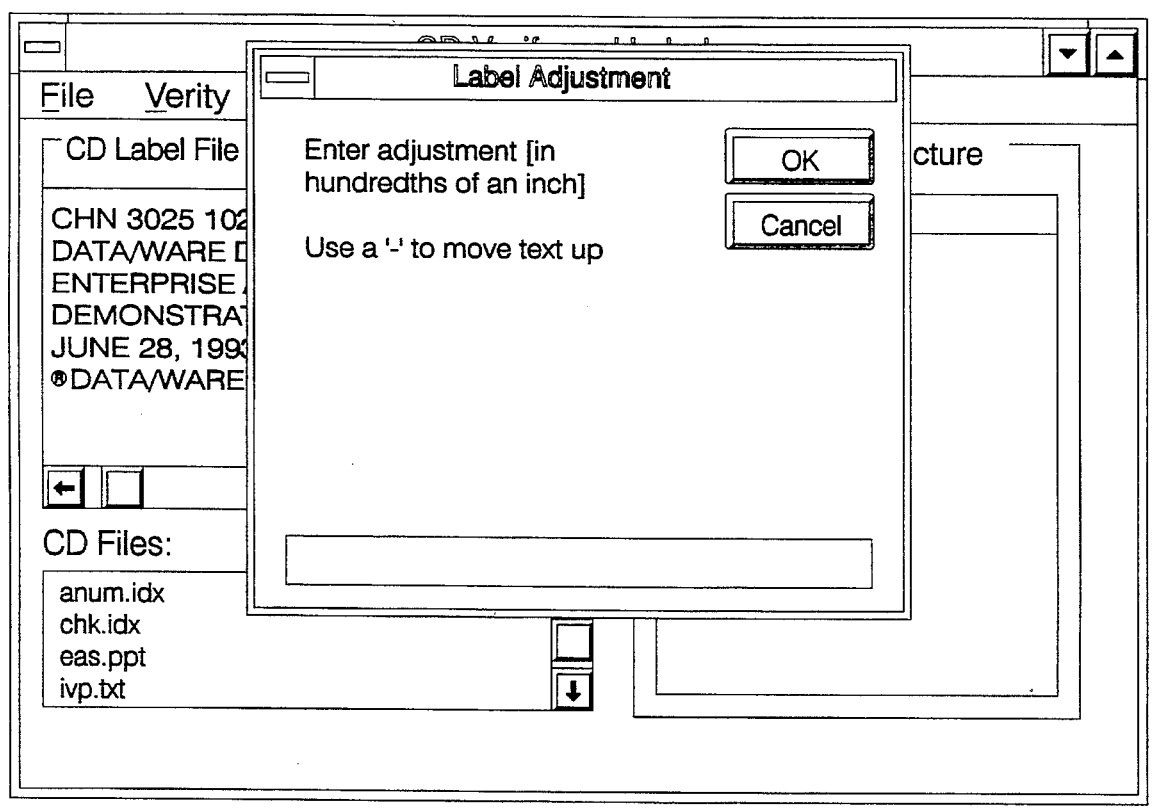

FIG. 14 is a representation of the appearance of the display screen shown in FIG. 9 at a time before printing of a label when the position of the printing may be adjusted.

Figure 15:

FIG. 15 is a pictorial representation of (i) a preferred CD medium of the present invention having and displaying both an encoded, and also a matching alphanumeric, "hub" serial number, (ii) a preferred form of a label that is affixed to the CD, with (iii) the CD being positioned in the caddy by which it has previously been fed to a label printer for the printing of the label that it now bears.

FIG. 16 is a pictorial representation of a preferred form of a packing list placed on a CD by the Enterprise Authoring System of the present invention that was previously seen in FIG. 1.

DESCRIPTION OF THE PREFERRED EMBODIMENT

1. Features of the Enterprise Authoring System of the Present Invention

The system of the present invention is called an Enterprise Authoring System™, or EAS™. (Enterprise Authoring, and EAS, are trademarks of Data/Ware Development Corporation, Inc., assignee of the present invention.) The Enterprise Authoring System incorporates two of the three essential elements of a CD distribution system—CD creation and CD retrieval. The user provides a third element: CD transport. Each of these elements may usefully be contrasted with alternative CD systems.

The Enterprise Authoring System, or EAS, of the present invention is directed to satisfying business requirements for cost effective, compatible, convenient data distribution. The user is intended to use the EAS conveniently in combination with other storage technologies and devices, augmenting, enhancing or replacing microfilm or paper-based data distribution. The EAS is particularly useful when the intended application requires (i) large data volumes (from megabytes to gigabytes) originating in IBM-compatible mainframes, (ii) distributed use and rapid access to data from PC and PC LAN systems, and/or (iii) permanent reference/archival storage with long media archival life.

A diagrammatic representation of the operational concept of the closed-loop, positive control, and automated system of the present invention for the volume production and distribution of individually unique compact discs, particularly in lieu of paper or microfiche/microfilm—which system is commonly called an Enterprise Authoring System, or EAS—is shown in FIG. 1. A Mainframe Computer (or Host) 11 executes Report Generation Applications software programs 12 to transfer data in disc image format to CD Hardware 13. The CD Creation Hardware 13 produces CD Media (for) Delivery 14, which are subsequently distributed to, and used by, Users on PCs 15. The EAS design provides an integrated solution to distributed data storage and retrieval needs. It allows a central authority to distribute to diverse, remotely-situated, personnel only the business data that these personnel need to perform their jobs.

1.1 CD Creation with EAS

The EAS of the present invention for CD creation is intended for high workload environments where many CDs are required to be made each night. This means that multiple writers and multiple processing sessions must be handled concurrently. The EAS achieves this by 1) using the EAS Creation Software Component running on the mainframe to do the data gathering, processing and authoring, creating a CD image "ready to write" as a 3480 tape image, then 2) using the EAS Hardware Creation Component to write the CDs with multiple CD writers.

1.2 EAS Overview

The Enterprise Authoring System (EAS) of the present invention is an integrated solution for high volume data distribution from IBM or similar mainframe environments to distributed PC and PC LAN environments. It addresses the need for data storage and retrieval which might otherwise be met by either (i) an on-line report viewing or COM viewing system, or (ii) a paper or COM data distribution.

The EAS system (i) performs data preprocessing on the mainframe to prepare the data for writing to CD media. It (ii) writes the prepared data on CD-Writable media. It (iii) supports viewing of the data on PCs or PC Local Area Networks (LANs) through PC operating systems, e.g. Microsoft Windows® operating system.

These three functions are implemented by three major components of the EAS: (i) the EAS Creation Software Component, (ii) the EAS Creation Hardware Component, and (iii) the EAS Retrieval Software Component. These three components are illustrated in FIG. 2, which FIG. 2 is a diagrammatic overview, or first-level block diagram, of the preferred embodiment of the EAS of the present invention previously seen in FIG. 1.

Referencing FIG. 2, the EAS Creation Software Component 21 is resident in a Mainframe (Computer) 11 (previously seen in FIG. 1 also running an Operating System of Mainframe Computer, e.g., MVS and Report Generation Applications 12 (previously seen in FIG. 1). The EAS Creation Software Component 21 is a set of software applications that prepare data to be written to CD media. This component consists of two primary elements, 1) the ImageBuild™ and 2) the Convert™ software. (ImageBuild, and Convert, are trademarks of Data/Ware Development Corporation, Inc., assignee of the present invention.).

The EAS ImageBuild software element, or equivalent, is required for all installations. EAS ImageBuild is an ISO formatting application which builds standard High Sierra Group (HSG) or ISO 9660 CD images. These two industry standards are universally recognized and used for storing data on CD media. The EAS Convert element is an optional offering which may be used to facilitate the extraction of index information from user data, and for other preprocessing functions. The output from Convert is used by ImageBuild.

The function of the EAS Creation Software Component is to prepare an image of the CD to be written. Once prepared this image is copied to the EAS Creation Hardware Component 2 by means of standard utilities, e.g., IEBGENER.

Referencing FIG. 2, the EAS Creation Hardware Component 22 is similar to the CD Creation hardware 13 shown in FIG. 1, but is somewhat more narrow for lacking certain utility features dealing directly with the CDs—such as label printing—that will be further discussed later. Accordingly, and for the moment, the EAS Creation Hardware Component 22 may be considered to comprise most of the CD Creation hardware 13. The EAS Creation Hardware Component 22 is a hardware subsystem that attaches by means of a channel to the user's pre-existing mainframe computer and that typically emulates a standard IBM 3480 cartridge tape subsystem. Data produced by the EAS Creation Software Component 21 is output to the EAS Creation Hardware Component 22 as a write to tape. This data is captured initially on high capacity Winchester disk drives which appear to the host as 3480 cartridge tape volumes. Once the entire CD image has been output and written on the Winchester disk, the EAS Creation Hardware Component 22 performs a copy operation to transfer the data from the Winchester disk to one or more CD media 25. (The collective CD media 24 constitute the CD Media (for) Delivery 14 shown in FIG. 1). The resulting CD media 24 contain all of the data originating from the mainframe application, formatted to be compatible with standard CD readers and MSCDEX.

The EAS Retrieval Software Component 25 is a software application which runs under an Operating System On (a) Personal Computer 26, e.g. under Windows® software on a compatible PC 27. The Retrieval Software Component 25 permits users to retrieve and view data. It also supports standard functions such as Copy and Paste. Thus it is possible to copy data from the mainframe application into other applications such as word processors or spreadsheets.

1.2.1 EAS Creation Software Component Overview

A diagrammatic overview, or first-level block diagram, of the creation software component of the EAS of the present invention (previously seen in FIGS. 1 and 2) is shown in FIG. 3. The creation process takes data that has been produced by a mainframe application and prepares it for writing to a CD-ROM disc. The data on the CD-ROM will be in industry standard format and will have retrieval functionality built in.

The creation process takes data that has been produced by a mainframe Report Generation Application 12 (previously seen in FIGS. 1 and 2) and prepares it for writing to a CD-W disc (a particular one type of the CD-ROM media seen in FIG. 2), The data on the CD-W will be in industry standard format and will have retrieval functionality built in.

Consider the example of distributing bank statement data. A user references the current edition microfiche to view statements. The application that generates the statement produces a data set representing the nightly statement run. It is indexed by another software application and then output to microfiche. By writing the data to CD, however, these same users can view the data on their PC equipped with a CD-ROM drive rather than on a reader/printer.

Users thereby have the advantage of easy access. They don't have to worry about someone else using the microfiche or someone misplacing it. In addition, they are able to use an indexing system designed specifically for their job.

Just as the data is indexed prior to writing to microfiche, so it must be indexed prior to writing to CD. After indexing, the data must be "mastered" (i.e. converted into the industry standard data structure defined for CD-ROM). This process consists of the three following major steps: (i) data creation by the application, (ii) data indexing, and (iii) mastering.

Mastering is performed by EAS ImageBuild, while indexing can be performed by EAS Convert or by an application that the user generates to process the data.

1.2.1.1 EAS Convert

Most often users want to retrieve and view data according to specific parameters which can be extracted from the data as indexes. These parameters may include account numbers, loan numbers or other unique identifiers. If this is the case, then some facility must be employed to extract these indexes and place them in a Data Set Name. This DSN then will be included in an ImageBuild Content File.

All of the indexes, along with the report data itself, are then written to the CD-ROM for subsequent use by the EAS Retrieval Software Component.

Referencing FIG. 3, the EAS Convert program 31 is a data conversion language, and program, that can be used to perform index extraction and data conversion functions, i.e, the Index Extract and Code Convert 32 shown in FIG. 3. The language of the Convert program 31 can be considered to be a specialized programming language, like "C" or COBOL, but which has been tailored to be easy to learn and use by including functions often required for the task at hand. As such, the Convert program 31 includes string manipulation and testing capabilities, data conversion capabilities, and simple input/output functions.

Data from a user's application can be read by a Convert program 31, processed, and written to a new Data Set Name (DSN). This DSN becomes one of the inputs to the ImageBuild software.

The user need not use Convert 31 to perform this function. If the user already has a "C" compiler or other mechanism for accomplishing index extraction, then this mechanism very likely can perform the required processing. Convert 31 may provide an easier method, and requires less programming expertise. The Convert 31 software, and function, is an option to the EAS of the present invention.

The operational concept of the Convert 31 software component is again shown, in a second-level block diagram relative to the first-level block diagram of FIG. 3, in FIG. 4. The role of the Convert program 31 to convert data later used (by the ImageBuild program 33) in producing CD-W images from the data so converted is clear.

1.2.1.2 EAS ImageBuild

The HSG or ISO industry standards for CD-ROM precisely specify the format of data recorded on CD media. This format definition makes CD-ROM an ideal vehicle for data distribution since it provides for a high degree of interchangeability. The EAS ImageBuild software produces these formats.

A CD-ROM must include a number of files in addition to the user's actual data to conform to the HSG or ISO standard. Some of these files are required to produce a DOS compatible file structure to enable the CD to be used in a PC like a floppy disk or hard drive. Other files contain information about the CD itself, when it was created, by whom, and for what purpose.

Referencing FIG. 3, ImageBuild program 33 builds these files from data sets and arranges them in accordance with the HSG or ISO standard. The operational concept of the ImageBuild software program 33 component is shown, in a second-level block diagram relative to the first-level block diagram of FIG. 3, in FIG. 4. The role of the ImageBuild program 33 is to produce CD-W images from the converted data, or CD Mastering 34 as this is called in FIG. 3.

The ImageBuild 33 uses a Control File 41 to specify such information as disc labels, dates, directory names, and the order of directories in the CD-ROM image. The Control File 41 also specifies the Content File 42 for each directory that will be built. The Content File 42 specifies Report Index Data, and certain file attributes. The Content File 42 also specifies how the MVS filename is to be converted to a PC filename.

To use ImageBuild, the user constructs a number of Data Set Names (DSNs) that represent the "boiler plate" of his/her CD-ROM. These are the standard files included in the HSG or ISO CD-ROM image like the copyright file, abstract file, bibliography file, etc. To these files the user adds, via the Control File 41 and Content File 42, the day's data and indexes plus the viewer which ultimately will be executed on the PC by the users. ImageBuild will order all of these files into DOS compatible directory structures and produce an exact image of the CD-W, or the CD Image 43. This Image 43 will most often be constructed on DASD then copied by utility to the EAS Creation Hardware Component for writing to CD media.

ImageBuild 33 also includes a format checking facility which can be used when establishing a new CD layout. Once a layout has been shown to work properly, subsequent daily runs need not be checked.

1.2.2 EAS Creation Hardware Component Overview/Subsystem Overview

The EAS Creation Hardware Component 22 (previously seen in FIG. 2) includes (i) a channel-attached Control Unit which emulates the IBM 3480 tape subsystem, combined with (ii) one or more CD Modules which emulate IBM 3480 tape drives. By using the emulation technique a compatible interface is assured making it unnecessary to modify the IBM operating environment.

The Control Unit attaches by means of one or more Bus & Tag interfaces to the IBM channel. It may share the channel with other control units and devices. The Control Unit is capable of running multiple CD Modules, which are housed in groups of four in a separate enclosure. This modular design permits easy system expansion to accommodate growing CD production requirements or the desire for redundant equipment.

A second-level block diagram of the EAS Creation Hardware Component 22 (previously seen in FIG. 2) is shown in FIG. 5. The contained hardware components—the EAS Control Unit 51 component for communicating and managing data in the form of CD-W images, and a number of EAS CD Module(s) 52 for writing the images onto CD-W—are visible.

1.2.2.1 Control Unit Description

Referencing FIG. 5, the EAS Control Unit 51 is a high performance design employing multiple processors, or Channel Attach 53, to achieve high speed transfers on the Bus & Tag interface and to the CD Modules. The channel transfer rate to/from Host (mainframe computer) 11 (shown in FIGS. 1 and 2) is up to 4.5 Megabytes/second per Bus & Tag interface. The Control Unit 51 attaches to each CD Module 52 through a dedicated SCSI interface 54 capable of sustaining over 1 Megabyte/second per CD Module. Rate buffering between the channel attach 53 and the SCSI interface 54 is accomplished through an internal cache 55 memory. All internal transfers are protected by error check codes, end-to-end.

The Control Unit includes an operator interface in the form a Single Board Computer 56 connecting to a CRT and a keyboard (not shown), i.e. PC that emulates the functionality of the like IBM 3480 equipment. Switches and indicators found on the IBM equipment are replicated by means of function keys and CRT messages. The CRT/keyboard also supports internal diagnostic functions, error logging functions, dial up/dial out service functions, and specialized status display functions.

1.2.2.2 CD Module Description

Referencing FIG. 5, each CD Module 52 is a self-contained unit that includes the CD writer 56 and a Winchester disk drive 57 connected on a SCSI bus which leads to the Control Unit 51. CD writers 56 have the characteristic that once a write has started it must be completed without interruption. If the write is interrupted, then the CD-W (the CD media 24, shown in FIG. 2) will be unusable. For this reason the data for a CD-W is staged completely onto the associated Winchester disk 57. Once the entire data to be written to the CD-W is resident on the Winchester disk 57 then a write can be started under the auspices of the Control Unit 51 with assurance that it will proceed without interruption. This also results in lower Bus & Tag utilization since data is transferred from the host 11 (shown in FIGS. 1 and 2) onto the Winchester disk 57, which is considerably faster than the CD writer 56.

1.3 EAS Software Retrieval Component Overview

The retrieval of data written to CD occurs on the user's desktop through PC and PC LAN based systems. Typically three generic retrieval engines which are then customized to match the characteristics of the data and the needs of users. These three engines are normally designed for the following: line mode data, Xerox XPDS data, and IBM AFP™ data. (AFP is a trademark of International Business Machines Corporation.)

Each of these data stream types has a unique set of handling requirements. In addition to handling different data stream types, the Retrieval Software Component (viewer) will support different user environments. In general, the viewer supports browse, seek, search, find, and edit functions. It also permits the user to change the size and type of the fonts that he/she sees on his/her screen, as well as the size and type of fonts that he/she sends to his/her printer.

A typical, preferred, screen for the EAS CD Viewer Program is shown in FIG. 8a, an the screen with typical contents is shown in FIG. 8b. The function, and screens, of the Viewer program will be further discussed in section 6 of this specification.

The viewer is compatible with PC operating systems, e.g. Microsoft Windows and supports data interchange with other applications. This permits the user to copy data into a word processor or spreadsheet for incorporation into correspondence or analysis.

1.4 Getting the Work Done

When a user buys an office copier then he/she has a choice of features and speeds. The user can get a sorter/collator, 2-sided copying, and a range of copying speeds in pages per minute. The user's selection depends on the number and kinds of copies that he/she needs to make. CD writing systems also offer a selection of features and speeds. The EAS of the present invention is positioned as a "top of the line" CD writing system, offering the maximum performance available with today's writer technology, and a modular expandable architecture that permits incorporation of improved writers when they become available.

As discussed, writing a CD is really a two step process: (i) preparing the data to be written, and (ii) writing the CD. The EAS of the present invention applies several unique techniques to achieve maximum performance in both of these steps.

Data preparation in the EAS environment is performed using the processor which generated the data in the first instance, e.g. the MVS host computer of the user. The high I/O bandwidth, and the availability of cached DASD enable a low MIP mainframe to outperform a high MIP workstation in many data intensive applications. Such is the case in performing the processing for CD writing.

Remember that the EAS receives its data from the host mainframe over the Bus & Tag channel attach. The burst rate of this path is 3 or 4.5 Mbytes/sec depending on the channel. The sustained rate is about 1 Mbyte/sec. This means that transferring a full CD to the EAS takes about 10 minutes. Alternate systems transfer data by communication paths or by manual tape interchange. Again the issue here is throughput—how many CDs can be made in a single shift. Remembering that in general the cache for the CD writer is either 1) receiving data to write to a CD or 2) writing data to a CD; you can be doing either one or the other and not both. With EAS a full CD takes 10 minutes to download and 30 minutes to write—the user makes a CD every 40 minutes while his/her writer is idle 25% of the time. If the download process occurs at 100 Kbytes/sec instead of 1 MByte/sec then the user's system will take 100 minutes to download and 30 minutes to write —the user making a CD every 130 minutes while the writer is idle 75% of the time.

If the user's data is important then the user should bear in mind the extensive error checking facilities built into the EAS Creation Hardware Component. Unlike most PCs and many workstations the EAS hardware has full end-to-end data protection. The user would normally have to buy, circa 1994, the very latest top end PS/2 from IBM to get a PC that has so much as parity checking on the bus as the EAS system has. The EAS includes full checking on the Bus & Tag interface, full memory checking, full SCSI checking and end-to-end check codes appended to every transfer.

Not only does the EAS ensure that user data arrives and is written without error on the CD disc, it provides a mechanism for positive disc identification and tracking. If the user uses Kodak®Infoguard® media with the EAS then the user can take advantage of the bar code media serial number. (Kodak and Infoguard are registered trademarks of the Eastman Kodak Company, Incorporated.) The EAS will, in order, do the following: 1) read the bar code off the media before it writes the data to the disc, 2) incorporate the bar code into a special identifier file residing on the disc, 3) print a label for the CD having the serial number on it, and 4) transmit the serial number to the mainframe so the user can build and maintain a CD management system much like the user's tape management system.

This closed loop CD identification system is unique to the EAS, where large numbers of CDs are to be created.

1.5 Hub Numbers and Eyeball Characters

When a microfiche is held in the hands its general contents can readily be identified by the "eyeball characters"—human readable characters exposed in the film not requiring a reader/printer to view. These eyeball characters serve a number of useful purposes both for the users and the COM machine operators, chief among these being that they prevent or reduce the likelihood that the wrong data is delivered or retrieved. In large part security with fiche, i.e. ensuring that only authorized users receive certain data, is implemented through careful observation of the eyeball characters in the production and delivery process.

An important feature of the EAS is a similar system of positive identification making use of the hub number incorporated on the CD-W media, notably the Infoguard media manufactured by Eastman Kodak Company. Kodak's Infoguard® CD-W media (Infoguard® is a registered trademark of Eastman Kodak Company, Inc.) is manufactured with a unique bar code and human readable hub number imprinted on every piece of media.

A pictorial representation of the preferred Kodak Infoguard CD-W medium is shown in FIG. 15. Both the bar-coded, and also a matching alphanumeric, "hub" serial number are visible. (The CD-W also mounts a label, and is positioned in the caddy by which it has previously been fed to a label printer for the printing of the label that it now bears.)

The writer used in the EAS is able to detect and read this bar code then incorporate it in a special file written on the disc. This file contains information about the data written on the disc, like the DSN or application. This file always has the name WHATCD.TXT. It can be accessed under Windows using the standard Windows Notepad application. The user can always determine exactly the contents of a CD by viewing WHATCD.TXT.

In addition to incorporating the hub number directly in the data on the CD, the EAS delivers the hub number back to the host processor. The CD creation software in the host can then build this hub number into a host resident database of all CDs created by EAS. This database provides a cross reference of CD Hub Numbers (CHN) to data sets in the same way that the user's existing tape catalog provides a cross reference of Data Set Names (DSNs) to data sets.

1.6 Labeling CDs

A human cannot read the tiny pits written onto a CD with the naked eye. Accordingly, a convenient system of identification is required. Using the CD Hub Number (CHN) and the CD catalog constructed on a mainframe computer, the user can identify any CD by cross reference. The user can employ the optional EAS CD Label Printer to print labels for CDs at the time of creation. The EAS CD Label Printer reads the WHATCD.TXT file off the CD and reproduces it directly on the CD medium or on an adhesive backed paper label especially designed for CD media. This label positively identifies the CD—it uniquely ties together the physical media hub number, the hub number embedded in WHATCD.TXT and the label.

By employing this EAS-unique positive three-way identification the user can be certain that the correct data is delivered day after day.

1.7 Masters and Duplicates

Many times one microfiche is made as a master and several duplicates ("dupes") are then created for distribution. This is convenient if multiple users require simultaneous access to the fiche or if users are physically separated. The EAS can eliminate the need for many dupes since often the CD can be accessed across a network and shared by several users. When a duplicate CD is required the EAS has the ability to build a second CD immediately after the first. Since the image of the CD is first loaded onto the EAS Winchester drive associated with each CD writer, a second write can be commanded and a duplicate CD produced. This duplicate will of course have its own hub number embedded in its WHATCD.TXT file and will be uniquely labeled.

The user can duplicate a CD by returning it to the EAS and asking for a copy. If an additional copy of a CD is required then the user can load it into the EAS writer and copy it to the associated Winchester disk drive. The user can then command the EAS to write as many copies of the CD as he/she requires, again embedding the unique hub number of each piece of media into the WHATCD.TXT file.

1.8 Compression

It is possible to compress report data in the mainframe prior to authoring and writing on the CD. The compression technique can be simple or complex depending on the number of mainframe MIPS that the user is willing to invest to save space on a CD. In any case the associated decompression software should be written on the CD with the retrieval software to ensure that years from now the correct decompressor is readily available when the data is needed. This is a tradeoff which must be made for each individual application—whether the benefit gained in compression is worth the cost of the cpu time and the media lost to adding the decompressor to the disc. Of course, since the user can't presently append to a disc, compression would normally serve only if it allowed the user to save an entire disc, i.e. kept a multi disc report from spanning onto yet another CD.

1.9 Encryption

Security for on-line systems is achieved through password control, while security for distributed data is accomplished through physical control, i.e. a "fiche break" is employed wherein only the data that all users of a particular fiche with less than the maximum number of frames being used. If the user cannot put several files of data together on a single disc due to security concerns then the user can implement a "CD break", intentionally leaving a CD only partially full in order to separate data onto another CD.

Encryption permitting multiple users data to be written on a single CD while still maintaining security is a potential, and envisioned, add-on to the EAS of the present invention.

2. Enterprise Authoring System—Architectural Overview and Description

2.1 Introduction

As previously explained, the system of the present invention is preferably called an Enterprise Authoring System™, or EAS™ (Enterprise Authoring System and EAS are trademarks of the assignee of the present invention: Data/Ware Development, Inc.). It is so called because it is concerned with the writing of works commonly arising from enterprise; i.e., business records.

The EAS of the present invention is a combination of mainframe software, mainframe channel attached hardware, and PC software collectively designed to permit volume production of uniquely-identified, but generally related, CDs. The EAS is particularly concerned with the volume production of CDs that are distributed in lieu of distributing the same data on paper or microfiche.

The EAS is described in the several sections and referenced appendices of this section 2 which (i) describes the EAS mainframe architecture in detail and (ii) serves as the definitive statement of the system functionality for the purpose of design, implementation, use and extension. The following section 2.1.1 describes the specification and design of the EAS in accordance with "what" the system does, whereas following sections are more concerned with "how" to implement the EAS.

2.1.1 Overview of the Block Diagram

The Enterprise Authoring System (EAS) of the present invention is shown in a relatively higher-level block diagram in FIG. 6, and in a relatively more detailed block diagram in FIG. 7. Both block diagrams illustrate the individual hardware and software components of the EAS that are required for understanding the architecture. Each box on the block diagram is assigned both (i) an ID number, and (ii) a label, for identification. Reference to boxes on the block diagram will be made by both ID numbers and labels. Paths are shown on the block diagram illustrating flow of data or control between the elements, of boxes.

The elements, and element functions, of the higher-level block diagram of FIG. 6 should, to some degree, be understandable by the discussion already ensuing. In a mainframe computer 11 (previously seen in FIGS. 1 and 2), and Input Data Set (for) Generation 62 undergoes conversion as INPUT SET CONVERSION 64, is combined with DUMMY FILES 66 and SUPPORT FILES 68, and is further processed by CD-ROM IMAGE GENERATION 70 to produce CD-ROM COMMON DATA IMAGE 73. All this processing transpires under a BATCH MODE CONTROL 74, which serves to perform INDIVIDUAL DATA GENERATION, MULTIPLE VOLUME SPLITTING, CONTROL SEQUENCING, AND PRODUCTION VERIFICATION. A SHIPPING MANIFEST 76 and a PRODUCTION CATALOG 79 are input to this process. The CD-ROM COMMON DATA IMAGE, and the CD-ROM INDIVIDUAL DATA 78 as is produced by the BATCH MODE CONTROL 74 in respect of the parameters of the individual CD-ROM image (and CD-ROM) that is under production, are transferred by channel interface 80 to the CONTROL UNIT 51 (previously seen in FIG. 5).

The CONTROL UNIT 51 actually receives, and manages the data, via a VME GATE operating under the control of an SBC that also serves, via a MAG Control 87, to control a disk 88. These elements, and this structure, are taught within the predecessor patent application Ser. No. 07/633,265 filed on Dec. 12, 1990, for VIRTUAL ADDRESSING OF AN OPTICAL STORAGE MEDIA AS MAGNETIC TAPE EQUIVALENTS, the contents of which application are incorporated herein by reference.

Basically, the CONTROL UNIT 51 functions, by the teaching of the predecessor patent application, to accept both (i) data—which is destined for writing to CD-ROM—and also (ii) control, that is appropriate to a magnetic tape unit! In this manner, and although all of the features of the present invention are operative, the mainframe computer 11 does not know, through its use of an I/O handler, but that it is communicating with a magnetic tape unit.

The common and unique data to be written to the CD-ROM is buffered through the RAM 55 and, via the SCSI BOARD 54 internal channel interface, laid onto the WINCHESTER CACHE DRIVEs 57 of the CD-ROM WRITERs 56. The TRANSPORT 58 rotates the CD-ROM while the CD-ROM writers cause continuous transfer of the data (in CD-ROM image) from the WINCHESTER CACHE DRIVEs to the CD-ROMs, writing the CD-ROMs.

An external PC 96 serves as an operator console, and as the EAS system controller. This PC 96 has its own attached CD-ROM READER PRINTER 97 (most often a reader and a separate printer) for (i) reading CD-ROMs, and for (ii) writing the label on a CD-ROM. Another, conventional paper, printer 98 is also attached to PC 96 for printing shipping invoices, history reports and the like.

2.1.2 Identification and Description of Boxes on the Block Diagram

Reference now the detail EAS diagram of FIG. 7, consisting of FIG. 7a and FIG. 7b.

The REPORT box 101 represents the reports that are to be processed, indexed and written to Compact Disc (CD). A CD may contain multiple different reports, hence this box 101 is illustrated as a multiple box entity.

The DATE ASSEMBLER box 102 represents the DATE ASSEMBLER software program. This program serves to extract the 'work of date' from the report and uses this date to update the date in the file WHATCD.TXT.

The CONVERT PROGRAM31 (previously seen in FIGS. 3 and 4) of box 103 represents the CONVERT software program available from assignee of the present invention Data/Ware Development, Inc., San Diego Calif. 92121, or any equivalent software conversion program. This program serves to process a report so as to produce (i) an ASCII version of the report and (ii) associated, required, index files. The particular CONVERT program of Data/Ware Development, Inc., written in the CONVERT language, serves to so produce the (i) ASCII report and (ii) index from source data that is originally in EBIDIC code. Other conversion programs converting raw data from other codes function commensurately. The conversion program operates as if a CD has unlimited capacity.

The SORT box 104 represents the SORT utility software program, a program used to re-order indexes extracted in report order into index order.

The TEXT ASSEMBLER box 105 represents the TEXT ASSEMBLER software program. This program serves to update the information in the WHERECD.TXT, WHATVOL.TXT and WHATCOPY.TXT files. NOTE: Boxes 102, 105, 122 and 124 are illustrated as distinct entities for the purpose of clarifying the explanation of the functionality achieved, while in actual implementation these functions may all be a single program.

The WHATVOL.TXT file of box 106 serves to identify a CD as being a particular volume number of a multi-volume set. It is a fixed length file, normally of 512 bytes, and may also, if unused, be a dummy file.

The WHATCOPY.TXT file of box 107 is a file that identifies a CD as being a particular copy number of a multi-copy set. This file is nominally a 512 byte file, and may be a dummy file.

The WHATCD.TXT file of box 108 is a file that identifies a CD as containing a particular report or collection of reports from a particular date. This file is nominally a 512 byte file, and may be a dummy file.

The ASCII REPORT of box 109 represents a REPORT data file in ASCII code as has been converted to PC compatible character set and prepared for viewing. This version of the report may be larger than a CD capacity when first prepared by the box 103 CONVERT PROGRAM, but will be pared by box 124 SPLIT ASSEMBLER.

The BY KEYS INDEX of box 110 represents the BY KEYS INDEX, being indexes extracted from the report and sorted by key order.

Similarly, the BY TOF INDEX of box 111 represents the BY TOF INDEX, being indexes extracted from the report by page occurrence order.

It will be recognized that, in accordance with the principles of the present invention to formulate, and to use, universal indexes, that the indexes extracted from the report can be of various (i) types, (ii) numbers, and (iii) potential interrelationship(s) (i.e., related as index and sub-index). Accordingly, the BY KEYS INDEX of box 110 and the BY TOF INDEX of box 111 should be considered in both (i) type and (ii) number to be exemplary only, and not to be limiting of the different types and numbers of indexes that are susceptible of being constructed by a practitioner of the programming arts, and that may constitute various files, and hierarchical files.

The TOF.IDX of box 112 represents the TOF.IDX file, which file contains the file offset for the top of form for each page. The TOFS.IDS box 112A represents the TOFS.IDS file, which file indicates where a volume split occurred in the index structure, i.e. which offset represents the zero reference for each volume of a multi-volume CD set.

The WHERECD.TXT of box 113 represents the WHERECD.TXT file, a file that serves to identify the delivery destination for a CD. It is a fixed length dummy file.

The WINVIEW.EXE of box 114 represents the WINVIEW.EXE software program, a Windows-compatible viewer for the report contained on the CD. (Windows is a registered trademark of Microsoft Corporation.) This "file" consists of multiple files uploaded for the viewer including .EXE, .DLL, .VBX, etc.

The DOSVIEW.EXE box 115 represents the DOSVIEW.EXE software program, a Disk Operating System (DOS) compatible viewer for the report contained on the CD. This "file" consists of multiple files uploaded for the viewer including .EXE, .DLL, .VBX, etc.

The FORMS of box 116 represents the FORMS file, which file contains the overlays required to display an image of the reports contained on the CD (may be .WMF or similar).

The WHERECD.TXT of box 117 represents the WHERECD.TXT file. This is the actual file to be written on the CD, as built from the SHIPPING MANIFEST FLAT FILE of box 125 updated by the CHN.

The WHATVOL.TXT of box 118 represents the WHATVOL.TXT file. This is the actual file to be written on the CD, as uploaded and subsequently modified by the TEXT ASSEMBLER program of box 105 according to the SPLIT TABLE of box 126 updated by the CHN.

The WHATCOPY.TXT of box 119 represents the WHATCOPY.TXT file, which is the actual file to be written on the CD. The WHATCOPY.TXT file is represented as uploaded, and as subsequently modified by the TEXT ASSEMBLER of box 105 according to the SPLIT TABLE of box 126 and the SHIP MANIFEST FLAT FILE of box 125 updated by the CHN.

The IMAGEBUILD of box 20 represents both the program and control files of the IMAGEBUILD program 33 (previously seen in FIG. 3). This is the program and control files used to format the various files into an ISO 9660 CD image.

The CONTROL FILE of box 120A represents the CONTROL FILE that contains and provides the rules to Image-Build for constructing the CD.

The NFO.TXT of box 121 represents the NFO.TXT file. This file is a combined file incorporating the WHERECD, WHATVOL, WHATCOPY and WHATCD files. The file is of a fixed length.

The CONTROL ASSEMBLER of box 122 represents the CONTROL ASSEMBLER program, which program manages the processing.

The ISO IMAGE of box 123 represents the ISO IMAGE file. This file contains the image in accordance with the ISO 9660 standard ready to be written to a CD.

The SPLIT ASSEMBLER of box 124 represents the SPLIT ASSEMBLER software program. This is the assembly program that determines the size of the image which would be created subsequent to the operation of the CONVERT program 31 of box 103, and splits the report into segments if required, updating the index files to reflect the volume assignments.

Box 125 is the SHIP MANIFEST FLAT FILE. The SHIP MANIFEST FLAT FILE is a file that specifies the number of copies of a particular CD or CD Set and the delivery destination of each copy or set.

The SPLIT TABLE of box 126 represents the SPLIT TABLE, being a table constructed by SPLIT ASSEMBLER of box 124. This table specifies the actions taken to split a report for multiple CD volume production.

The CHN FLAT FILE TEMP of box 127 represents a file "CHN FLAT FILE TEMP" which is a temporary file for holding the CHN data for a CD prior to knowing that the CD was correctly written.

Likewise, the CHN GOOD FLAT FILE of box 128 represents a file "CHN GOOD FLAT FILE", which is a file that captures certain information about each CD written. When the CD is verified written correctly this file is updated from the CHN FLAT FILE TEMP of box 127.

Likewise, the CHN BAD FLAT FILE of box 129 represents a file of the same name that captures certain information about each CD written. When the CD is verified written in error this file is likewise updated from the CHN FLAT FILE TEMP of box 127.

The UPLOAD ASSEMBLER of box 130 represents the UPLOAD ASSEMBLER software program. This program uploads the database from the Control Unit Hard Disk Drive HDD 88 and adds it to CHN GOOD FLAT FILE of box 128.

The boxes CDM0, CDM1, CDM2, CDM3 56a–56d represent the up to four hardware CD Modules. Each of the CD modules includes the pre-staging Winchester disc 57a–57d and all the rest of the elements that comprise each CD Writer 56 previously shown in FIG. 5.

The CU box 51 represents the EAS Control Unit 51 (also previously seen in FIG. 5). This EAS Control Unit 51 attaches to the mainframe Bus & Tag channel, and interfaces to the CD Modules of boxes 56a–56d.

The boxes 58a–58d represent the robotics transporters that move CD media through the respectively associated CD Modules 56a–56d.

The PC0 box represents the PC 96 that serves as the EAS Operator Terminal. This PC 96 interfaces to the CD Reader/Printer 97 and its associated Transporter 99 of box T4, and also to the Line Printer 98 (all previously seen in FIG. 6).

The LP0 box represents the Line Printer 98 which is used to print shipping documents.

The RP0 box represents the CD Reader/Printer 97 that can both read a CD and print on the media surface.

The T4 box represents the robotics transporter 99 that moves CD media through the associated CD Reader/Printer 97.

The SYSAD oval 200 represents the human System Administrator who manages the CD creation process. Likewise, the COLLATION oval 202 represents the human personnel who physically match CDs with Packing Slips.

2.2 General Description—A Single Volume Example

This section provides a simplified general description of the operation of the EAS system using the case where a single report, which is known to occupy a single CD is processed and written with a single CD copy being output.

The process starts at box 101, which is the input report, This report is written by an application to a tape or DASD permanent dataset or the JES queue.

When the writing application is complete the job scheduling system will start the box 122 CONTROL ASSEMBLER program.

The box 122 CONTROL ASSEMBLER causes the box 102 DATE ASSEMBLER to run which processes the input report by extracting the work of date from the report, converting this date to an appropriate ASCII format and inserting these bytes into the reserved location in the box 116 file WHATCD.TXT.

The box 122 CONTROL ASSEMBLER causes the box 103 CONVERT to run which processes the input report and extracts all of the indexes, building thereby the box 107 ASCII REPORT file containing the ASCII version of the report), the box 108 BY TOF INDEX file containing the indexes as extracted in report order, and the box 106 TOF.IDX file containing the indexes to the top of form of each page.

After a sort by box 104 SORT, the box 109 BY KEYS INDEX file is also created, which file is ordered by key order as a result of the sort.

(Box 114 WINVIEW.EXE, box 115 DOSVIEW.EXE and box 116 FORMS have been previously uploaded to the mainframe and exist as files. The box 106 WHATVOL.TXT and the box 107 WHATCOPY.TXT have been previously uploaded to the mainframe and exist as files which need not be modified (at this point in the processing) since the report is known to occupy a single CD and only one copy of the CD is to be produced. (i.e. the volume number is "1 of 1" and the copy number is "1 of 1".))

The box 122 CONTROL ASSEMBLER now causes box 120 IMAGEBUILD to run which builds an ISO 9660 image from the contents of boxes 106 through 116 and places it in an output dataset box 123 ISO IMAGE, verifying that the capacity of a single CD was not exceeded.

The box 122 CONTROL ASSEMBLER then waits for a CD Module to become available for writing and then copies the dataset of box 123 ISO IMAGE to the available writer through the Control Unit 51 (of box CU).

Through a coordinated process, the box CU Control Unit 51 and the box 122 CONTROL ASSEMBLER act on a number of mount messages which result in blank media being loaded by a transporter 58x of box Tx from the media input spindle of box Tx into the tray of the CD Writer 56x in box CDMx, where x is an integer from 1 to 3.

When the CD is spun up the hub number is read by the CD Module 56x of box CDMx and is copied into a reserved location on the Winchester 57x in the same box CDMx.

The box 122 CONTROL ASSEMBLER causes a read operation capturing the hub number and writes this information into dataset box 127 CHN FLAT FILE TEMP and incorporates this CHN within boxes 117, 118, 119 and 120.

Subsequently, the box 128 NFO.TXT is built by concatenating boxes 117, 118, 119, and 120 transferred by a write operation to the Control Unit 51 (of box CU) to tape VSN CDNFO.

The Control Unit overlays this virtual tape image onto the previously transferred ISO IMAGE to create the final CD image.

The box 122 CONTROL ASSEMBLER then issues mount CDCPY to cause the write to the CD.

When the CD is completely and successfully written then it is moved by CD Module 56x of box CDMx onto the output spindle, and the contents of boxes 117, 118, 119, 120 are concatenated and copied into box 128 CHN FLAT FILE. If an error occurs in the write and the CD is unusable the contents of boxes 117, 118, 119, 120 are concatenated and copied into box 129 CHN BAD FLAT FILE. Through a manual process the output spindle of the CD Module 56x of box CDMx is moved to the input spindle of transporter 58x of box Tx. The PC Operator Terminal box 96 executes a program which successively actuates Transporter 58x of box Tx. When the CD written in this process is loaded into the tray of the CD Reader/Printer 97 then the file WHATCD.TXT will be read by the PC 96 and printed on the face of the CD. The file WHERECD.TXT of box 117 will be read and printed on the face of the CD and/or on the Line Printer 98. The CD will then be moved by the transporter 58x of box Tx onto its output spindle. By a manual process the CD will be removed from the output spindle and packaged with the printed packing list for delivery to the customer.

These actions are summarized in the following table 2.2:

TABLE 2.2

Single CD / Single Copy Operational Description

| Step | By | Action |
| --- | --- | --- |
| 1 | Application | Generate report |
| 2 | 122 Control Assembler | Start job |
| 3 | 102 Date Assembler | Extract date, insert into box 108 WHATCD.TXT |
| 4 | 103 Convert 31 | Process report, build ASCII version and index files |
| 5 | 104 Sort | Sort index files |
| 6 | 120 ImageBuild 33 | build ISO image |
| 7 | 122 Control Assembler | MWRTCD issue mount, write ISO image |
| 8 | CU Control Unit 51 | mount blank CD, get hub number |
| 9 | 122 Control Assembler | tape read |
| 10 | 122 Control Assembler | update CHN in boxes 117, 118, 119, 108A, and 127 |
| 11 | 122 Control Assembler | MCDNFO issue mount and write fixed length bytes |
| 12 | CU Control Unit 51 | overlay fixed length bytes into ISO image |
| 13 | 122 Control Assembler | MCDCPY |
| 14 | CU Control Unit 51 | perform CD write |
| 15 | 122 Control Assembler | read fixed length bytes, update box 128 or 129 according to status |
| 16 | CU Control Unit 51 | empty tray, place CD on output spindle or discard bin |

2.3 Detailed Description—A Multi-Volume Example

This section provides a detailed description and specification of each box and PATH shown on the Block Diagram in the order of execution of a generic CD creation process. The process described herein requires that report RPT1 is processed onto a multi-volume, multi-copy CD set.

First, the RPT file of box 101 is created by an application and is written to a DASD dataset.

Then the box 122 CONTROL ASSEMBLER is started when the RPT file of box 101 is available.

The box 122 CONTROL ASSEMBLER starts box 102 DATE ASSEMBLER which reads the RPT1 file (of box 101) and extracts the work of date from the report and writes this date, converted into an ASCII string into the reserved location in the dataset which will become (by action of the ImageBuild control file and subsequent CDNFO tape write) WHATCD.TXT file in box 108.

The box 2 DATE ASSEMBLER having completed, the box 122 CONTROL ASSEMBLER now starts the box 103 CONVERT job to process the report. This job will create an ASCII version of the report in box 109, a set of BY TOF INDEXes for the report in box 111, and the top of form index TOF.IDX in box 112—all for the report. The box 103 CONVERT program 31 operates as if a CD has unlimited capacity and will process a report and create index sets which may not be able to fit on a single CD.

The box 103 CONVERT program 31 having completed, the box 124 SPLIT ASSEMBLER program will now start and will analyze the results of the box 103 CONVERT program 31 to determine how many CDs are required to contain the report. Each CD will contain all of the indexes for the entire report, plus a segment of the report, plus the support files (i.e. boxes 110, 111, 112, 113, 114, 115, 116). In its analysis, the box 124 SPLIT ASSEMBLER program will take into account that the indexes of box 111 BY TOF INDEX still remain to be sorted, and will effectively double in size since a by-index and by-order copy must both appear on the CD.

After the box 124 SPLIT ASSEMBLER program determines by calculation the number of CDs required, it then places this information in box 126 SPLIT TABLE, and updates the box 112 TOF.IDX as follows. The box 109 ASCII REPORT is split at top-of-form boundaries into multiple segments, as many segments as were determined CDs would be required, each segment being of roughly equal length. The box 111 BY TOF INDEX is examined, and the box 112A TOFS.IDS is built to add volume indicator cross over boundaries. The offsets in this file represent the actual offset into the file for each index. Later the viewer will compensate for these offsets by making the required subtraction.

The box 104 SORT is now started to sort the completed files in box 111 BY TOF INDEX into by keys order. As many sorts as there are boxes 108 will be required. These sorted results become box 110 BY KEYS INDEX. The result is that two sets of index files are now present each containing the same information but one sorted by order of appearance in the report (byte offset order) and one sorted by key order. The Convert job which extracts the index information initially is written to operate through the report from beginning to end such that the BY TOF INDEX file of box 111 is inherently extracted in order of appearance.

The box 104 SORT having completed all of the sort work box 122 CONTROL ASSEMBLER now starts the box 20 IMAGEBUILD program 33. The box 20 IMAGEBUILD now has all of the datasets ready for use in creating the ISO 9660 image, of which WHATVOL.TXT, WHATCOPY.TXT, WHERECD.TXT are all dummies. Also, WHATCD.TXT is complete with the exception of the CD Hub Number (CHN) on which the data will actually be recorded (which is not yet known at this point in the processing). The box 122 CONTROL ASSEMBLER may invoke box the box 120 IMAGEBUILD program 33 multiple times to create multiple ISO 9660 images as shown by box 123, one for each CD of the multi-volume set.

Upon completion of box 20 IMAGEBUILD program, the box 122 CONTROL ASSEMBLER copies the first CD image from box 123 ISO IMAGE to the Control Unit 51 (box CU) as follows. The box 122 CONTROL ASSEMBLER delivers a mount message to the Control Unit 51 (of box CU) in the form "CDWRTx" and performs a tape write operation to this device 56x (i.e. CDMx where x is 0, 1, 2, or 3 as determined by the device address to which the mount message was delivered, which will be determined by standard MVS tape allocation processes). This operation results in the image of the CD residing on the Winchester disk co located with the CD writer in the addressed CD Module. This image of the CD is not yet ready to write as it contains the WHATCD.TXT file absent the actual CD Hub Number and volume number and the dummy files WHATVOL.TXT, WHATCOPY.TXT and WHERECD.TXT. It is known a priori that these four files occupy a fixed length and occur as the first files in the root in a particular order, e.g. WHATCD, WHATVOL, WHATCOPY, WHERECD, each being typically 512 bytes in length and starting with a fixed string, e.g. "CHN".

The Control Unit 51 (of box CU) interrogates all CDMs to determine the Hub Number of the CD media just loaded. The Control Unit inserts this hub number at a predetermined location in the Winchester drive image of the CD, within the file WHATCD.TXT.

Now the box 122 CONTROL ASSEMBLER, when the mount message is seen to be satisfied, performs a read operation against this device address reading the first x+fixed length portion (where x is a known offset in the ISO image to the start of the first file in the root) of the CD image from the Winchester disk 57x, which portion will include WHATCD.TXT and the actual hub number about to be written.

The box 122 CONTROL ASSEMBLER now selects the appropriate WHATVOL.TXT, WHATCOPY.TXT and WHERECD.TXT files from the box 125 SHIP MANIFEST FLAT FILE, inserts the volume number, copy number and shipping address accordingly, plus in each case inserts the just read CD hub number. The box 122 CONTROL ASSEMBLER further updates box 120 WHATCD.TXT inserting the CHN and the volume number (such that the label identifies the volume number), then combines box 117, 118, 119 and 120 into the single fixed length file box 121 NFO.TXT.

The box 122 CONTROL ASSEMBLER now delivers a further mount message to the addressed CDM in the form "CDNFOx" and performs a write to this tape volume.

The Control Unit 51 will place this volume on a reserved portion of the Winchester disk 57x which already contains the CD image. At the conclusion of the write of CDNFOx the Control Unit 51 will copy this tape image over the first files in the CD image, thus completing the CD image, the offset for this overlay operation being known to the CONTROL UNIT a priori.

The box 122 CONTROL ASSEMBLER now issues the mount message CDCPYx to the Control Unit. This message causes the Control Unit to initiate a copy operation from the Winchester disk 58x CD image portion to the CD writer, or CD Module 56x, itself, producing a CD. The Control Unit 51 and the Control Module 56x manage this copy independently, however if the copy fails due to bad media box 122 CONTROL ASSEMBLER must of need be part of the error recovery process since a new hub number must be incorporated prior to the next write (more later). When the Control Unit 51 and Control Module 56x have completed the copy, operation the Control Unit 51 will cause the associated Transporter 58x to remove the media from the CD Module 56x (of box CDMx) and place it on the Transporter output spindle, leaving the CD Module 56x tray empty for the next blank media.

The box 122 CONTROL ASSEMBLER will determine the status of this entire operation by performing a read against volume CDCPYx, wherein the CHN will have been modified to an identifiable failure pattern, e.g. if the write failed, and will remain the actual CHN if the write was successful.

Now, if additional copies of this volume of the CD set are required the box 122 CONTROL ASSEMBLER will operate to retransmit the updated WHATCD.TXT, WHATVOL.TXT, WHATCOPY.TXT, WHERECD.TXT by a process like that described above, namely mounting CDMNTx to activate the Transporter, load blank media and obtain a hub number through a subsequent read, reformulating the above four files and transmitting them to the Control Unit as a write to CDNFOx, then mounting CDCPYx to activate the write. This same process would be used to recover from a write error on bad media.

During the process of reading the WHATCD.TXT, etc. files back from the Control Unit and building the actual files WHATVOL, WHATCOPY, WHERECD and WHATCD box 122 CONTROL ASSEMBLER updates box 128 CHN FLAT FILE with this information. The box 122 CONTROL ASSEMBLER adds to this flat file the contents of these four files thus creating a complete record of the CD just written. If the write failed this is so noted and the failure is recorded in the CHN BAD FLAT FILE of box 129. Thus boxes 128 and 129 provide a complete record of all CDs attempted to be written and whether the write was good or bad.

A note on off-line copies is as follows. It is possible with the Control Unit 51 to "duplicate" a CD without reference to the mainframe. When a duplicate is made the data on the copy is identical to that on the original with the exception of the hub number in the file WHATCD.TXT (of box 108). It is important to note that the hub numbers embedded in WHATVOL, WHATCOPY and WHERECD will be the hub number of the original CD, not of the copy. By examining the hub numbers in these files it is possible to determine the source of the original, which source data is available in the box 128 CHN FLAT FILE. The hub number in file WHATCD.TXT (of box 108) will be updated such that when the label on the CD is printed it will match the media hub number. If a new delivery slip is printed from the file WHERECD.TXT (of box 113), then it will contain the hub number of the original.

The Control Unit 51 will log these off-line copies onto the Control Unit Hard Disk Drive HDD 88, and will respond to two special mount messages for access to this data. The message IMDUPES (addressed to any available device on the CU 51) followed by a read will return the contents of this log (from the box 130 UPLOAD ASSEMBLER), which contents will be the entire four file record off each CD duplicated off line. This is then incorporated into the box 128 CHN GOOD FLAT FILE to augment the on-line production records.

The message IMCLEAR (addressed to any available device on the CU) will clear the log on the HDD.

As the CD production process continues the output spindles of the Transporters 58x (of boxes Tx) will begin to fill. If 6x writers are in use, and assuming that CDs are on average 50% full then the output spindle with a capacity of 75 discs, each output spindle will fill in under 4 hours. The output spindle is removable as a unit.

When a spindle is nearly full or it is convenient for an operator to make a spindle change, the empty input spindle from Transporter 58x will be removed and exchanged with the output spindle of a transporter 58a through 58d. The output spindle will be hand carried to the transporter 99 (of box T4) and installed as the input spindle. The operator will then invoke a program on the PC 96 to start a label/print operation.

The PC Label/Print program running in PC 96 will cause the Transporter 99 (of box T4) to load a CD into the tray of CD Reader/Printer 97 (of box RP0). The PC 96 will then read two files from the CD, WHATCD.TXT and WHERECD.TXT. At this point there are options depending on the labeling requirements.

If the CD is to be dual labeled then file WHATCD.TXT will be printed on the CD lower half moon and file WHERECD.TXT will be printed on the CD upper half moon.

If the CD is to be single labeled then file WHATCD.TXT will be printed on the CD lower half moon.

If a packing slip is to be printed then the contents of file WHERECD.TXT will be formatted according to the selected printer form and printed on Line Printer 98.

An operator is responsible for matching the CD with the packing slip by verifying that the hub numbers on the CD media, CD label WHATCD.TXT and printed label from WHERECD.TXT match.

Following these tasks and subsequent the system had completed all copies of the first volume of a multi-volume CD set. The box 122 CONTROL ASSEMBLER now operates to produce the next volume of the set and associated copies by following the same procedures described above.

These actions are summarized in the following table 2.3:

TABLE 2.3

Multi-volume CD / Multiple Copy Operational Description

| Step | By | Action |
|---|---|---|
| 1 | Application | Generate report |
| 2 | 122 Control Assembler | Start job |
| 3 | 102 Date Assembler | Extract date, insert into box 108A WHATCD.TXT |
| 4 | 103 Convert 31 | Process report, build ASCII version and index files |
| 5 | 124 Split Assembler | Determine number of CDs required for report, build TOFS.IDS |
| 6 | 104 Sort | Sort index files |
| 7 | 120 ImageBuild 33 | build ISO image |
| 8 | 122 Control Assembler | MWRTCD issue mount, write ISO image |
| 9 | CU Control Unit 51 | mount blank CD, get hub number tape read |
| 10 | 122 Control Assembler | tape read |
| 11 | 122 Control Assembler | update CHN in boxes 117, 118, 119, 108A and 127 |
| 12 | 122 Control Assembler | MCDNFO issue mount and write fixed length bytes |
| 13 | CU Control Unit 51 | overlay fixed length bytes into ISO image |
| 14 | 122 Control Assembler | MCDCPY |
| 15 | CU Control Unit 51 | perform CD write |
| 16 | 122 Control Assembler | read fixed length bytes, update box 128 or 129 according to status |
| 17 | CU Control Unit 51 | empty tray, place CD on output spindle or discard bin |
| 18 | 122 Control Assembler | repeat to step 9 for all volumes and all copies |

2.4 Detailed Description—A Multi-Report Example

When several small reports are to be combined onto a single CD in order to conserve media the system functions as if it were iterating the process described in subsection 2.2

Each individual report is processed in sequence by job of the Convert program 31 (of box 103), and the related ASCII report and index files are built. The ImageBuild program 33 (of box 120) then combines these several onto the CD by action of the Control file which now picks up multiple reports and multiple index sets. The ImageBuild program 33 may place all of the reports in a single directory, or create subdirectories for each report.

If after ImageBuild program 33 runs the combined reports occupy more than a full CD then a check function should fail the job. It is not desirable to split these reports across multiple CDs, rather the reports should be segregated so that entire reports fit on multiple CDs. This improves the access of the users.

2.5 Human Interface Requirements

A human interface, and human actions, is required to start, stop, and restart jobs.

Human personnel must accomplish spindle fill, and spindle move. Personnel are required to remove an empty spindle from the input of a transporter 58x (of box Tx) and swap it with a filled or partially filled spindle on any transporter 58a–58d output. Personnel will also empty the full spindle of the transporter 58a–58d outputs into a CD "beehive" and deliver it to the collation facility.

Human personnel must perform collation. Personnel in the collation facility will receive written and labeled CD and printed packing lists. Both the CD and the packing list have the CD CHN printed on them, and will have been produced in sequential order. The CD on the top of the beehive will match to the last packing list printed. Personnel will match CDs to packing lists, verifying the CHN, and package them for delivery.

3. ImageBuild Software 3.1 Introduction to Image Build

The Enterprise Authoring System (EAS) Image Build programs allow user to simply "fill in the blanks" to create CD images.

Images created by ISO Image Build can be copied by standard utilities to Data/Ware Development's EAS CD-Writer Subsystem, thus creating a CD immediately.

CD-W image files created by these programs conform to the International Organization for Standardization (ISO) Standard ISO-9660, as defined in the 1988 publication of "International Standard: Information Processing-Volume and file structure of CDROM for information interchange."

3.2 File Requirements

Data files contain the information to be placed in the CD-W image. The content file consists of the DSN of each file that is to be included in one directory. Content files are identified in the control file, which defines how the CD image is to be built, and lays out necessary information for ISO standards. Output tapes and mini-discs are used to store the images after they are built.

3.2.1 Input Data File Types

The input data files are listed in the content files and may consist of either fixed or variable length records. All files are opened in binary mode, to prevent data translation by the operating system. File sizes will be rounded up to the next 2048 byte boundary on the CD image.

3.2.2 Content Files

A content file specifies the DSN of each file that is to be included in a directory, and whether the file is to be "HIDDEN" or "VISIBLE". The content file must be fixed length, with a logical record length of 80 bytes. Each DSN must reside on its own line.

All files must be renamed from MVS format to PC format. Two files cannot have the same name in the same subdirectory. To rename a file in the content file list, put a '>' after the filename and then list the PC format filename.

3.2.3 Control File

The control file specifies information such as disc labels, dates, directory names, number of volume descriptors, and order of directories in the CD image. The control file also specifies the content file for each directory that will be built.

The control file is parsed by the program so the file should remain consistent in format. The control file preferrably consists of the following fields.

A Boot Record consists of potentially several optional fields permitting the user to specify information about the boot record. However, CD-W standards do not currently support booting off the CD, so this feature is reserved for future use.

A System Identifier is an optional label field identifying the system that can recognize and act upon the content of the logical sector numbers 0 to 15 of the volume.

A Volume Identifier is an optional label field specifying an identification of the volume.

A Volume Set Identifier is an optional label filed describing the CD's placement in a multi-volume set.

A Publisher Identifier is an optional label field identifying the user who generated the pre-mastering tape.

A Data Preparer Identifier is an optional label filed identifying the person or entity that controls the preparation of the data to be recorded on the volume group.

An Application Identifier is an optional label field identifying the name of the application that will be used with the CD-W image and who produced it.

A Copyright Identifier is an optional label filed specifying the name of the file that contains the copyright statement for the volumes. The filename must follow the DOS standard of filename.ext. This filename must also be listed in the root directory content file using DD name or DSN.

An Abstract File Identifier is an optional label field specifying the name of the file that contains an abstract statement for the volumes.

A Bibliographic File ID is an optional label filed specifying the name of the file that contains bibliographic records.

A Volume Creation Date & Time is a field specifying the date and time the original CD version was made.

A Volume Expiration Date & Time is a field specifying the date and time the data on the CD is no longer valid.

A Volume Effective Date & Time is a field specifying the date and time the data on the CD is valid.

A Root Directory Identifier is a field that is normally equal to ROOT.

A Directory List is a list of directories to be contained on the CD. The format is "SUB_DIR_1 SUB_DIR_2 ETC. (NEW DIR IDENTIFIER)".

A Root Contents field contains the filename of the file containing the contents of the root directory.

A Directory Filename List is a list of filenames for the directories named in the directory list. The first filename corresponds to the first directory, the second filename corresponds to the second directory, etc.

4. EAS CD Viewer

This section describes how exemplary data might be viewed in, and by, the CD Viewer of the Enterprise Authoring System (EAS). Because each user's data is formatted, indexed and used differently, it will be realized that customized Viewers would be user specific reports.

4.1 Starting Up

This sub-section consists of three sub-sub-sections. The first sub-sub-section, "Starting the Viewer", describes how the EAS Viewer can be started from, for example, the Windows Program Manager or File Manager. The second sub-sub-section, "A List of Screens", briefly describes exemplary screens in the EAS Viewer and what the user may typically do with them. The third sub-subsection, "Areas on the Screen", describes the different parts of all of the screens in the Viewer program.

4.1.1 Starting the Viewer

The EAS Viewer is started like any application when, as is typical, it is located and run under Windows. The following descriptions apply to the standard Windows Program Manager and File Manager. If the user has other, alternative, after-market applications software that performs these same functions then the user would obviously consult the manuals supplied with that software in order to determine how to start applications.

4.1.1 Starting from the Windows Program Manager

The Windows Program Manager permits the user to start applications from the File menu selection. The user must Click on File with a mouse, or else type Alt F, to see the Windows File menu drop down box. The user then selects the Run option either by clicking with the mouse or continuing with Alt R. The Run dialog box then appears with the cursor positioned inside the Command Line text entry box. The user must then type in the complete path and program name for the Viewer. For example, if the Viewer is named Viewdemo.exe and is located in the user's CD drive which is drive E, the user would then type E:viewdemo and press Enter or click on the OK button.

If, when the Command Line entry box appears, the user is uncertain as to the exact path and name of the Viewer, then the user can use the Browse option button to determine these parameters. To do this the user must click on Browse, or else type Alt B. The Browse dialog box will appear, showing a directory structure with drive, directory and file name boxes. The user can use the mouse to navigate through these boxes until the Viewer is located. The user must then double click on the Viewer file name, or click once and then click OK. The Browse dialog box will disappear and the name that the user selected will be filled in for the user in the Command Line text entry box of the Run dialog box. The user must then press Enter or click OK.

4.1.2 Starting from the File Manager

The Viewer may alternatively be started from the Windows File manager. The File Manager permits the user to start applications much like using the Browse option under Program Manager. When the File Manager starts the user must use the mouse to navigate through the drive, directory and file structure until the Viewer program is located. The user then double clicks on the Viewer program name. The Viewer will start. The user may also use the File menu option in File Manager—which operates just like the File option in Program Manager for starting programs except that the File Manager doesn't provide a Browse option.

4.1.3 Building an Icon to Launch the Viewer

If the user intends to use the Viewer often, as might be the case if data was delivered daily on CD, then the user may wish to build the a Viewer icon into the user Windows Main window. To do this from Windows Program Manager the user must make the Main window active, then select File menu, then New. A New Program Object Dialog box will appear. The user must select the Program Item Radio button and then click OK. The Program Item Properties Entry box will appear. For Description the user would type in "EAS Viewdemo", or equivalent correct program destination, and then tab to Command Line and enter "X:\Viewdemo.exe" where X is the drive letter for the user's CD drive. The user then tabs to the Working Directory and enters "X:\". After reviewing these entries, the user will click OK. The new icon will appear in the user's Main window. A double click on this icon will launch the Viewer program like any other application.

4.1.4 A List of Screens

The preferred EAS Viewer program provides five screens. The first screen seen when the Viewer is started is the Logo screen. This screen appears while the Viewer loads and initializes. In a few seconds, the Logo screen disappears and the user will see the File screen. On this screen the user selects the report the user wishes to use. As soon as the user selects a report then the Viewer takes the user to the Report screen. The Report screen provides two views, a Report view and a Notepad view. The Report view is the data delivered from the user mainframe application and written to the CD. The Notepad view is a built-in note processor to which the user may copy data, and may make notes for himself/herself, or for others. The fourth screen is the Image screen. Here the user can see what the original paper copy of the report data looked like, including forms overlay if applicable.

The main Viewer screens are preferably five in number, and preferrably consist of a Logo screen, a File screen, a Report screen, an Image screen and a Help screen.

The Logo screen appears automatically when the user starts the Viewer and disappears after the Viewer is loaded and initialized.

The File screen permits the user to select a report to use. On this screen the user selects the report that the user wishes to use. The user will move to it automatically from the Logo screen or return to it from the Report screen.

The Report screen permits the viewing of specific report information. On this screen the user will view and use the report information. The user can perform finds and searches. The user can also copy and paste to the Viewer notepad or to other Windows applications like word processors. The user can print the report or portions thereof, or print the user notepad.

The Image screen provides a pictorial representation of the paper report, including a forms overlay if appropriate. This representation can be printed.

Finally, the Help screen provides directions—much like the contents of this section 4.

4.1.5 Using the File Screen

On the File screen the user will see a Menu bar and Toolbar. The user must click on the Open File icon or select the Open Report menu selection under File. The Open Report dialog box should appear. This dialog box is used to navigate to the correct report that the user would like to view (it should have the extension '.RPT'). When the user has selected the correct report, he/she will click on OK or hit enter. The Viewer will then load the selected report file.

Notice that, in the preferred operation, the Menu bar appears with all selections, except selections File and Help that are shown in light type. Selections shown in light type are not available at this time. The dark type selections are available and are next described.

The File menu selection permits the user to select from a drop down menu box either Open File or Exit. The Open File option simply selects the File screen and will return the user to the current screen display. The Exit option will terminate the Viewer.

The Help menu selection permits the user to select from a drop down box either Help or About. Help provides information about how to operate the Viewer. The About selection will produce an information box indicating the version number of the Viewer that the user is running.

After the user double clicks on the report file name the user wishes to use, the Viewer will begin loading the report. While the report is accessed the mouse icon will show as an hourglass indicating that the user must wait for the operation to complete. The File screen will disappear to be replaced by the Report screen after the report has been accessed. The user can always return to the File screen by either clicking the File menu then Open File, or by simply clicking on the File Open button located on the left-hand side of the button toolbar.

4.1.6 Using the Report Screen

The Report screen shows the data from the report the user selected on the File screen. The menu bar, which had most selections in light type on the File screen indicating that they were unavailable, now has all selections in dark type indicating that they are available for use. In addition a number of buttons have appeared below the Menu bar. These buttons provide a quick way to invoke common Viewer functions.

The bulk of the Report screen is taken up with a view of either 1) the report data or 2) the user notepad. These two views are each accompanied by the Menu bar and Button bar plus vertical and horizontal scrollers for the data itself. The user can readily distinguish between these two views by observing the Title bar, which shows the report name in the Report view and the word Notepad in the Notepad view, or by observing the state of the Notepad button, which is depressed in the Notepad view and extended in the Report view.

The operations of the menu bar, buttons, and scrollers are described in detail in subsequent sub-sections.

4.1.7 Identifying Areas on the Screens

The preferred EAS Viewer screens have up to seven distinct areas or parts. Not all areas are visible or available on all screens or under all conditions. A diagrammatic representation of the preferred view, or display, screen, identifying the elements thereof, is shown in FIG. 8a. Another diagrammatic representation of the same preferred display screen, displaying now typical CD data created by the EAS of the present invention in accordance with the preferred Viewer Program (part of the EAS of the present invention), is shown in FIG. 8b.

A Title bar tells the user which screen, view and/or report the user is working with. The Title Bar base title is "Enterprise Authoring System CD Viewer" which is followed by one of three alternatives. There is no additional text while the File screen is displayed. The report file name is displayed while in the report view of the Report screen. Finally, "Notepad" is displayed while in the notepad view of the Report screen.

The Title bar also signals by its color whether the Viewer is the active Windows application. The active application has a colored Title bar according to how the user has set up the User desktop, while a non-active application has a gray title bar.

The Menu bar provides the means for selecting the full range of functions provided by the Viewer. In general a menu item when activated provides a drop down list of additional functions selectable under that item. As usual, the menu items and the items contained in the drop down list are selectable by mouse click or Alt key combinations. When a drop down list is displayed available items are shown in dark type while non-available items are shown in light type.

The Button bar provides quick access to several of the most often used commands for the Viewer. A single mouse click on any of these buttons quickly performs the desired function.

The Report Scroll bar permits the user to browse through the report as if the user were turning many pages at once. This is useful if the report is organized in a particular order (e.g. alphabetical or chronological) and the user simply want to scan through several pages. The Report Scroll bar functions in conjunction with the CD disk icon button located on the Button bar.

The Data area is where the user views the user report or the user's notepad, depending on whether the user has selected the Report view or Notepad view. The Data area is bounded by a vertical scroll bar and a horizontal scroll bar which can be used to position the Data area viewing window over the text.

The Search Boxes are used to input search keys to rapidly locate and view specific pages of a report. These boxes appear when the Search mode is entered by selecting Search from the Menu bar or by clicking on the Search Key button located on the button bar. Their use is explained in more detail in a later sub-section.

4.2 Using the Viewer

This sub-section provides an overview for using the preferred Viewer by illustrating several of the most common user actions. In a subsequent sub-section the Viewer controls are described in detail, leading to more advanced Viewer use. This sub-section describes use of the most important Viewer features to access, view, and use the user's report data.

4.2.1 Viewing on the Report Screen

The most essential function of the Viewer is to enable the user to see the data from the user's report. This is accomplished through the Report screen in the Report view. After selecting the user report from the File screen the user is automatically switched to the Report screen in Report view. Here the user sees the user's report in the Data area. The report is viewed one page at a time. Depending on the size of the page and the font selected for the Data area, the user may see all or only a portion of the page.

4.2.2 Scrolling and Paging the Report Screen

Later the user will learn how to change the amount of data visible in the Data area. Comfortable viewing often requires that a large font size be selected in the Data area, making it impossible to fit the entire report page on the screen. With a comfortably large font in use the user may need to scroll up or down, left or right to see all of the data. This scrolling is accomplished by means of the vertical and horizontal scroll bars to the right and bottom of the Data area respectively.

The Vertical Scroll bar to the right of the Data area allows the user to move up or down through the page currently in the Data area. The user can do this by any of four different actions. Clicking the up or down arrows at the top and bottom of the scroll bar moves the report one line for each click. Holding the left mouse button down while positioned over the up or down arrows at the top and bottom of the scroll bar moves the report continuously a line at a time up or down as long as the mouse button is down. Depressing the left mouse button while over the scroller button and dragging the button up or down continuously scrolls the report, stopping where and when the user release the mouse button. Clicking the mouse while positioned over the scroller bar moves the scroller button to the place the user clicked as if the user had dragged it there, scrolling the report to that position.

The Horizontal Scroll bar at the bottom of the Data area permits the user to move right or left through the page currently in the Data area. The user can do this by any of four different actions. Clicking the right or left arrows at the right and left of the scroll bar moves the report one column for each click. Holding the left mouse button down while positioned over the right or left arrows at the right and left of the scroll bar moves the report continuously a column at a time right or left as long as the mouse button is held down. Depressing the left mouse button while over the scroller button and dragging the button right or left continuously scrolls the report, stopping where and when the user release the mouse button. Clicking the mouse while positioned over the scroller bar moves the scroller button to the place the user clicked as if the user had dragged it there, scrolling the report to that position.

Scrolling with the Vertical Scroll bar and Horizontal Scroll bar only moves the user's viewing window over the page of the report currently accessed. It does not retrieve a prior or a next page for viewing.

Report paging is accomplished with the Next, Previous, First, and Last buttons on the Button bar.

One click on the "Next" button causes the Viewer to access and load the next page of the report into the Data area. The user can also accomplish this function by selecting Page, then Next on the Menu bar or using the F8 shortcut key. Any of these three techniques result in the next page of data being accessed and presented.

One click on the 'Previous' button causes the Viewer to access and load the prior page of the report into the Data area. The user can also accomplish this function by selecting Page, then Previous on the Menu bar or using the F7 shortcut key. Any of these three techniques result in the previous page of data being accessed and presented.

One click on the 'First' button causes the Viewer to access the first page on the report. The user can also accomplish this function by selecting Page, then First on the Menu bar or using the Ctrl+F7 shortcut key. Any of these three techniques result in the previous page of data being accessed and presented.

One click on the 'Last' button causes the Viewer to access the first page on the report. The user can also accomplish this function by selecting Page, then Last on the Menu bar or using the Ctrl+F8 shortcut key. Any of these three techniques result in the previous page of data being accessed and presented.

In almost all reports there is one index which is primary. This index is important to the report in that it uniquely or primarily identifies the report. Such an index would be an account number, social security number or document number. The Viewer will have been customized to know about this primary identifier and will locate and highlight it as each page of the report is accessed and presented in the Data area. This highlighting is shown by a colored area appearing as the background to the data.

4.2.3 Finding Information on the Report Screen

When the user is looking at a given page of a report (how to quickly locate a particular page is discussed later in this section) it is tedious to attempt to visually scan and identify a particular entry, such as a dollar amount or text phrase. The Viewer allows the user to use the user's PC to do this function for the user by inputting a find argument and searching the page being viewed.

In particular, each the Find, Find Next, & Find Preset functions described below can be accessed quickly and easily by using the corresponding command buttons on the right side of the button bar. When the end of a file is reached, the Find, Find Next, and Find Preset command buttons become disabled, as well as the corresponding menu selections. To enable these commands, one must use the report scroll bar along the CD icon button to move to another location in the file.

The find functionality is accessed through the Edit drop down menu. When the user clicks Edit (or uses Alt E) then the drop down is displayed offering the Find selection. The user can click Find, or use Alt F. In either case the EAS Find Dialog box appears, prompting the user to enter the string to find. This entry is made in the empty input box, where the cursor is pre-positioned for the user. The user must type in the text that he/she wishes the Viewer to find, and then press Enter or click OK. The Viewer will scan the page currently in the Data area searching for a match to the user input. This match is not case sensitive, if the user input aBcD the Viewer will match on abcd, ABCD, AbCd, etc. If the Viewer finds a match to the user's input then it will move the highlight to that match and the dialog box will vanish. If no match is found on the page that the user is viewing then the Viewer program will automatically access the next page of the report and, if the primary index of that page matches the primary index of the page the user started on, repeat the find operation. If no match is found on any of the pages beginning from where the user started until the primary index changes then the 'not found' message box will appear, which the user must clear by clicking OK.

Generally when the user is looking for a specific data occurrence then the user intends to confine his/her search to the portion of a report which is all the same primary index, like the same account number. For this reason the Viewer preferably does not cross a primary index boundary when performing a find operation.

4.2.4 Finding a Report Page Through Key Search

The preferred embodiments of the Enterprise Authoring System and its Viewer are intended to permit the user to effectively and efficiently both receive and use hundreds of megabytes of data on a single CD. In order to make this practical the data on the CD is indexed to facilitate rapid search inquiries from the user's PC. This is the function of the Search facility.

The Search facility is accessed by clicking on the Search Key button on the toolbar, or through the Search menu by clicking on Search on the Menu bar or entering Alt S. When the user does this the Data area is temporarily cleared and Search Entry boxes appear. Search Entry boxes are arranged in a cascaded manner, with a key title displayed above a pair of boxes, all enclosed in a frame. The top box of the pair is the Search Entry box. The Search Index Name appears directly above this box. The lower box of the pair is the Search Match box. Every time a matching key entry is found the key will appear in this box. If more entries are found than fit in the Search Match box, then a vertical scroll bar will automatically appear to the right of the box allowing the user to scroll through the entries. To access other Search Entry Boxes, the user simply clicks on the appropriate frame.

To see how this works, imagine searching a bank statement report for a specific check number. The CD has been built with a special index file containing all check numbers which appear in the report, and a means of locating the page on which each appears. When the user inputs a check number in the Search Entry box and presses Enter, the Viewer consults the check number index file. When a match is found, the Viewer will consult all other index files for any corresponding data that may be linked with the check number (appear on the same line). It essentially builds a string of data that resembles a particular line in the report where the check number appears. The string is placed in the Search Match box for the user to view.

In order to see the report page on which these matches occurred, the user simply double clicks on the entry in the Search Match box. After a few seconds the report page will appear in the Data area, with the search key highlighted. The user can return to see the search matches again by selecting Search (click Search, or Alt S, or click the Search Key button). The Search Match box will still have the matches shown. If the match that the user just viewed is not the one that the user wanted then the user can delete it from the list. Any match can be deleted from the list by pressing upon such times as the match is highlighted. Clicking a match highlights it, while double clicking both highlights it and views it. When the user returns from the Report screen to view the Search Match box the last item the user looked at will be highlighted and can be deleted by typing "-".

If no matches are found a Message box will appear indicating such, which the user must clear by clicking OK.

Wildcarding is supported by the Viewer. If the user wants to search a particular key, but only knows the first three digits, then the user will simply enter the known digits and the Viewer will match all keys that begin with those digits. Wildcarding also permits the user to browse through a particular key. For example, if the user wants to browse all Part Numbers that begin with 82, then he/she will simply enter 82, and all appropriate matches will be found.

Some keys that the user searches for may appear only once in a report, while others may appear many times. For example, more than one individual might write check number 1000 in a given month. Thus searching for check number 1000 alone may not produce a unique report page, and the user will get multiple "hits". That is, multiple entries will appear in the Search Match box.

In general the primary index of the report is unique and will often be used as one of the search parameters. Therefore the user will normally search on this index and may be assured that the report of interest will be found. However, even here there may be multiple pages to this report, each of which contains the primary index (on a bank statement the account number may appear on every page, thus appearing multiple times).

The Viewer has a built in Correlation feature that permits the user to use the logic functions AND, OR, & NOT to link certain keys together. For example, let's assume that the user wants to search for all accounts that begin with number 894 and that wrote out a check number 1234. First, the user would enter 894 in account number entry box. When all hits are found, the user will click on the corresponding OR button to copy all hits to the correlation box below. The user will now go to the check number entry box and enter 1234. When all hits are found, the user will click on the corresponding AND button. The correlation list below should now be reduced to hits of all account numbers beginning with 894 that also wrote check number 1234. If there are no matches, then the correlation list will be empty.

In general, clicking OR will take all matches in the current list box and add them to the correlation list box. Clicking AND will find all matches that appear in the correlation list box AND the current list box. Finally, clicking NOT will find all matches that appear in the correlation list box but NOT in the current list box.

To undo the last logical operation, the user must click the Undo button located next to the correlation list box. To clear the correlation list box, the user must click on Clear. The list box below the Undo and Clear buttons permits the user to remember the steps used to arrive at the current condition of the correlation box.

The Viewer also has a built-in bookmark feature that permits the user to save the current page under a unique name and come back to it later. To access the bookmark feature, the user hits Alt E,B, or simply Ctrl-B. A form labeled GoTo will appear. To save the current page, the user enters the name under which he/she desires to save the page into the text box and then hits enter (or clicks Add). The page name will be added to the list box below. To access the page, the user clicks on the page name to add the page number to the Page entry box. The user clicks on OK to view the page. To remove any page from the bookmark list, the user simply highlights the page and clicks on Remove. Clicking Cancel brings the user back to the current page.

The user can also access a particular page by its page number. The user must enter in the page number in the Page entry box and then hit enter (or click OK). The page that the user enters must be between the first and last page values for the report. Also note that the page number may not always coincide the page number from the actual report due to separator, or header pages, attached to the report.

4.3 Using the Notepad

The preferred embodiment of the EAS Viewer includes a notepad feature which can be used to save portions of reports, write notes reminding the user of the user's progress, or even to produce and send correspondence. The notepad is accessed on the Report screen in the Notepad view. To see the notepad the user enters the View menu and then the then Notepad (click View then Notepad or use Alt V,N) or clicks the Notepad button.

The user can return from the Notepad view to the Report view by using the View menu then Report (click View then Report or use Alt V R), or by clicking the Notepad button. Notice that when the user is in Report view then the report file name is shown in the Viewer Title bar and the Notepad button is extended, while when in the Notepad view the Title bar indicates Notepad and the Notepad button is depressed.

If the user switches to the Notepad view, then the typing cursor will be positioned on the notepad Data area. The user can type text directly into the notepad. (If the user inadvertently attempts to type text into the Data area in Report view then he/she will receive a warning message indicating that this is not allowed. The user must clear this message by clicking OK. The report will not be changed).

The user can also paste data from the Report view into the user's notepad. To do this the user starts in the Report view and selects the data that he/she wishes to copy and paste. The user can select data on the Report view by dragging the mouse over the data. As the user drags the mouse the data that he/she is thereby selecting becomes highlighted. The user can also select the entire page by using the Edit menu then Select Page (click Edit then click Select Page or use Alt E, S). Having selected the data, the user must copy it using either the shortcut Ctrl-C or else the Edit menu then Copy (click Edit then Copy or use Alt E, C). The user next goes to the Notepad view (the Notepad button is a quick way) and uses the shortcut Ctrl-V or else Edit then Paste (click Edit then click Paste, or use Alt E, P). The data will be pasted where the text cursor was. In order to position data where wanted (i.e. before or after other data that the user may have pasted or notes that the user may have entered), the user first positions the text cursor and then does the pasting.

When the user performs this sequence of Edit then Copy, then he/she is actually copying the selected data into the Windows system clipboard. The user can verify this by starting the user's Clipboard Viewer from the Windows Program Manager. When the user does so then a copy of the user-selected data will appear on the clipboard.

Finally, the Viewer notepad can be cleared by selecting Edit then Empty Notepad menu selections by clicking, or by keystroking Alt E, E.

4.4 Exporting Report Data to Other Applications

In the previous sub-section 4.3 the manner by which report data could be selected and copied to the Viewer notepad was discussed. The data passes through the Windows system clipboard in order to accomplish this selective copying. However, having once placed selected data on the Windows clipboard the user need not paste it to the Viewer notepad. Instead, the user may choose to paste it into another Windows application like the user's word processing program. Most Windows' applications support pasting from the Windows system clipboard.

To exercise this feature the user would start, for example, his/her word processing program in addition to the EAS Viewer. The user can very likely size the word processor so that it only occupies a portion of the Windows screen. The user does this by positioning the cursor over the left or right border and noting that the cursor changes to a horizontal arrow. The mouse button is then pressed, and the mouse dragged, until the word processor only fills half of the screen. This same technique is used to size the Viewer window such that the user may have both applications running side by side. (To size an application it must not be maximized. An application window is maximized when the user clicks on the up arrow in the top right hand corner. The application then fills the entire screen and that arrow becomes a double up and down arrow. To make the application sizable the user should click on this double arrow and the application will return to its prior size.)

With the Viewer and the user's word processing programs running side by side, the user can select data from the Viewer Report screen Report view and then go to the word processing program. This is accomplished by clicking the Title Bar to change applications. Data is pasted into the word processing program. Similarly the user can copy data from the word processor (usually by Edit then Copy), and paste this data into the Viewer notepad.

The Windows operating system program itself also has an application called Notepad to which the user may copy and paste.

4.5 Changing the Data Area

The Data area is where the user's report data and the notepad data appear, and where the user does most of his/her work. In some investigations the user will need to examine the report data in detail and a large clear font will make the user's work easier and more pleasant. In other cases the user may need to "eyeball" the entire page and will prefer to see as much of the page as possible, even if the font is tiny.

Almost all mainframe reports are printed using non-proportional fonts, a holdover from the days of impact printers. To make these reports appear correctly on the user's screen the user must also be using a non-proportional font (non-proportional fonts space all letters equally regardless of the width of the character being displayed, thus the letter "i" is given the same amount of space as the letter "M".)

The user can zoom in and out of the current page that is in view by selecting Preferences, Zoom menu selection. The user will be given five zoom modes to choose from. The user must select one in order to change the current font size. The Normal selection will change the font size to 9, which is the default.

The Data area default font is set to Courier New, which is a commonly available non-proportional font.

4.6 Printing

The user can print from the Viewer using the Print menu drop down or by clicking the Print button located on the button toolbar. When the user makes a menu selection then he/she must explicitly specify what he/she intends to print, whereas when the user clicks the Print button then the Viewer figures out "what the user means".

Selecting the Print menu and then Print Screen will print a bit mapped image of the user's screen, including the entire Viewer presentation with menus, buttons, etc.

Selecting the Print menu and then Print Selected will print the text which is selected on the Report screen Report view (i.e. the highlighted data is printed).

Selecting the Print menu and then Print Notepad will print the contents of the notepad.

The Print button accomplishes the same three print functions described above using the following three rules. If the Report screen Report view is visible and nothing is selected, then Print the Screen. If the Report screen Report view is visible and anything is selected, then Print the Selected text. Finally, if the Report screen Notepad view is visible, then Print the Notepad.

Note that, when the Viewer advances to a new page or shows a page, it selects the primary index, which may be only a few characters. The user might inadvertently print just these few characters by clicking the Print button, not realizing that these characters are highlighted, and expecting to get a Print Screen result. The user can always "un-highlight" this index area by clicking anywhere on the Data area.

All print out is routed to the default system printer the user has defined to Windows.

The user can change the default printer by choosing the Print, Setup menu selection. A print dialog box should appear, giving the user options about the currently installed printer. To change printers, select Specific Printer. The user can choose from the list of available system printers. The user can also select a new paper size and orientation. (NOTE: Be aware that any changes made in the Printer Setup dialog box are reflected in the WIN.INI file)

The user can change the characteristics of the print out (font size and font name) by choosing the Print, Font menu selection. A font dialog box should appear with all the fonts available for the default printer. The user may choose an appropriate font and font size and then click OK.

4.7 Image View and Print

Some reports are difficult to interpret without a corresponding form. In some cases this form can be incorporated into the Viewer and is accessible through the View menu Image selection. When this selection is made then all Viewer controls and borders vanish and a replica of the form appears that is then overlaid with the data from the Report screen Report view. A click of the mouse returns to the normal Viewer presentation. Clicking the right mouse causes a screen print of the image.

4.8 Closing the Viewer

Prior to removing the CD from the CD drive the user should always exit the Viewer by making the File then Exit menu selection, or by using the shortcut Ctrl-X.

4.9 Additional Features

The Viewer program includes a number of subtle features which were omitted in the above sub-sections to preserve clarity. Advanced users will want to take note of these features to speed and simplify their work.

A Cancel button appears in the space in the Button bar between the Print button and the Find command button when the Viewer is performing an operation which may take a long time to terminate. Consider a report wherein many tens or hundreds of pages all have the same primary key. If the user has requested a Find then the Viewer would begin accessing, displaying and searching all of these pages until the primary key changed. This could take several minutes. If the user recognizes that the find will not be successful, or if the user has specified the find argument incorrectly, then the user can cancel the operation by clicking the Cancel button.

Choosing the Help menu will permit the user to view instructions much like the contents of this section 4. while using the Viewer. To activate Help the user either clicks the Help menu then Help selection, or uses Alt H, H, or simply presses the function key 'F1'.

An About selection appears under the Help menu. Selecting About will produce a message box identifying the particular Viewer that is currently in use. This identification can be useful to the user's technical support team, or to support personnel of the originator of the Viewer program, if the user encounter problems with the Viewer.

The Report Scroll bar permits the user to browse through the report as if the user were turning many pages at once. This is useful if the report is organized in a particular order (e.g. alphabetical or chronological) and the user simply wants to scan through several pages. The Report Scroll bar functions in conjunction with the CD disc icon button on the Button bar. To use this function the user positions the scroller button anywhere along its length by dragging it with the mouse. He/she then clicks the CD Disc button in the Button bar. A seek operation will be performed on the CD, taking the user to the nearest top of page representing where the user positioned the scroller button. That page will then be displayed in the Report screen Report view.

The user will see a file on each CD named WHATCD.TXT. This file should not be accessed with the Viewer, the record length of this file not matching those others on the CD which are all generated by the mainframe computer. The WHATCD.TXT file can, however, be accessed by the Windows system Notepad application or by a word processor. The WHATCD.TXT file provides, in accordance with the present invention, identifying information about the CD, including its unique hub number. (Kodak Infoguard media includes a hub number system which allows the EAS to embed the CD media hub number directly in the data. WHATCD.TXT then contains this hub number and is subsequently used to produce the CD label. With this system the physical media, the data, and the label each have the hub number embedded making for positive identification. It should be noted that the EAS can transmit this hub number to the host after each CD is written. This enables the mainframe administrator to build a CD Catalog much like a common tape catalog. The CD catalog can tie the CD Hub Number (CHN) to the datasets written, just as a tape catalog ties the tape volume serial number (VSN) to the datasets written.)

6. The Enterprise Authoring System Label Printer and Label Printer Software Program This section 6. describes the installation and use of the Enterprise Authoring System Label Printer software program. This software is intended to be installed and used on a PC that functions as the Operator Terminal of the EAS Control Unit or on a separate PC. It is preferred, and normal, that this software is installed on the PC at the time of delivery. If the Label Printer is added as an option after initial installation, or if it becomes necessary to reload the software on the PC, then the installation instructions in section 6.1, following, regarding building an Icon to Launch the Label Printer must be followed.

6.1 Starting the Label Printer

This sub-section 6.1, Starting the Label Printer, describes how the EAS Label Printer can be started from the Windows Program Manager or File Manager and installed as an icon.

6.1.1 Starting the Label Printer

After being installed as an icon, the EAS Label Printer is started like any application under Windows, the operator simply double clicking the icon to launch the Label Printer. Alternately, the Label Printer can be started from the Program Manager or File Manager. The following descriptions apply to the standard Windows Program Manager and File Manager. If the EAS system owner has after-market applications software that performs these same functions then the manuals supplied with this software should obviously be consulted to determine how to start applications.

6.1.2 Starting from the Windows Program Manager

The Windows Program Manager enables the operator to start applications from the File menu selection. The operators clicks on File with the operator mouse, or types Alt F, to see the File menu drop down box. The operator selects the Run option either by clicking with the mouse, or by continuing with Alt R. The Run dialog box will appear with the cursor positioned inside the Command Line text entry box. The operator must type in the complete path and program name for the Label Printer. For example, if the Label Printer is named EASVERIF.EXE and the EAS Control Unit CD drive is drive D, the operator must type D:EASVERIF.EXE and press Enter or else click on the OK button.

If, when the Command Line entry box appears, the operator is uncertain as to the exact path and name of the Label Printer then the operator can use the Browse option button to determine the appropriate path and name. To do this the operator should click on Browse, or else type Alt B. The Browse dialog box will appear, showing a directory structure with drive, directory and file name boxes. The operator can use the mouse to navigate through these boxes until the Label Printer is located. The operator must then double click on the Label Printer file name, or else click once and click OK. The Browse dialog box will disappear and the name that the operator selected will be filled in for the operator in the Command Line text entry box of the Run dialog box. Now the operator can press Enter, or else click OK.

6.1.3 Starting from the File Manager

The Windows File Manager permits the operator to start applications much like using the Browse option under Program Manager. When the File Manager starts the operator must use the mouse to navigate through the drive, directory and file structure until the operator sees the Label Printer, EASVERIF.EXE. The operator must then double click on the Label Printer program name. The program will start. The operator can also use the File menu option in File Manager—which operates just like the File option in Program Manager for starting programs except File Manager doesn't provide a Browse option.

6.1.4 Building an Icon to Launch the Label Printer

The operator will commonly use the Label Printer Software (and the Label Printer) often, and should build the Label Printer into the Windows Main window. To do this the operator must first copy the file EASVERIF.EXE from the distribution floppy disk into the root of the C: hard drive. Then from Program Manager the operator must make the Main window active, select File menu, and then select New. A New Program Object Dialog box will appear. The operator should select the Program Item Radio button and then click OK. The Program Item Properties Entry box will appear. For Description the operator must type in "EAS Label", and then tab to the Command Line and enter "C:EASVERIF.EXE". The operator next tabs to the Working Directory and enters "D:". After reviewing these entries, the operator will then click OK. The new icon will appear in the Main window. A double click on this icon will launch the Label Printer like any other Windows application.

6.2 Label Printer Screen

The preferred EAS Label Printer program provides a single screen display having a number of dialog boxes. Further Dialog boxes appear as appropriate during operation of the Label Printer and Label Printer Program.

A diagrammatic representation of a preferred label printer display screen—which screen is commonly seen at an operator terminal, or EAS Control, PC, but which screen may also be produced in any PC running preferred Label Printer Program part of the EAS of the present invention—is shown in FIG. 9. The screen displays labels written to and read from CDs, and controls the printing of these labels.

The screen is equipped with a Title Bar "CD Verify and Label", a Menu bar with three entries, and three Contents boxes, "CD Label File Contents", "CD Directory Structure", and "CD Files" .

6.2.1 Identifying Areas on the Screen

The EAS Label Printer screen has three distinct areas or parts.

The Title bar tells the operator which application or screen the operator is working with. The Title bar title is "CD Verify and Label". The Title bar also signals by its color whether the Label Printer is the active Windows application. The active application has a colored Title bar according to how the operator has set up the desktop, while a non-active application has a gray title bar.

A Menu bar provides a means for selecting among the full range of functions provided by the Label Printer. In general a menu item when activated provides a drop down list of additional functions selectable under that item. As is usual, the menu items and the items contained in the drop down list are selectable by mouse click or Alt key combinations. When a menu or drop down list is displayed available items are shown in dark type while non-available items are shown in light type.

Contents boxes are used to select and display the CD directory structure, files contained therein, and the contents of the label file itself.

6.3 Using the Label Printer Function

The preferred embodiment of the Label Printer program provides a number of options for use, the most direct method of use is described first, with alternate methods described later.

Reference should now be made to FIGS. 10–12. A representation of a dialog box superimposed on the display screen previously shown in FIG. 9, which dialog box is involved in use of the Label Printer Program to make labels on CDs, is shown in FIG. 10. A representation of the appearance of the display screen shown in FIG. 9 at a time of an inspection of the label file prior to the printing thereof by the Label Printer Program onto a CD is shown in FIG. 11. Finally, a representation of the appearance of the display screen shown in FIG. 9 at a time when a disc bearing a blank label must be inserted into the label printer, and the Label Printer Program enabled to print, via the Label Printer, a label onto a CD, is shown in FIG. 12.

When each successive new CD is to be labeled, the operator performs the following simple procedure.

A CD is inserted in the CD tray of the EAS Control Unit PC.

The Label Printer software is selected and started at the PC.

On the Menu Bar of the Label Printer display, the operator must select Label and then View, and then respond OK to the dialog box.

The operator should examine the CD Label File Contents box to verify that the label file was properly accessed.

On the Menu Bar the operator must select Label and then Print, and then remove the CD and insert it in the label printer as instructed (see subsection 6.6).

For each successive CD to be labeled the operator should perform these same steps again.

In other words, the operator should respond "OK" to the Dialog Box shown in FIG. 10. The operator should inspect the label file prior to printing as shown in the screen depicted in FIG. 11. The operators should place the CD in the caddy, and insert the caddy into the rear of printer, as prompted by the screen shown in FIG. 12.

6.3.1 Using the Contents Boxes

Normally the Label Printer, when started initially or when New CD is selected, displays the default drive directory structure and the files contained within that structure. This display is for information purposes only, and is not necessary for label printing. The Label then View dialog box presumes that the label file will be named WHATCD.TXT, and will appear in the directory structure as opened. If this is not the case then the operator must use the contents boxes and dialog box to input the correct information. The contents boxes are provided to assist the operator in locating the correct label file if other than the default name and location (root) are used.

The operator can also use the contents boxes independent of the label printing operation to make a quick check that all files expected to be present on the CD are in fact written there.

6.4 Using the Verify Function

The operator can also use the Label Printer to verify a written CD. Rather than read the entire CD, which would be time consuming, a verification can be performed by actually starting the viewer which is resident on the CD and exercising the primary viewer functions. In general the CD consists of: the viewer and associated VBRUN and help file, the main body of the report and several index files of extension .IDX. Each of these files can be exercised by performing the following viewer operations.

First, the operator may see the Report Scroll Bar to position to the middle of the report by moving the Report Scroll Bar button to near center and then clicking the CD disc icon button. This forces the viewer to consult the primary top of page index file and perform a report page retrieval.

Second, the operator may see the Search function and input a valid search key for each search parameter and request a view by clicking on any of the "hits" obtained. This forces the Viewer program (discussed in section 3) to consult and to use each of the index files, and to perform a page retrieval.

These two actions provide a high level of confidence that all required files are present and functional.

A representation of the appearance of the verify display screen (previously shown in FIG. 9) at a time when a disc is to be checked for the presence of errors/verified that no errors are present is shown in FIG. 13.

4.5 Adjusting the Print Position

The user can adjust the position of the top line of the label to be printed by using the Label/Adjust menu selection, giving the screen display that is shown in FIG. 14. The illustrated dialog box permits the user to specify in one-hundredths of an inch increments the distance to move the top (and subsequent) line of the label.

Entering a "-" before the number moves the label printing up (i.e. closer to the center of the disc, toward the widest part of the label). Entering 25 would move the label down one quarter inch.

When the dialog box appears the current adjustment appears highlighted in the input box. Clicking OK will retain this adjustment, while clicking Cancel will set the adjustment to zero. The adjustment must be in the range of 300 to −300.

If the operator is unsure about the correct adjustment then the operator would normally print a test label first.

4.6 Contents of the Preferred Label File, Label and Packing List

The file WHATCD.TXT is a relatively free-form ASCII file. It is a requirement that the first line be the CD Hub number in order that the EAS control unit can locate and insert the hub number. Thereafter the file can contain useful identifying information as selected by the creation and/or user communities. In general this information should be contained in from 3 to 6 lines (3 minimum, 6 maximum), each line being of maximum length as shown below:

| line | contents | format | length (characters) |
| --- | --- | --- | --- |
| 1 | CD Hub # | CHN XXXX XXXX XXXX | 26 |
| 2 | free form | free form | 24 |
| 3 | free form | free form | 22 |
| line | contents | format | length |
| 1 | CD Hub # | CHN XXXX XXXX XXXX | 26 |
| 2 | free form | free form | 24 |
| 3 | free form | free form | 22 |
| 4 | free form | free form | 18 |
| line | contents | format | length |
| 1 | CD Hub # | CHN XXXX XXXX XXXX | 32 |
| 2 | free form | free form | 30 |
| 3 | free form | free form | 28 |
| 4 | free form | free form | 26 |
| 5 | free form | free form | 22 |
| line | contents | format | length |
| 1 | CD Hub # | CHN XXXX XXXX XXXX | 32 |
| 2 | free form | free form | 30 |
| 3 | free form | free form | 28 |
| 4 | free form | free form | 26 |
| 5 | free form | free form | 22 |
| 6 | free form | free form | 18 |

These line lengths vary due to the half moon shape of the label.

A pictorial representation of a typical label placed on a CD by the label printer of the EAS of the present invention is shown in FIG. 15.

A pictorial representation of a preferred form of a packing list generated by the Enterprise Authoring System of the present invention is shown in FIG. 16. This printed packing list, as shown in FIG. 16, is typically so printed by the line printer 98 shown in FIG. 7b. It should be realized that the packing list is also written upon the CD itself.

4.7 Using the Label Printer

The label printer requires that the CD be inserted in a special caddy for printing. The CD must have a blank paper half moon label pre-affixed and must be aligned properly. The entire caddy is then fed into the printer from the rear with the label portion of the disc going in last.

The preferred printer is the Trace label printer model CDP-5300 available from Trace, Inc. of Mountain View, Calif.. This printer performs an emulation of the Canon Bubble Jet BJ-10e, a driver for which is supplied with Windows 3.1. In order to print the operator must have selected this driver as the default printer in Windows Print Manager.

4.8 Closing the Label Printer Program

There is no need to close the Label Printer between uses. It can be left active, or minimized, as a Windows application program. If the operator choose to close the Label Printer Program then he/she may do so by using the Exit option under the File menu or the Close box in the upper left hand corner.

5. Extensions of the Invention

In accordance with the preceding explanation, variations and adaptations of the disc writing and distribution system in accordance with the present invention will suggest themselves to a practitioner of the electronic arts and information sciences.

In accordance with these and other possible variations and adaptations of the present invention, the scope of the invention should be determined in accordance with the following claims, only, and not solely in accordance with that embodiment within which the invention has been taught.

What is claimed is:

1. A method of writing at and upon a multiplicity of successive times a multiplicity of recordable medium, each such medium being initially undifferentiated and unidentifiable one medium to the next save only for a unique permanent serial number marking that is visually detectable, with information that is related so as to produce a plurality of related sets of recordable and recorded medium where each set has a plurality of members that are related to each other as well as to corresponding members of other sets, the method comprising:

first-transmitting at times from a computer to a writer of recordable medium a relatively larger data file called a common data file, each data file to be written in common onto a plurality of corresponding members that are within a plurality of sets of the recordable medium, each of which sets contains a plurality of related members, wherein each different common data file as is associated with the corresponding members of all sets of the recordable medium is communicated only once;

second-transmitting at times from the computer to the writer a relatively smaller data file called a control file, each control file being uniquely associated with an individual one of the multiplicity of the recordable medium;

first-receiving in the writer each common data file first-transmitted from the computer; and caching each common data file first-received for a time period until all corresponding members of each of the plurality of sets of the recordable medium have been written, at which time another, subsequent, common data file is first-received and cached;

second-receiving in the writer each unique control file second-transmitted from the computer;

reading, in a serial-number reader, the visually detectable unique permanent serial number marking that is upon a particular one of the multiplicity of recordable medium next to be recorded;

combining in a writer of recordable media each such (1) control file with (2) a cached common data file and with (3) at least any two or more of (3a) the read permanent serial number of the next one of the multiplicity of recordable medium next to be recorded (3b) a name of the information written upon the multiplicity of recorded media or medium, (3c) a designated recipient of the multiplicity if recorded media or medium when such are to be distributed, (3d) a packing list of all related recorded media or medium likewise to be so distributed when any such are, and (3e) an authenticating production number that is separated from the read permanent serial number, all to create a single unique record image; and recording with the writer of the recordable medium each individual one of the multiplicity of the recordable medium with a corresponding individually unique record image, first corresponding members of each of the plurality of sets of the multiplicity of recordable medium being recorded before second corresponding members of each of the plurality of sets and so on until all of the members of all of the plurality of sets of the multiplicity of recordable medium have been recorded;

wherein a data communication bandwidth from the computer to the writer of the recordable medium is conserved because the relatively larger common data file that is written to corresponding members of each of the plurality of sets of the multiplicity of the recordable medium is communicated from the computer to the writer only but once, and the each mechanism so employed is similarly conserved in that it is minimally occupied in receiving data from the computer;

wherein the recording with the writer of the recordable medium now records a redundant serial number, equal to the permanent serial number, upon each one of the multiplicity of recordable medium;

wherein the unique permanent serial number marking that was, and that remains, visually detectable on each one of the multiplicity of recordable medium is also recorded as a redundant serial number on the same recordable and recorded medium;

wherein the each redundant recorded serial number may subsequently be read by a machine means for reading information recorded on the recordable and recorded medium, which machine means need not, cannot, and does not optically detect the permanent serial number.

2. The method according to claim 1 wherein the recording comprises:

recording each individual one of the multiplicity of the recordable medium from beginning to end without pause or interruption.

3. The method according to claim 1 further extended for labeling the multiplicity of recordable medium after the recording thereof, the extended method comprising after the recording:

reading, in a machine means for reading information recorded on the recordable medium, selected control information inducing the redundant serial number of each recordable medium recorded thereon; and printing in a label-making machine a human-readable printed label, directly on the recordable media or on a label suitable in size and form to be attached to the recordable and recorded medium, containing the selected control information including the read redundant serial number; and attaching the printed label to the recordable and recorded medium;

wherein a human may correlate the serial number information visually detectable on the label with the permanent serial number marking that is also still visually detectable on the recordable and recorded medium so as to thereby also conclude that the selected control information that is also detectable on the label is truly, properly, associated with an individual physical recordable and recorded medium to which the label is affixed;

wherein a degree of security in labeling of a machine-readable recordable and recorded medium is attained.

4. The method of claim 1 as applied to a multiplicity of recordable medium in the form of optical discs.

5. The method of claim 4 as applied to a multiplicity of recordable medium in the form of a CD's-W.

6. A system for writing at and upon a multiplicity of successive times a multiplicity of recordable medium, each such medium being initially undifferentiated and unidentifiable one medium to the next save only for a unique permanent serial number marking that is visually detectable, with information that is related so as to produce a plurality of related sets of recordable and recorded medium where each set has a plurality of members that are related to each other as well as to corresponding members of other sets, the system comprising:

a computer for first-transmitting at times a relatively larger data file called a common data file, each common data file to be written in common onto a plurality of corresponding members that are within a plurality of sets of the recordable medium, each of which sets contains a plurality of related members, wherein each different common data file as is associated with the corresponding members of all sets of the recordable medium is communicated only once, and for second-transmitting at times a relatively smaller data file called a control file, each control file being uniquely associated with an individual one of the multiplicity of the recordable medium, and for third-transmitting at least one of a name of the information written upon the multiplicity of recorded media or medium, a designated recipient of the multiplicity of recorded media or medium when such are to be distributed, a packing list of all related recorded media or medium likewise to be so distributed when any such are, and an authenticating production number that is separated from the read permanent serial number;

a serial-number reader for reading the visually detectable unique permanent serial number marking that is upon a particular one of the multiplicity of recordable medium next to be recorded by the writer; and a writer of recordable medium including a cache memory, the writer for first-receiving each common data file first-transmitted from the computer, for caching in the cache memory each common data file first-received for a time period until all corresponding members of each of the plurality of sets of the recordable medium have been written, at which time another, subsequent, common data file is first-received and cached, and for second-receiving each unique control file second-transmitted from the computer, for third-receiving the read visually detectable unique permanent serial number from the serial-number reader, for fourth-receiving the name of the information written upon the multiplicity of recorded media or medium, the designated recipient of the multiplicity if recorded media or medium when such are to be distributed, the packing list of all related recorded media or medium likewise to be so distributed when any such are, the an authenticating production number that is separated from the read permanent serial number from the computer, for combining each such (1) control file with (2) a cached common data file and with (3) at least any two or more of (3a) the read permanent serial number of the next one of the multiplicity of recordable medium next to be recorded (3b) a name of the information written upon the multiplicity of recorded media or medium, (3c) a designated recipient of the multiplicity if recorded media or medium when such are to be distributed, (3d) a packing list of all related recorded media or medium likewise to be so distributed when any such are, and (3d) an authenticating production number that is separated from the read permanent serial number, all to create a single unique record image, and for writing each individual one of the multiplicity of the recordable medium with a corresponding individually unique record image, first corresponding members of each of the plurality of sets of the multiplicity of the recordable medium being recorded before second corresponding members of each of the plurality of sets and so on until all of the members of all of the plurality of sets of the multiplicity of the recordable medium have been recorded;

wherein a data communication bandwidth from the computer to the writer of recordable medium is conserved because the relatively larger common data file that is written to corresponding members of each of the plurality of sets of the multiplicity of the recordable medium is communicated from the computer to the writer only but once;

wherein the recording by the writer of the recordable medium now records a redundant serial number, equal to the permanent serial number, upon each one of the multiplicity of recordable medium;

wherein the unique permanent serial number marking that was, and that remains, visually detectable on each one of the multiplicity of recordable medium is also recorded as a redundant serial number on the same recordable and recorded medium;

wherein the each redundant recorded serial number may subsequently be read by a machine means for reading information recorded on the recordable and recorded medium, which machine means need not, cannot, and does not optically detect the permanent serial number.

7. A method writing upon the multiplicity of successive times a multiplicity of recordable medium each of which is initially undifferentiated and unidentifiable one to the next save only for a permanent serial number marking that is visually detectable, and labeling the multiplicity of recordable medium so written, the writing and labeling method comprising:

- successively reading, in an optical reader of a visually detectable permanent serial number marking that is upon each of the multiplicity of recordable medium, at least any two or more of (1) a permanent serial number of each successive next one of the multiplicity of recordable mediums next to be recorded, (2) a name of the information written upon the multiplicity of recorded media or medium, (3) a designated recipient of the multiplicity if recorded media or medium when such are to be distributed, (4) a packing list of all related recorded media or medium likewise to be so distributed when any such are, and (5) an authenticating production number that is separated from the read permanent serial number, a serial number of each successive ones of a multiplicity of recordable mediums;
- successively combining at least any two or more of (1) each read permanent serial number of the next one of the multiplicity of recordable medium next to be recorded, (2) a name of the information written upon the multiplicity of recorded media or medium, (3) a designated recipient of the multiplicity if recorded media or medium when such are to be distributed, (4) a packing list of all related recorded media or medium likewise to be so distributed when any such are, and (5) an authenticating production number that is separated from the read permanent serial number, a serial number of each successive ones of a multiplicity of recordable mediums with data to be written onto recordable mediums so as to create successive single record images, each of which record images is unique at least for including a serial number;
- successively writing with a writer of the recordable medium each individual one of the multiplicity of recordable mediums with its corresponding individually unique record image;
- wherein the permanent serial number marking that was, and that still remains, visually detectable on the recordable medium is also now redundantly recorded on the same recordable and recorded medium as a redundant serial number;
- reading, in a machine means for reading information recorded on the recordable and recorded medium, which machine means need not and cannot and does not serve to detect the visually-detectable permanent serial number of the recordable and recorded medium, selected information, including the redundant serial number, now recorded upon a recordable and recorded medium now; and
- printing, in a label-making machine, a human-readable label suitable in size and form to be attached to the recordable and recorded medium, which label contains selected control information including the redundant serial number as read; and
- attaching the printed label to the associated one of the multiplicity of recordable and recorded medium;
- wherein a human may correlate (i) the visually detectable redundant serial number information appearing upon the label with (ii) the visually detectable permanent serial number marking appearing upon the recordable and recorded medium, so as to thereby also conclude that the selected control information also then detectable on the label is truly, properly, associated with an individual physical one of the multiplicity of recordable and recorded medium to which the label is now attached;
- wherein a degree of security in labeling of a machine-readable medium is attained.

8. The method according to claim 7 wherein the reading and printing are done at a time after the successively reading, the successively combining, and the successively writing.

9. The method according to claim 8 wherein the reading and printing are upon a separate machine from the successively reading, the successively combining, and the successively writing.

10. The method of claim 7 as applied to a multiplicity of recordable mediums in the form of optical discs.

11. The method of claim 10 as applied to multiplicity of recordable mediums in the form of CD's-W.

12. A method of writing at and upon a multiplicity of successive times data and pointers to a multiplicity of recordable discs so as to create a multi-volume set of recorded-data discs wherein the pointers permit indexed machine usage of the set as single entity, the method of writing data and pointers to discs comprising:

- segmenting in a computer a data file that is larger than the data storage capacity of a disc into disc-size segmented data files while generating (i) a table containing pointers to all segmented portions of the data file, plus (ii) a number N of separate discs required to record the aggregate segmented data files;
- communicating the segmented data files successively, and also the table containing pointers, and also the number N of discs required, from the computer to a disc writer;
- developing in the disc writer a sequence, or volume, number (1-N) for each disc to be written;
- successively recording in the disc writer each of N discs each with (i) an associated, successively communicated one, of the segmented data files, plus (ii) the complete table containing pointers, plus (iii) the total number N of discs, plus (iv) the associated developed volume number 1-N;
- wherein the successively recorded discs as form a set are usable as a single entity because any one member of the set can be read subsequent to its recordation;
- so as to tell by reference to the table containing pointers recorded therein which particular volume 1-N of the set contains the data to which an indexed read reference is being made even should the member 1 of N presently being read not itself be that volume,
- and even should, by happenstance or by selection, the member 1 of N presently being read be indeed the volume 1-N which actually contains the data to which an indexed read reference is being made, then so as to tell that actual data to which an indexed read reference is being made;
- wherein the set of discs carries, in each and every member of the set, its own table containing pointers by which table containing pointers in conjunction with the volume number an indexed reference may be had to all the members of the set;
- wherein no reference needs be made to any index or pointers outside of, and not present on, the set of discs themselves in order to make indexed reference to the entire data file as is contained upon all the discs of the set.

13. The method of claim 12 as applied to optical discs.

14. The method of claim 13 as applied to optical discs in the form of CD-Ws.

15. An optical disc so created by the method of claim 12, and distinguished by bearing a table containing pointers to information that is both upon the disc and upon other, related, discs of a set of optical discs.

16. A CD-W so created by the method of claim 12, and distinguished by bearing a table containing pointers to information that is both upon the CD-W and upon other, related, CD-Ws of a set of CD-Ws.

17. An automated method of writing, and distributing to each of a plurality of recipients, a multiplicity of digital-data-bearing mediums that form a set, the multiple members of each set and the corresponding members of each of a plurality of sets containing related information, and of having each recipient confirm to a central authority its receipt of an associated multiplicity of digital-data-bearing mediums that form a set, wherein no recipient is required to make visual reference to the numbers or correctness of the members of its set received in order that the central authority receiving the confirmations may know which, and all, data discs are received by which, and all, of the recipients thereof, the automated method of data distribution comprising;

transmitting at times from a computer to a writer of recordable digital-data-bearing mediums each of a relatively larger data file called a common data file, each common data file to be written in common onto a plurality of corresponding members that are within a each of a plurality of recordable digital-data-bearing mediums that form a set, wherein each different common data file as is associated with the corresponding members of all sets of the mediums is communicated only once, and a relatively smaller data file called a control file, each control file being uniquely associated with and to be uniquely written to an individual one of the multiplicity of the mediums, each control file containing (i) a set identification of the unique set within which that particular medium to which the control file will be written is contained, (ii) a set member identification of the position within its set of that particular medium to which the control file will be written, (iii) an intended recipient of the disc, and (iv) a packing list of all the plurality of mediums that are within that set that will contain that particular medium to which the control file will be written;

receiving in the writer of the mediums each common data file and each unique control file transmitted from the computer;

caching in the writer of the mediums each common data file received for a time period until all corresponding members of each of the plurality of sets of the mediums have been written, at which time another, subsequent, common data file is received and cached, combining each such control file with a cached common data file to create a single unique record image, writing in the writer of the mediums each individual one of the multiplicity of the mediums with a corresponding individually unique record image, first corresponding members of each of the plurality of sets of the multiplicity of mediums being recorded before second corresponding members of each of the plurality of sets and so on, continuing in the writer of the mediums the receiving, caching, combining and the writing until all of the members of all of the plurality of sets of the multiplicity of mediums have been recorded; and reading in a first machine reader of the written medium the control file of each of the multiplicity of mediums to ascertain the (iii) intended recipient, and (iv) packing list;

distributing as best as possible all ones of the multiplicity of mediums directed to each recipient from the location of the machine reader to each and every intended recipient, it being countenanced and possible that some of the individual mediums will be any of improperly dispatched, mis-delivered as between recipients and lost;

reading, in a plurality of second machine readers of the mediums located at the plurality of recipients, the set, whether complete or incomplete or correct or incorrect, of mediums received by that recipient to ascertain (i) the set identification, (ii) the set member, (iii) the intended recipient of the disc, and (iv) the packing list, and generating a report of this information plus (v) the identity of the recipient;

transmitting the report generated at each of the recipients to a central authority that is informed of a master distribution record of the totality of the multiplicity of mediums written, and to what recipients each medium was directed;

comparing the reports as are received from the plurality of recipients at the central authority to the master distribution record in order to ascertain which, if any, of the mediums have been misdirected and received by a recipient other than the intended recipient, or have been lost and not received by any recipient of all such.

18. The method of claim 17 as applied to optical discs.

19. The method of claim 18 as applied to optical discs in the form of CD-Ws.

* * * * *